US012793124B2

(12) United States Patent
O'Neill

(10) Patent No.: US 12,793,124 B2
(45) **Date of Patent: *Nov. 10, 2026**

(54) SYSTEM AND METHOD FOR EFFICIENTLY IDENTIFYING AND SEGMENTING PRODUCT WEBPAGES ON AN ECOMMERCE WEBSITE

(71) Applicant: Social Voice Ltd., County Cork (IE)

(72) Inventor: Allen O'Neill, County Cork (IE)

(73) Assignee: Social Voice Limited, County Cork (IE)

( * ) Notice: Subject to any disclaimer, the term of this patent is extended or adjusted under 35 U.S.C. 154(b) by 14 days.

This patent is subject to a terminal disclaimer.

(21) Appl. No.: 19/098,375

(22) Filed: Apr. 2, 2025

(65) Prior Publication Data

US 2025/0232364 A1 Jul. 17, 2025

Related U.S. Application Data

(63) Continuation of application No. 17/867,358, filed on Jul. 18, 2022, now Pat. No. 12,321,980.

(Continued)

(51) Int. Cl.
*G06Q 30/00* (2023.01)
*G06F 40/109* (2020.01)
(Continued)

(52) U.S. Cl.
CPC ....... *G06Q 30/0641* (2013.01); *G06F 40/109* (2020.01); *G06F 40/143* (2020.01);
(Continued)

(58) Field of Classification Search
CPC ................................................ G06Q 30/06–08
See application file for complete search history.

(56) References Cited

U.S. PATENT DOCUMENTS 10,242,119 B1 3/2019 Karppanen
11,763,376 B2 9/2023 O'Neill
(Continued)

FOREIGN PATENT DOCUMENTS

WO 2021/103557 A1 6/2021

OTHER PUBLICATIONS

International Preliminary Report on Patentability and Written Opinion of the International Searching Authority from the European Patent Office in related International Application No. PCT/IB2022/056641 dated Feb. 1, 2024.

(Continued)

*Primary Examiner* — Ethan D Civan
(74) *Attorney, Agent, or Firm* — The Marbury Law Group, PLLC

(57) ABSTRACT

Methods, devices, and system for updating product webpages on an eCommerce website. A computing device may receive an address of a product webpage, retrieve the product webpage from the received address, and generate a structural model of the retrieved product webpage. The computing device may determine whether a similar product webpage from the received address has previously been segmented, use the generated structural model to segment the retrieved product webpage and generate a segmenting result in response to determining that a similar product webpage from the same address has not been segmented. The computing device may extract product information from the generated structural model based on the generated segmenting result and perform an update operation based on the extracted product information.

66 Claims, 61 Drawing Sheets

Related U.S. Application Data

(60) Provisional application No. 63/287,387, filed on Dec. 8, 2021, provisional application No. 63/223,299, filed on Jul. 19, 2021.

(51) Int. Cl.

| | |
|---|---|
| ***G06F 40/143*** | (2020.01) |
| ***G06Q 30/0601*** | (2023.01) |
| ***G06V 10/774*** | (2022.01) |
| ***G06V 30/413*** | (2022.01) |
| *G06Q 10/087* | (2023.01) |

(52) U.S. Cl.
CPC .......... *G06V 10/774* (2022.01); *G06V 30/413* (2022.01); *G06Q 10/087* (2013.01)

(56) References Cited

U.S. PATENT DOCUMENTS

| | | | | |
|---|---|---|---|---|
| 12,321,980 | B2 * | 6/2025 | O'Neill .............. | G06Q 30/0641 |
| 2011/0066662 | A1 | 3/2011 | Davis | |
| 2012/0059859 | A1 | 3/2012 | Jiao et al. | |
| 2022/0230203 | A1 | 7/2022 | Liu et al. | |

OTHER PUBLICATIONS

Ahmed, et al., "DataRover: An Automated System for Extracting Product Information From Online Catalogs", Department of Computer Science and Engineering, XP093003261, vol. 23, pp. 1-10, (Jun. 5, 2006).

Davulcu, et al., "DataRover: A Taxonomy Based Crawler for Automated Data Extraction from Data-Intensive Websites", Department of Computer Science and Engineering, XP058394733, pp. 9-14, (Nov. 7, 2003).

Vadrevu, et al., "Information Extraction from Web Pages Using Presentation Regularities and Domain Knowledge", World Wide Web, DOI 10.1007/s11280-007-0021-1, vol. 10, No. 2, pp. 157-159, (Mar. 2, 2007).

Ghaemmaghami, et al. "A New Semantic Approach to Improve Webpage Segmentation", Journal of Web Engineering 20.4: 963-992, 2021 (Year: 2021).

* cited by examiner

FIG. 2A
200
A&B for B2B, Gov, Students & More
News, Tips and Reviews >
The Professional's Source Since 1973
800.555.5555
Help
Live Chat
About Us
A&B
Search
A&B Gift Cards SHOP NOW >
DealZone Ends In 14:42:15
Hello, Log in My Account
My Cart
Photography
Computers
Pro Video
Lighting
Pro Audio
Mobile
TVs & Entertainment
Camcorders
Surveillance
Optics
Audio-Visual
More...
Used
Specials
Home > Photography > Lenses > Mirrorless Lenses > Camera Brand RF 24-70mm f/2.8L IS
150
Camera Brand RF 24-70mm f/2.8L IS USM Lens
BH #CA0000RF · MFR #0000C002
88 reviews
24 Questions, 69 Answers
134
Camera Brand
Authorized Dealer
More on the Way
Share
Print
Request Stock Alert
Expected availability: 2-4 weeks
$2,299.00
Add to Cart
Add to Wish List
Calculate Shipping
Protect your Gear
Add a protection plan from $94.99
See Options
Trade in your gear for cash: Learn more
True Know-How Ask Our Experts
Live Chat 800.555.5555 Email
Key Features
· RF-Mount Lens/Full-Frame Format
· Aperture Range: f/2.8 to f/22
· Three Aspherical Elements
· Three Ultra-Low Dispersion Elements
Show More
intuitive design. The constant f/2.8 maximum aperture suits working in
lighting conditions and also enables greater control over depth of field. The
More Details
Feedback
Recommended Accessories
View All
B+W 82mm XS-Pro UV Haze MRC-Nano 010M
$77.95
B+W 82mm XS-Pro Kaesemann High
$139.95
Tiffen 82mm Variable Neutral Density Filter
$173.99
$69.95
Add to Cart

FIG. 20C
2004
2002
Search Jewellery, Dining & Giftware
Luxury Brand
silverware
THE CRAFT IN IRISH DESIGN SINCE 1934
YOUR BASKET
€0.00
NEW ARRIVALS
JEWELLERY
GIFTWARE
DINING
DIAMONDS
LUXURY
ABOUT US
FREE DELIVERY
2032
NEW
GIFTWARE
Discover Timeless Gifts
2030
SHOP NOW
10%
OFF
Your First Order
Sign up to our mailing list & receive 10% off your first order. Receive exclusive offers and new collections straight to your inbox
EMAIL ADDRESS
JOIN NOW
By entering your email address you agree to our Privacy Policy / Terms & Conditions
New Jewellery>
Create a Statement Look
Shop Jewellery>
The Perfect Gift
By clicking "Accept All Cookies", you agree to the storing of cookies on your device to enhance site navigation, analyze site usage, and assist in our marketing efforts. Cookie Policy
x
Cookies Settings
Accept All Cookies
2034
2036

2102

2400

SYSTEM AND METHOD FOR EFFICIENTLY IDENTIFYING AND SEGMENTING PRODUCT WEBPAGES ON AN ECOMMERCE WEBSITE

RELATED APPLICATIONS

This application is a continuation of U.S. Non Provisional application Ser. No. 17/867,358, entitled "System and Method for Efficiently Identifying and Segmenting Product Webpages on an eCommerce Website", filed Jul. 18, 2022 which claims the benefit of priority to U.S. Provisional Application No. 63/223,299, entitled "System and Method for Efficiently Identifying and Segmenting Product Webpages on an eCommerce Website" filed Jul. 19, 2021, and U.S. Provisional Application No. 63/287,387, entitled "System and Method for Efficiently Identifying and Segmenting Product Webpages on an eCommerce Website" filed Dec. 8, 2021, the entire contents of all of which are hereby incorporated by reference for all purposes.

BACKGROUND

Product manufacturers, distributors, and resellers have always had an interest in understanding how their products (and often their competitors' products) are presented and sold in traditional retail businesses. Indeed, they often perform spot checks and random inspections by visiting traditional retail businesses. They typically look at factors such as the product pricing (e.g., is the shelf-edge-label present and clearly legible, is the pricing in line with the recommended pricing, etc.), placement (e.g., is the product in stock and on the shelf, is the product located in the correct part of the store, is the product on a shelf that is too high or too low, does the product have sufficient shelf width, etc.), and promotion (e.g., does a competing product have a significant price discount or additional free content, does a competing product have a free-standing promotional display stand, etc.). Product manufacturers, distributors, and resellers then use this information to improve the sales of their own products. For example, they may inform the traditional retail businesses that the shelf space for their products is frequently empty, they may introduce special offers, or they may provide the traditional retail businesses with an incentive to feature the products more prominently in the store or on the shelves.

The Internet and the world wide web have changed from being a niche research project to a global eCommerce platform in a remarkably small number of years. Many traditional retail businesses (now often referred to as "bricks and mortar" or "highstreet" businesses) have moved online and created Internet based sales channels. Similarly, many product manufacturers have bypassed or complemented traditional distribution and reseller channels by selling directly to consumers online. Further, there are many global businesses that were founded within the last few years that only sell online. Many of these businesses are household names, and some of them also act as online market places where third parties sell their goods (e.g., Amazon, etc.). It is probably now possible to buy online anything that was sold by a traditional business, and in many cases the choice and availability online is far greater. For these and other reasons, more people are buying larger volumes and more types of products online from eCommerce websites than ever before, and all of the indications are that this trend is likely to continue.

Regardless of this radical transition to eCommerce platforms and online sales, there is still a need for product manufacturers, distributors, and resellers to understanding how their products and their competitors' products are presented and sold online.

SUMMARY

The various aspects include methods of generating an updated webpage, including receiving by a processor in a computing device user input that includes a plurality of web addresses, determining by the processor whether product information has previously been extracted from a product webpage from a web address in the plurality of web addresses included in the received user input, retrieving by the processor the product webpage from the web address in response to determining that product information has not previously been extracted from the product webpage from the web address in the plurality of web addresses included in the received user input, generating by the processor a structural model of the retrieved product webpage (the generated structural model including nodes that represent the product fields), determining by the processor whether the generated structural model matches a stored structural model of another webpage retrieved from the web address, extracting by the processor product information from the generated structural model based on a previously stored mapping of nodes in the stored structural model to the product fields in response to determining that the generated structural model matches the stored structural model of another webpage retrieved from the web address, generating by the processor a mapping of nodes in the generated structural model to the product fields—and extracting the product information from the generated structural model based on the generated mapping—in response to determining that the generated structural model does not match the stored structural model of another webpage retrieved from the web address, generating an updated webpage based on the extracted product information, and sending the updated webpage to a second computing device for display on an electronic display of the second computing device.

In some aspects, generating the mapping of nodes in the generated structural model to the product fields may include generating mappings from locations in the generated structural model to the product fields. In some aspects, generating the mapping of nodes in the generated structural model to the product fields may include determining one or more characteristics associated with a product field, and determining whether a portion of the generated structural model includes the determined one or more characteristics. In some aspects, determining whether a portion of the generated structural model includes the determined one or more characteristics may include determining a threshold value for the product field, determining a weighted contribution value for each of the determined one or more characteristics, determining a total contribution value based on a sum of all the determined weighted contribution values, determining whether the determined total contribution value meets or exceeds the determined threshold value, and determining that the portion of the generated structural model includes the determined one or more characteristics in response to determining that the determined total contribution value meets or exceeds the threshold value.

In some aspects, generating the mapping of nodes in the generated structural model to the product fields may include using machine learning to generate the mapping of nodes in the generated structural model to the product fields, which may include training a machine learning component using a plurality of structural models and using the trained machine learning component to perform inference on the generated structural model. In some aspects, generating the structural model of the retrieved product webpage may include generating a structural model for only the initial viewport of the retrieved product webpage. In some aspects, the method may include associating a condition with the product information on the retrieved product webpage based on user input, and comparing the extracted product information with the associated condition to determine whether the extracted product information meets the associated condition. In some aspects, generating the updated webpage based on the extracted product information and sending the updated webpage to the second computing device for display on the electronic display of the second computing device may include generating the updated webpage based on the extracted product information and sending the updated webpage to the second computing device for display on the electronic display of the second computing device in response to determining that the extracted product information meets the associated condition.

Further aspects may include a computing device having a processor configured with processor-executable instructions to perform various operations corresponding to the methods discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DESCRIPTION

Figure 1A:
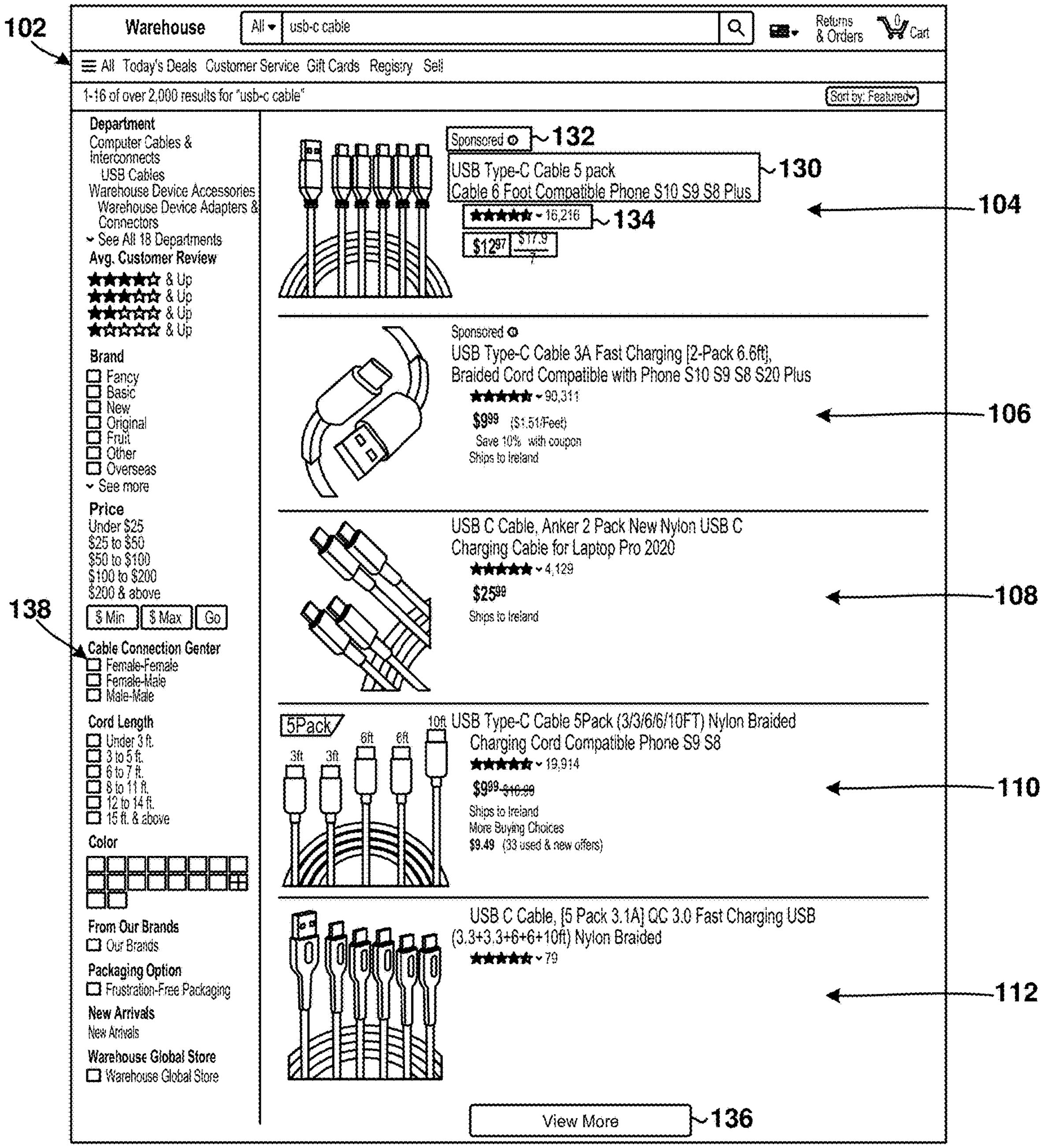
FIGS. 1A-ID are component diagrams that illustrate collection product webpages that include product fields that could be extracted, segmented, and used by a computing device to evaluate how products are presented and sold on an eCommerce website in accordance with some embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing device configured to implement the methods, for quickly and efficiently analyzing and processing webpages and websites to extract and generate information suitable for use in understanding how products are presented and sold on an eCommerce Website. The embodiments may also generate alerts or reports, and perform any of a variety of responsive actions based on the generated alerts or reports. For example, if a report indicates that a product price is less than a threshold percentage of the average product price across multiple competitors' websites, a computing device configured in accordance with the various embodiments may determine that there is a high probability that the product price is incorrect or that the product is a counterfeit product. In response, the computing device may perform various operations (e.g., update and regenerate the webpage, communicate with a third-party server, etc.) to immediately freeze sales of the product.

By quickly and efficiently analyzing and processing webpages and websites, the various embodiments improve the performance, memory usage and/or power consumption characteristics of the computing device. For example, the various embodiments may use significantly fewer CPU cycles than conventional solutions to determine whether a product page includes inconsistent, missing, incorrect, or fraudulent information about a listed product.

The word "exemplary" is used herein to mean "serving as an example, instance, or illustration." Any implementation described herein as "exemplary" is not necessarily to be construed as preferred or advantageous over other implementations.

The term "product" is used herein to refer to any of a variety of different types of goods (e.g., pet food, cosmetics, buildering materials, etc.), services (e.g., eye tests, train journeys, etc.), and/or information (e.g., news articles, academic papers, etc.) that may be offered to consumers.

The term "product field" is used herein to refer to an information structure or a unit of information relating to a product that is included within a webpage. Examples of product fields include product name, product manufacturer, product photo(s), unit price, summary description, detailed description, product variations (e.g., different sizes, different colors, etc.), user rating, user review(s), alternative product(s), complementary product(s), suggested product(s), and the ability to purchase one of more instances of the product. In some embodiments, each product field may include a name and a value. In some embodiments, product fields may be classified as “core product fields” and “supporting product fields” or “additional product fields.” Core product fields are typically more significant than the supporting/additional product fields, and the core product fields typically have unique structures. In contrast, supporting/additional product fields are typically composed of one or more key-value pairs, and the keys are typically styled in a different way to the value (e.g., the keys may be bold, italic, or a larger font size relative to the value).

The term “characteristic” may be used herein to refer to an aspect or property of a webpage that may be used to identify webpage types (e.g., collection product webpage, single product webpage, landing webpage, operational webpage, user navigation webpage) and/or to segment the webpages so that their product fields may be extracted efficiently. For example, a characteristic of a collection product webpage may be that it includes a structure (representing a single product) that is repeated numerous times. This structure may include product fields, and it may be represented within a document object model (DOM) as a sub-branch that repeats itself. As further example, a characteristic of a collection product webpage may be that the presence of specific characters (e.g., “<” and “>”) and keywords (e.g., “filter,” “sort,” “previous” and “next”), images, and/or their locations in the DOM relative to the HTML tag that includes the repeating structure are indicative of a specific component of the webpage and/or of a specific product field.

The term “computing device” may be used herein to refer to any or all of server computing devices, personal computers, laptop computers, tablet computers, edge devices, mobile devices, user equipment (UE), multimedia Internet enabled cellular telephones, smartphones, smart wearable devices (e.g., smartwatch, smart glasses, headset, head mounted display, fitness tracker, clothes, jewelry, shoes, etc.), Internet-of-Things (IoT) devices (e.g., smart televisions, smart speakers, smart locks, lighting systems, smart switches, smart doorbell cameras or security systems, etc.), audio devices (e.g., HomePod, Echo, Nest, etc.), connected vehicles, and other similar devices that include a memory and programmable processor for providing the functionality described herein.

The term “web browser” may be used herein to refer to a software and/or hardware client on a computing device that is configured to retrieve web resources from a web server. As an example, a web browser may be a mobile or desktop software application operating on a processor of a computing device that utilizes a display for user interaction. As further examples, a web browser may be a component embedded within a mobile or desktop application on the computing device, or a software module running on a server without any display capabilities in a data center (often referred to as an “automated web browser,” a “headless browser” or a “headless server”). A web browser may be an audio device that retrieves web resources from a web server and subsequently presents the information included in the web resources to a user in an audio format (e.g., by reading parts of the web resources, etc.). The audio device may be capable of receiving voice instructions from a user, and subsequently converting these into a format that can be sent to the web server. Examples of such web browsers/clients include Apple’s Siri on HomePod, Amazon’s Alexa on Echo, and Google Assist on Nest. In some embodiments, a web browser may be part of a vehicle, and it may interact with the driver using the vehicle’s existing hardware (e.g., information may be presented to the driver using a heads-up display, the driver may provide instructions using buttons on the steering wheel, etc.). The web browser may be a headset device (e.g., smart glasses) that is used to present the user with an augmented reality (AR) environment and/or a virtual reality (VR) environment. Such headset devices are becoming increasingly popular in the context of eCommerce (e.g., AR may be used to digitally place a piece of furniture into a real scene so that the potential purchaser can see how it will look, VR may be used to allow a user to inspect a life size model of a new car, etc.). In some embodiments, a web browser may be a software application that emulates any of the web browser types described herein. In some embodiments, the web browser may include a website analysis system.

The terms “machine learning algorithm” and “artificial intelligence model” may be used herein to refer to any of a variety of information structures that may be used by a computing device to perform a computation or evaluate a specific condition, feature, factor, dataset, or behavior on a device. Examples of machine learning (ML) algorithms include network models, neural network models, inference models, neuron models, classifiers, random forest models, spiking neural network (SNN) models, convolutional neural network (CNN) models, recurrent neural network (RNN) models, deep neural network (DNN) models, generative network models, ensemble networks, generative adversarial networks, and genetic algorithm models. In some embodiments, a machine learning algorithm may include an architectural definition (e.g., the neural network architecture, etc.) and one or more weights (e.g., neural network weights, etc.).

The term “inference” may be used herein to refer to a process that is performed at runtime or during execution of the software application program corresponding to the machine learning algorithm. Inference may include traversing the processing nodes in a network (e.g., neural network, etc.) along a forward path (which may include some backwards traversals) to produce one or more values as an overall activation or overall “inference result.”

The term “markup language” may be used herein to refer to any programming language and/or system for annotating text such that a processor may syntactically distinguish the annotations from the text. Examples of markup languages include Hyper-Text Markup Language (HTML), Extensible Hyper-Text Markup Language (XHTML), Extensible Markup Language (XML), Standard Generalized Markup Language (SGML), Scribe, etc.

The terms “dynamic language” and “scripting language” may be used herein to refer to any dynamic language, scripting language, or to any language used to write programs (herein as “scripts”) that are interpreted and/or compiled at runtime. These terms may also refer to any language that runs on a managed runtime and is dynamically compiled. Thus, for the purposes of this application, usage of the terms “dynamic language” and “scripting language” in the description of the various embodiments should not be construed as limiting the claims to languages that are interpreted from source code or bytecode, or to those that execute along with programs that are traditionally compiled into native machine code. Examples of dynamic and scripting languages within the scope of this application include, for example, JavaScript®, Perl, Python, and Ruby, as well as other similar languages that may be developed in the future.

The term “style sheet language” may be used herein to refer to any computer language that expresses the presentation of structured documents so that the presentation style of the document may be separated from the content of the document. An example of a style sheet language is Cascading Style Sheets (CSS), which is typically used for describing the presentation semantics of a document written in a markup language.

For ease of reference, throughout this application, HTML is used as an exemplary markup language, CSS is used as an exemplary style sheet language, JavaScript® is used as an exemplary scripting language, and JavaScript Object Notation (JSON) is used as an exemplary data format for storing and/or transmitting data objects. However, it should be noted that the use of HTML, CSS, JavaScript®, and JSON in this application is only for purposes of illustration, and should not be construed to limit the scope of the claims to a particular language unless expressly recited by the claims.

HTML is a markup language that implements the ISO/IEC 15445 standard. HTML may be characterized as a set of markup tags (e.g., annotations) used to describe web pages so that they can be displayed by a software application, such as a web browser. HTML allows for the creation of structured documents by denoting structural semantics for text, such as headings, paragraphs, lists, links, quotes, and other items.

HTML may embed and/or include links to JavaScript® code capable of affecting the behavior and/or presentation of the containing HTML page. The embedded/linked JavaScript® code may also generate additional HTML code, which may be inserted into the containing HTML page (i.e., the HTML code in which the JavaScript® is embedded). JavaScript® may be used to embed functions into HTML code such that the functions interact with, and manipulate, the document object model (DOM) of the HTML page. DOM is a language-independent convention for representing and interacting with objects in HTML, and allows the JavaScript® code to have access to, and manipulate, the containing HTML page. A DOM tree is typically generated as part of rendering a web page to identify the components, relative structure, relationships, and behavior of the respective components (e.g., HTML tags, etc.) that define the page.

Cascading Style Sheets (CSS) is a style sheet language used to describe the look and formatting of web sites, and is intended to be used to separate the presentation of a document from its content. Each style sheet may include an ordered collection of rules with the following format: selector {property1: value; . . . propertyn: value;}. As an example, the following CSS code tells the browser to render all <cite> elements whose direct ancestor is a <p> element using a black foreground over a white background: p>cite {color: black; background-color: white;}. Each website may include tens of thousands of such rules.

Many webpages are too large to display entirely on the user's screen, so the user typically needs to scroll the webpage down to see the parts of it that are not initially visible on the screen. The "fold" is used to distinguish between the visible part of a webpage that is seen when the webpage is first viewed, and the additional parts of the webpage that require scrolling to be seen. Typically, the most important information in a webpage appears above the fold. The "viewport" is the term used to refer to the part of the webpage that is currently visible to the user. Therefore, when a webpage is first loaded by a user, the initial viewport shows everything above the fold.

Figure 1B:
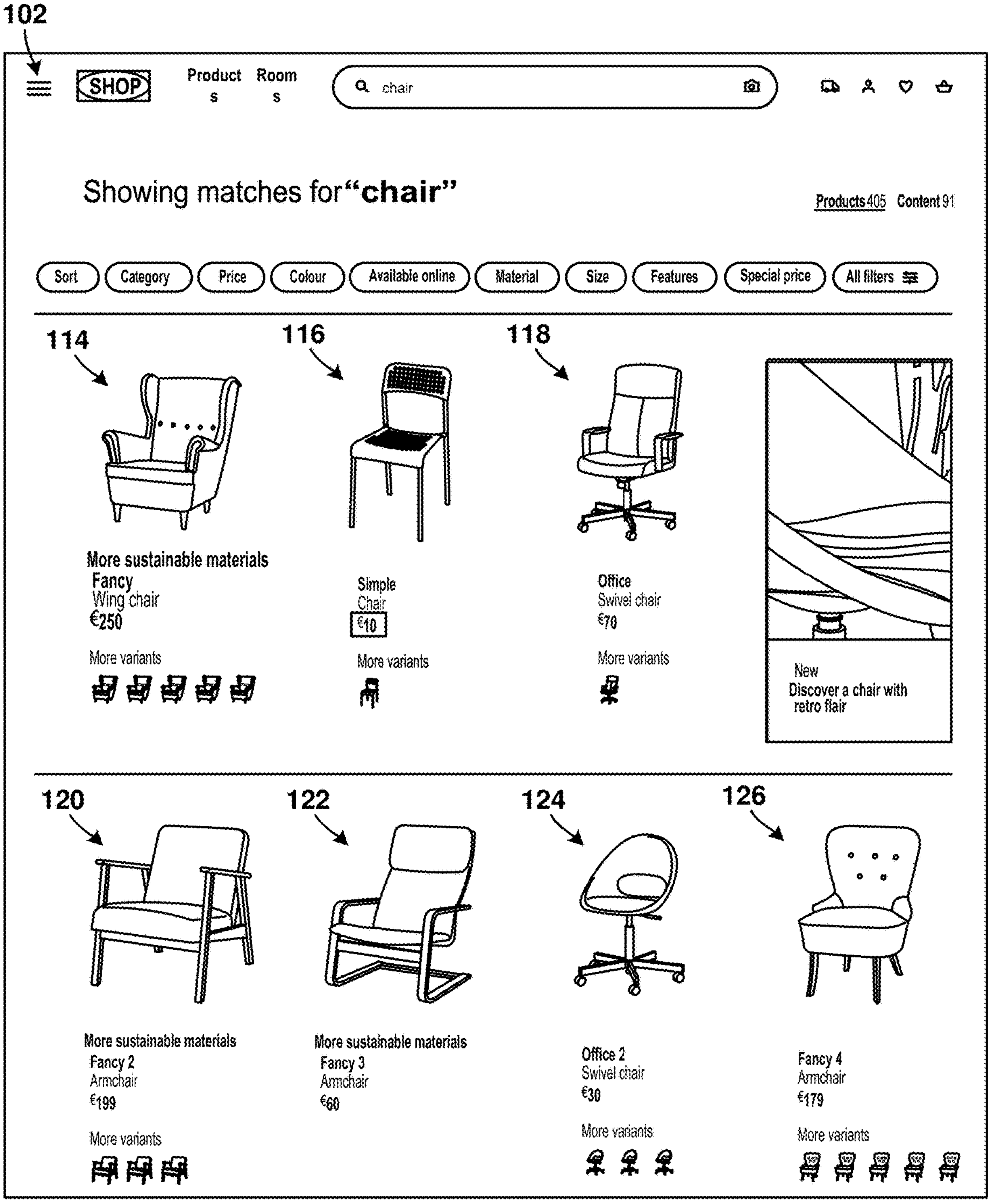
Figure 1C:
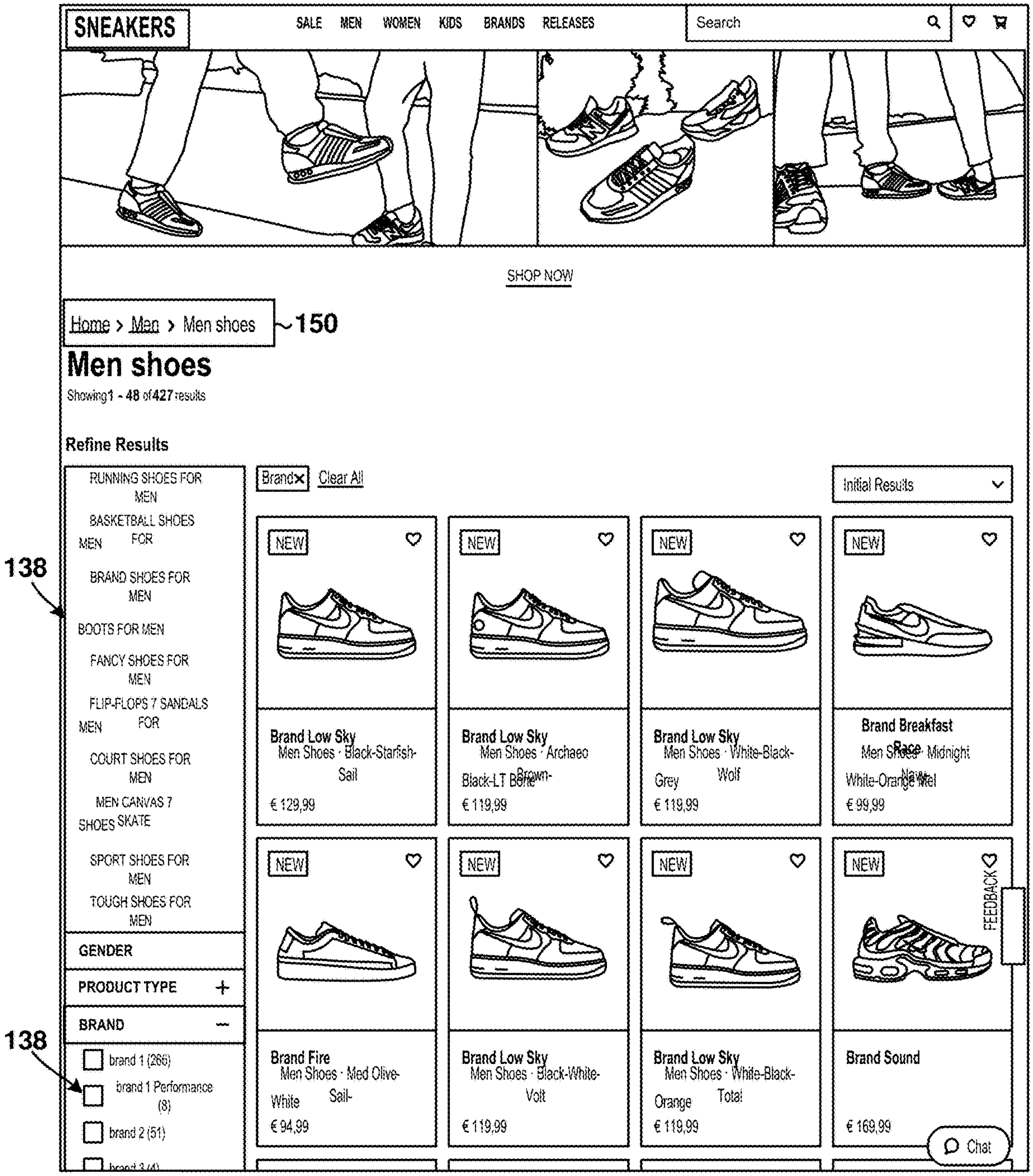
Figure 1D:
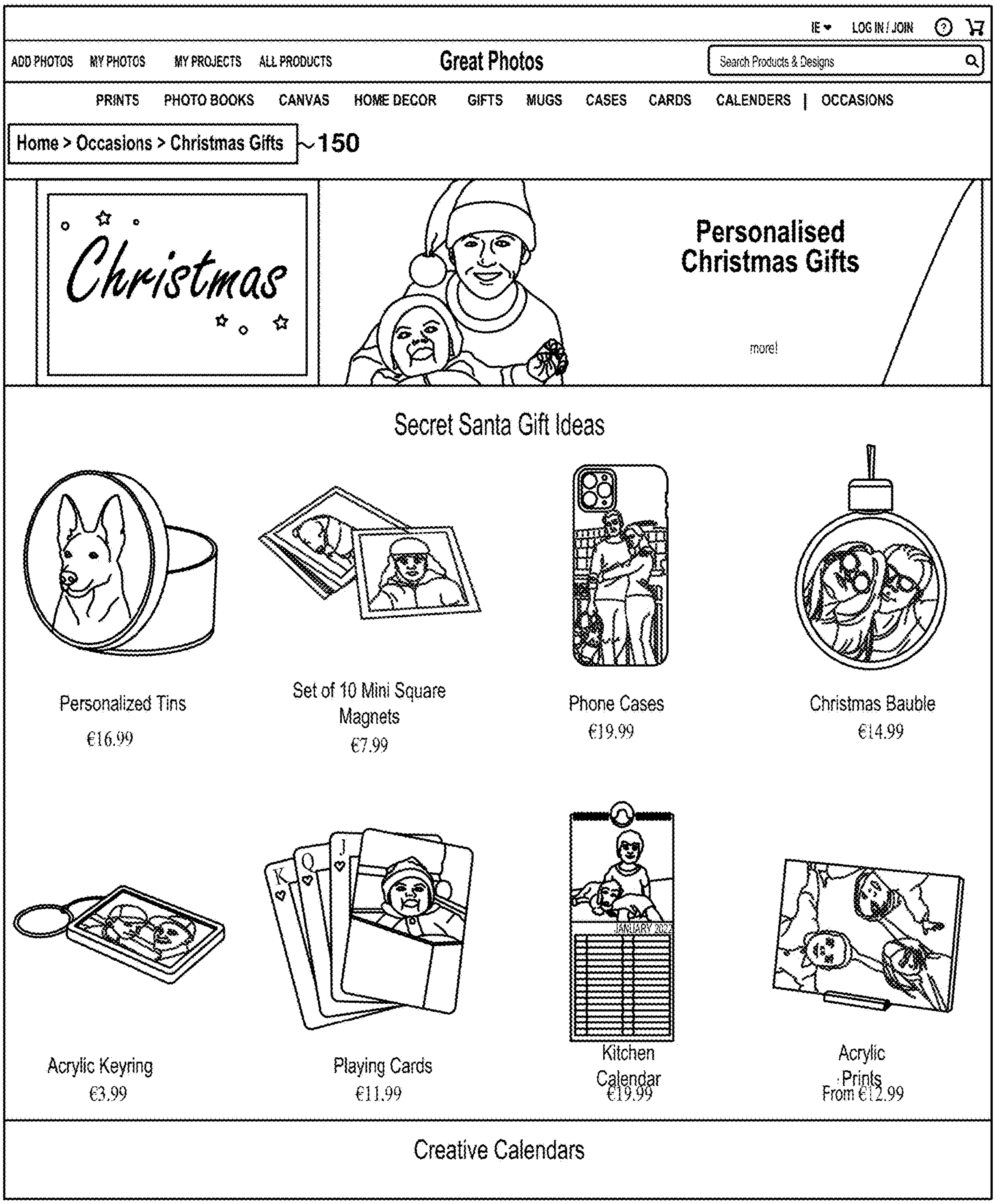
Figure 2A:
FIGS. 2A and 2B are component diagrams that illustrate single product webpages that include product fields that could be extracted, segmented, and used by a computing device to evaluate how products are presented and sold on an eCommerce website in accordance with some embodiments.
Figure 2B:
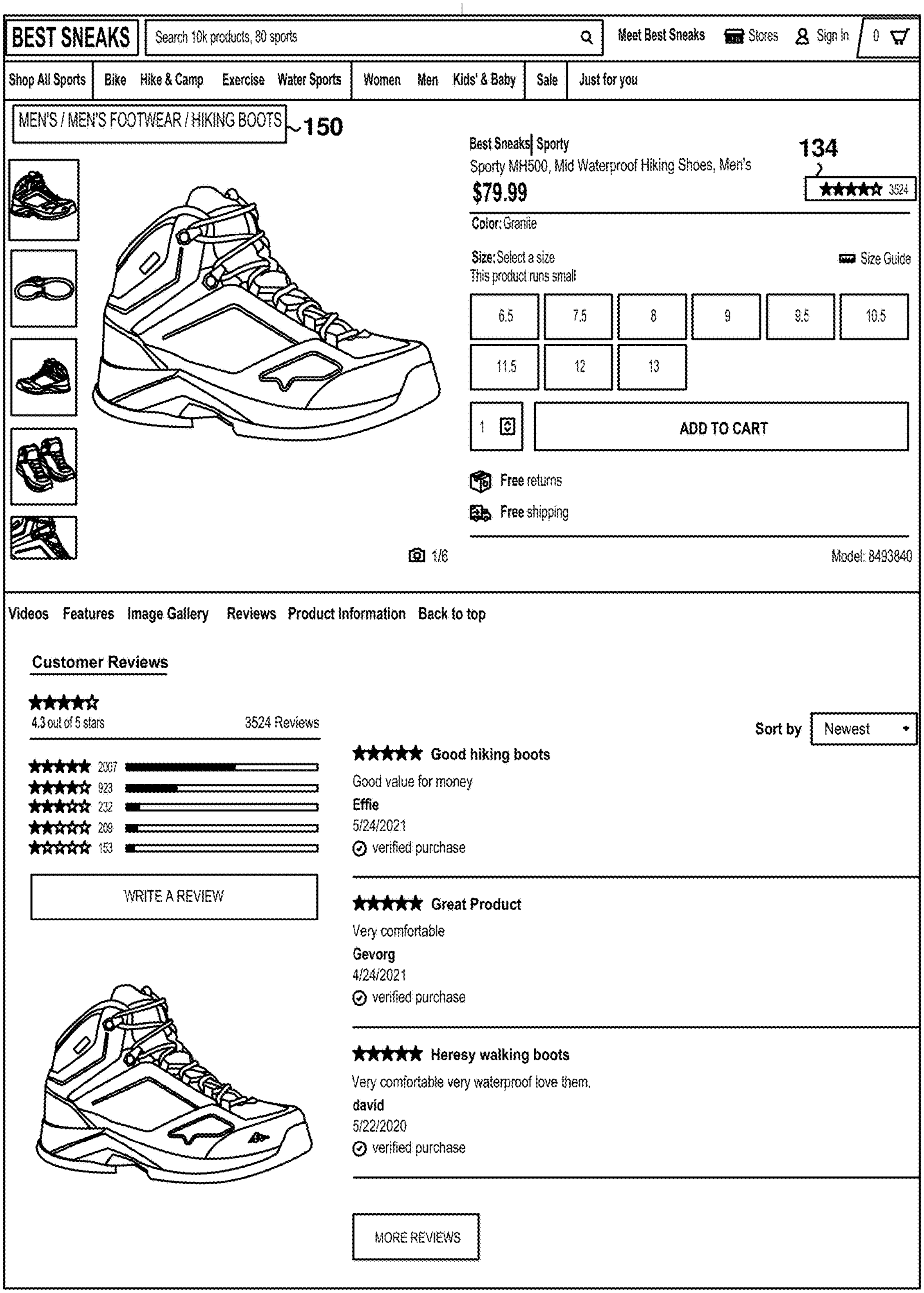

Most eCommerce websites consist of numerous types of webpages. From a user's perspective (i.e., a potential buyer), there are two main types of pages that relate to the products being sold: a collection product webpage and a single product webpage. FIGS. 1A-1D illustrate examples of collection product webpages, and FIGS. 2A and 2B illustrate examples of single product webpages.

Generally, a collection product webpage enables the user to view a large number of similar products—potentially from competing manufacturers. The user may be presented with summary level information regarding the products, and allowed to interact with (e.g., click on, etc.) a specific product in order to view the second type of webpage—a single product webpage. The single product webpage may be displayed using a dynamic means (e.g., as a popup window over the collection product webpage, etc.) and/or may be displayed as a separate webpage that replaces the collection product webpage in the web browser. The user may then purchase the product (e.g., by adding it to a basket on this webpage, by adding it to a basket on a display panel, by adding it to a virtual trolley in a virtual reality application, etc.).

A collection product webpage typically lists the available products in a tabular format (e.g., single column, grid, etc.), and it repeats similar summary information product fields for each product (e.g., product name, product photo, unit price, etc.). Generally, the products listed in a collection product webpage have something in common. For example, FIGS. 1A and 1B illustrate collection product webpages ("collection function webpage") that list products that all serve the same function. FIG. 1C illustrates a collection product webpage ("collection brand webpage") that lists products that are all part of the same brand, made by the same manufacturer, are of use together, and/or are of interest to the same user. FIG. 1D illustrates a collection product webpage ("collection promotion webpage") that lists diverse products that have a common promotion or sale related characteristic (e.g., seasonally themed, current best sellers, clearance items, etc.).

With reference to FIGS. 1A and 1B, a collection product webpage may include a main website navigation menu 102, listed items 104-126, product details 130, specific keywords 132 (e.g., "Sponsored," etc.), product user ratings 134 (e.g., represented using stars, etc.), a navigation mechanism 136 (e.g., view more, move to the next page, infinite scrolling, etc.), and a selection mechanism 138 (e.g., checkboxes, etc.), any or all of which may be product fields.

The selection mechanism 138 may allow the user to filter the displayed products (e.g., by price, subtype, manufacturer, rating, product attributes, etc.). Activating a selection mechanism 138 does not normally cause a new webpage to be loaded. Rather, it causes the styling attributes on the filtered products within the document object model (DOM) to change so that they are not displayed. Alternatively or in addition, activating a selection mechanism 138 may cause additional resource requests to be made by the web browser and/or for the existing webpage to be reloaded with additional filter parameters (e.g., the original URL "http://www.pet-food.com/dog/dry-nuts/" may be replaced with a filtered URL "http://www.pet-food.com/dog/dry-nuts/?brand=EatWellFoods," etc.).

FIGS. 1C and 1D illustrate that a collection product webpage may also include a "breadcrumb trail" 150, which shows the current webpage in the context of all of its ascendant webpages (e.g., a single product webpage for a tub of chocolate ice-cream may have a breadcrumb trail consisting of "Food>Dairy>Ice-cream>Tubs").

The second type of webpage is a single product webpage, examples of which are illustrated in FIGS. 2A and 2B. In particular, FIG. 2A illustrates a single product webpage for a camera lens and FIG. 2B illustrates a single product webpage for a pair of hiking boots.

A single product webpage focuses on a single product, and typically includes various product fields, such as the product name, product manufacturer, product photo, unit price, summary description, detailed description, product variations (e.g., different sizes, different colors, etc.), user rating, user reviews, alternative products, complementary products, and the ability to purchase one of more instances of the product.

In addition to allowing the user to purchase the product, the single product webpage may also allow the user to rate or write a review of the product. The single product webpage may also include a breadcrumb trail 150 and product user ratings 134 represented using stars.

From a technical perspective, eCommerce websites have evolved significantly since their first inception. The collection product webpages and single product webpages are typically generated dynamically on, and/or retrieved from, a web server when they are requested by the user. Further, each time that a user requests a webpage, his/her web browser makes many requests to the webserver, and it then displays the contents of the webpage to the user.

Figure 3:
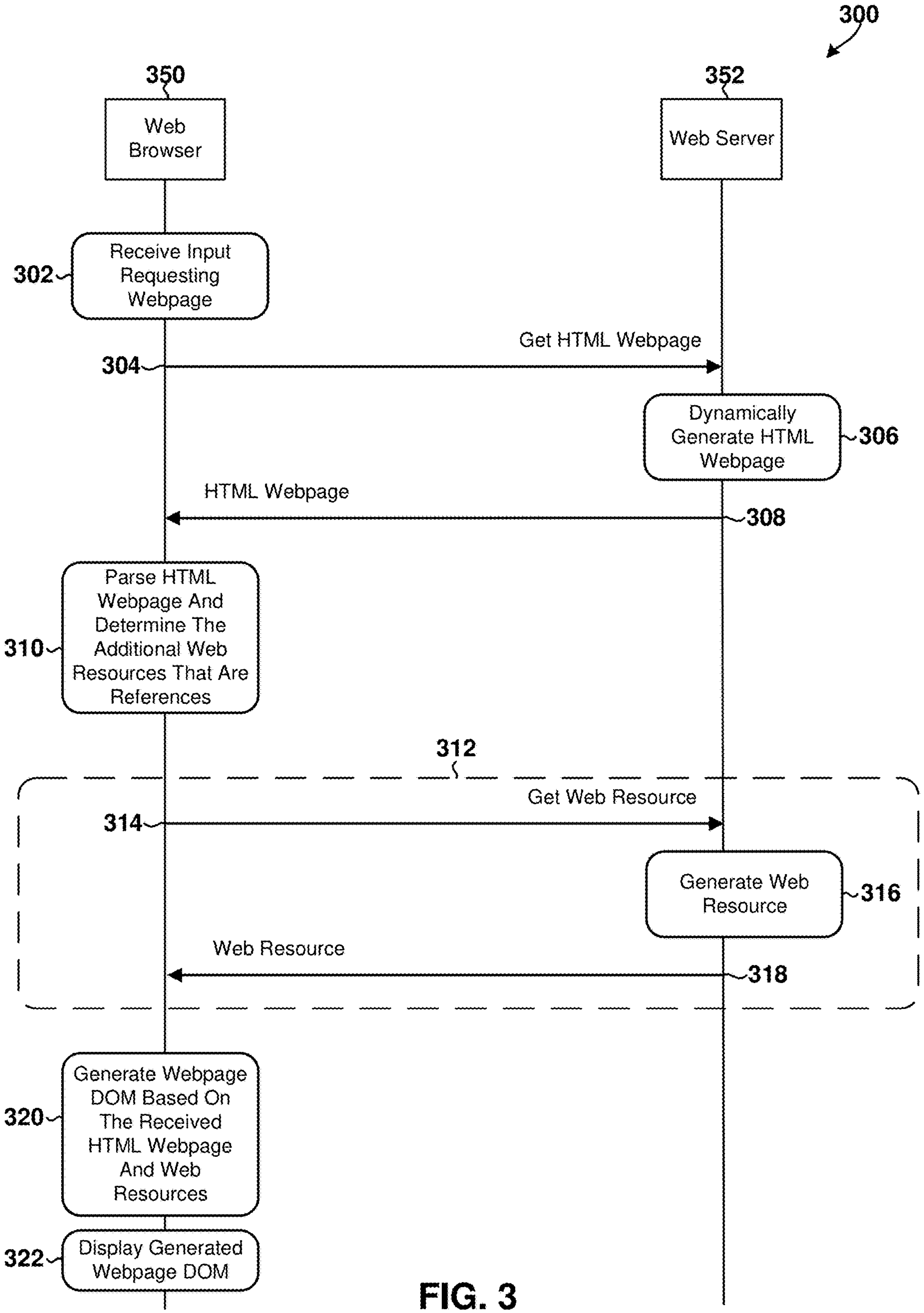
FIG. 3 is an activity diagram that illustrates the components, operations and communications in a system configured to implement a method of generating and rendering a document object model (DOM) that represents product fields that could be extracted, segmented, and used by a computing device to evaluate how products are presented and sold on an eCommerce website in accordance with some embodiments.

FIG. 3 illustrates an example method 300 of rendering a product webpage in accordance with some embodiments. Method 300 may be performed by one or more processors in a computing device that includes a web browser 350 and/or by one or more processors in a server computing device that includes a web server 352, any or all of which may include all or portions of a website analysis system.

In operation block 302, the web browser 350 may receive user input requesting an HTML document or webpage located at a particular uniform resource locator (URL). The user input may be received via the user entering the address (e.g., URL, etc.) in an address bar, clicking on a link (hyperlink), issuing a voice command, interacting with an object in a virtual reality environment, etc.

In operation 304, the web browser 350 may request the HTML webpage from a web server 352 located at the address/URL via well-known hypertext transfer protocol (HTTP) or HTTP/2 messages communicated via the Internet. For example, the web browser 350 may generate and send a HTTP request message (e.g., a GET HTML Webpage message, etc.) to the web server 352. In some embodiments, the HTTP request message may include additional information (e.g., the user's preferred currency, etc.) that is suitable for customizing the requested HTML webpage.

In operation block 306, the web server 352 may dynamically generate the requested HTML webpage and/or retrieve the requested HTML webpage from storage (e.g., if it is a static webpage, if it has recently been cached, etc.). Increasingly, web pages and web resources are dynamically created. This may be because the web site uses a content management system (CMS) that generates the web resources on demand to ensure that the web resources are always up-to-date (e.g., the website owner may want to temporarily add a seasonal greeting to the top of every webpage, etc.). The web resource may be generated dynamically specifically for the user and/or based upon other information that has been obtained about the user (e.g., details of previous purchases, details of other websites that have been visited, details of adverts that the user has expressed an interest in by clicking on them, etc.). This type of dynamic personalization may be referred to as "hyper-personalization."

In operation 308, the web server 352 may send the generated or retrieved HTML webpage to the web browser 350. In operation block 310, the web browser 350 may parse the received HTML webpage to identify, discover, or determine the external or additional web resources (e.g., HTML, CSS, JavaScript®, JSON payloads, images, media, fonts, etc.) referenced within the HTML webpage. In operation block 312, the web browser 350 may request the identified resources from network servers where the resources are maintained, which may include the web server 352 that provided the HTML webpage or any other server accessible via the Internet.

For example, in operation 314, the web browser 350 may request a web resource that is referenced within the HTML webpage from the web server 352. In operation 316, the web server 352 may generate the web resource (if it is a dynamic resource) or retrieve the web resource from storage (if it is a static resource such as a photo of a product). In operation 318, the web server 352 may send the web resource to the web browser 350. The web browser 350 and web server 352 may perform the operations in operation block 312 (e.g., operations 314-318) for each of the resources referenced in the HTML webpage (i.e., the resources identified in operation 310). On a modern eCommerce website, the system may perform these operations hundreds of times for each HTML webpage.

In operation 320, the web browser 350 may combine the web resources to create a single structural model, such as a document object model (DOM) (which may include one or more shadow DOMs), that represents the contents, relationships, styles, and positions of various objects in the HTML code or which represents the HTML webpage as it is displayed to the user. As an example, the web browser 350 may use a XMLHttpRequest to retrieve JSON data that includes products details, and combine the retrieved JSON with the HTML webpage (which includes the webpage structure). The web browser 350 may also use JavaScript® to dynamically modify the HTML webpage and/or apply one or more style sheets (e.g., CSS) that specify how the parts of the HTML webpage are arranged, formatted, and stylized. The web browser 350 may generate a single structural model (e.g., DOM, etc.) that represents the HTML tags and their relationships via a tree structure that includes branches, nodes and leaves, in which each node and leaf is a HTML tag. The single structural model may be subsequently queried or modified as if it were a single all-encompassing webpage (e.g., using XPath, etc.). In operation 322, the web browser 350 may display the single structural model to the user.

It should be understood that the various embodiments described herein may use alternative protocols to HTTP (e.g., for the request and response operations 304, 308, 314, and 318), may request web resources in alternative formats to HTML (e.g., it may be a scalable vector graphics (SVG) format that is being requested by an virtual reality application in operation 304, it may be an XML format that is being requested by an application on a mobile device in operation 304, etc.), may use any form of data structure to represent the combined web resources (e.g., instead of a DOM, etc.), and may use alternative mark-up languages to HTML in order to represent web resources that are presented to the user (e.g., in operation 322, etc.). Thus, while the various embodiments are described with reference to specific protocols, standards or technologies, nothing in this application should be used to limit the claims to any protocol, standard or technology unless expressly recited as such in the claims.

Figure 4:
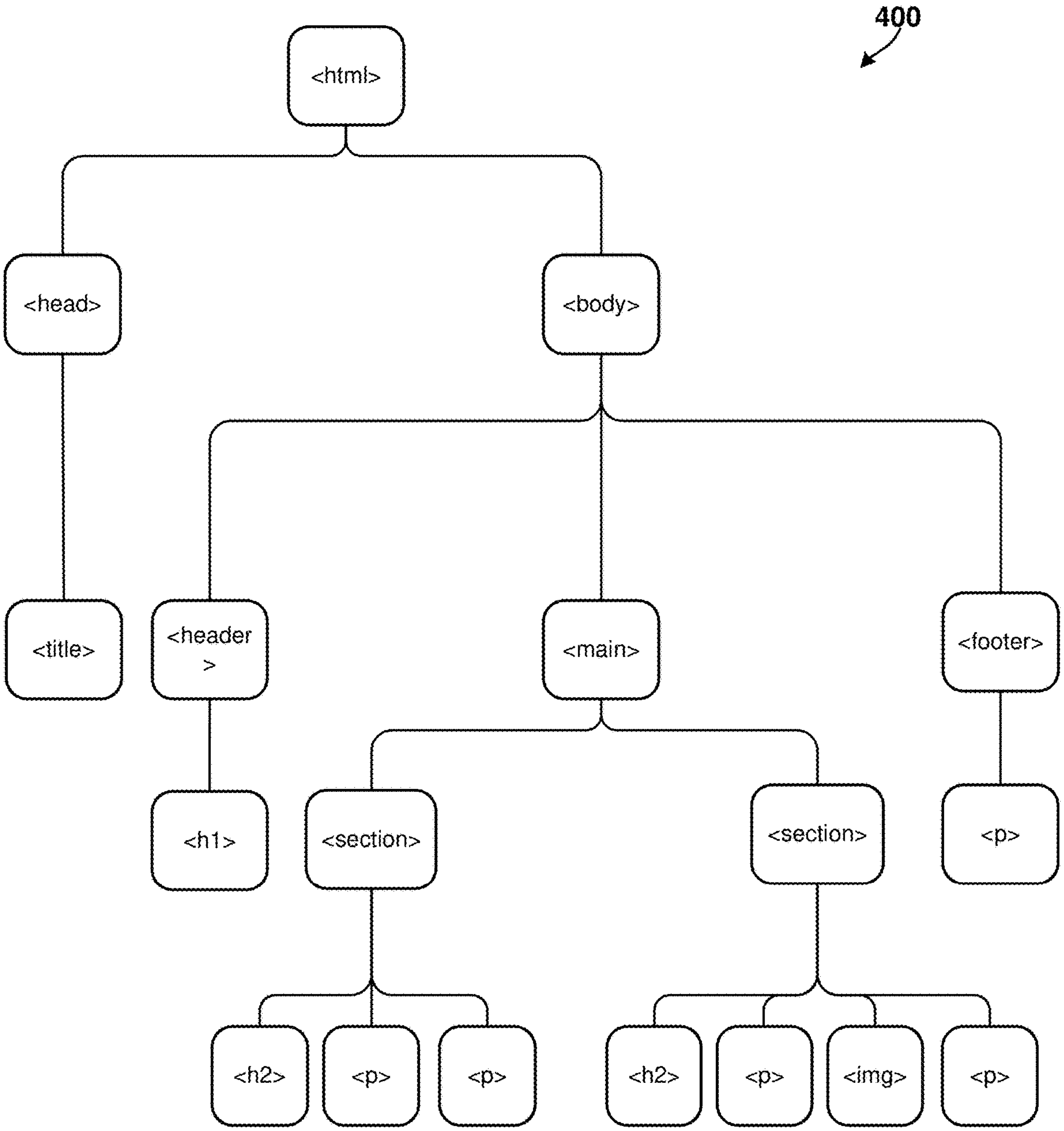
FIG. 4 is a component diagram that illustrates an example document object model (DOM) that could be generated and used by a computing device to evaluate how products are presented and sold on an eCommerce website in accordance with some embodiments.

FIG. 4 illustrates an example document object model (DOM) 400 that could be generated by a computing device in accordance with some embodiments (e.g., as part of method 300, etc.). In the example illustrated in FIG. 4, the DOM 400 represents an HTML webpage as a tree structure that include branches and nodes. Each node in the DOM 400 may be a HTML tag, such as the illustrated <head>, <title>, <body>, <header>, <h1>, <main>, <section>, <h2>, <p>, <img>, and <footer> HTML tags.

Just as product manufacturers, distributors, and resellers have always had an interest in understanding how products are presented and sold in traditional retail businesses, they also have the same interest in understanding how products are presented and sold on eCommerce websites. This understanding may be facilitated via answers to questions in relation to collection product pages and in relation to single product pages. Examples of the such questions in relation to collection product pages may include: is the product listed prominently (e.g., in the first row, above the fold, etc.); how much does the product cost; and are any of the products being promoted (e.g., with discounts or extra product). Examples of such questions in relation to single product pages may include: is the product in stock; is the summary description accurate; does the image match the summary description; and how much does the product cost. These questions could be answered by a human user looking at the product webpages (e.g., using a desktop web browser, etc.). However, this is extremely labor intensive, expensive, time consuming and not scalable. One solution that attempts to address this problem is known as screen scraping.

Figure 5:
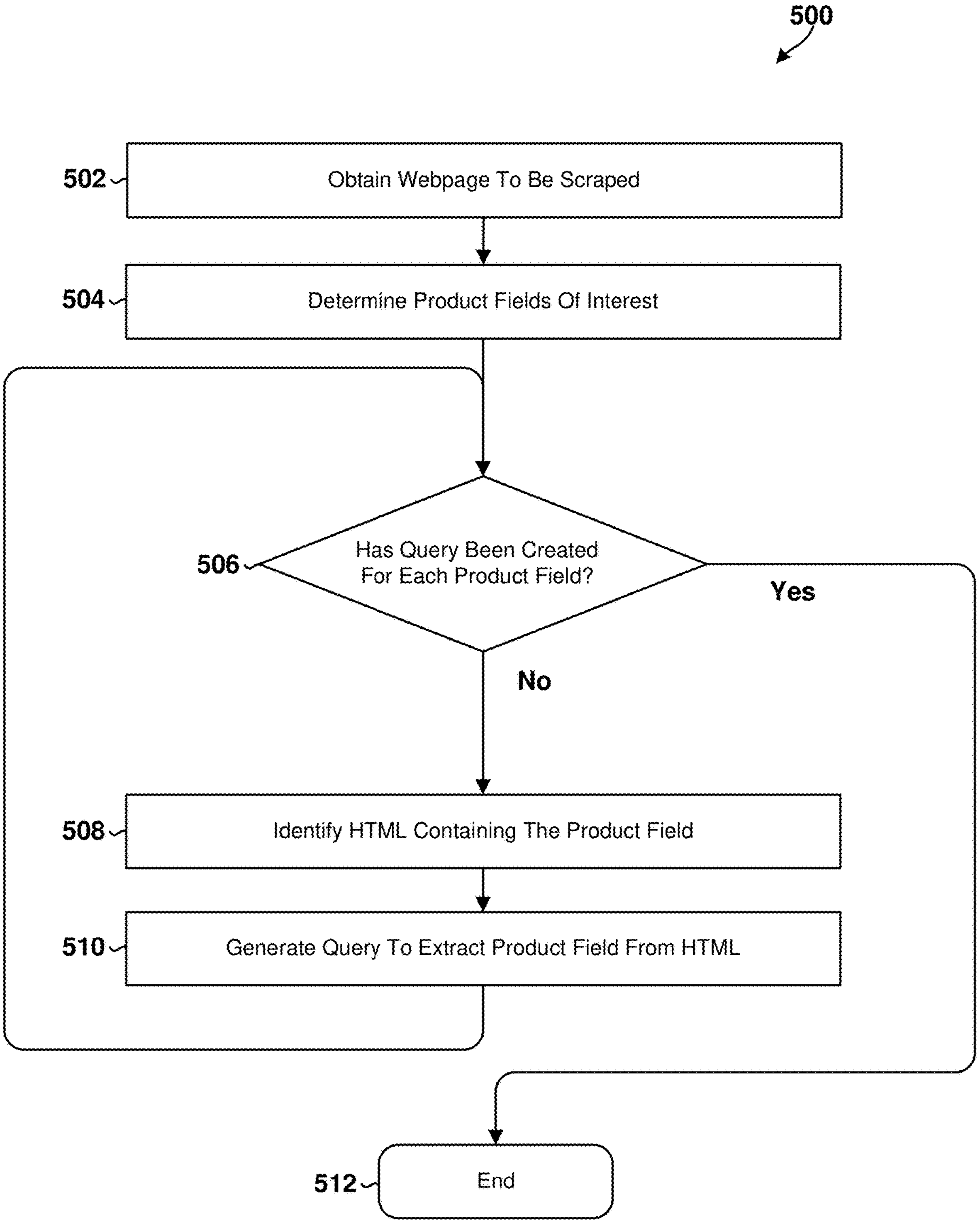
FIG. 5 is a process flow diagram that illustrates a screen scraping method for generating information suitable for use in understanding how products are presented and sold in accordance with some embodiments.

FIG. 5 illustrates an example screen scraping method 500 for generating information suitable for use in understanding how products are presented and sold in accordance with some embodiments. Method 500 may be performed by one or more processors in a computing device, such as computing device that includes a web browser 350.

In block 502, the computing device may obtain a webpage that is structurally similar or identical (i.e., in terms of its structural model or DOM) to the webpages that need to be scraped (e.g., to understand how products are presented and sold, etc.). In block 504, the computing device may identify the product fields (e.g., product name, unit price, summary description, etc.) that are of interest. In some embodiments, the computing device may identify the product fields that are of interest based on user input or visual inspection of the rendered webpage.

In determination block 506, the computing device may determine whether a query (e.g., XPath, CSS selector, regular expression, a parser, etc.) has already been created for each product field. These queries may identify product fields (e.g., specific substrings within strings, nodes within the DOM, values in binary data, etc.). In response to determining that a query has not been created for a product field (i.e., determination block 506="No"), the computing device may identify the HTML tags that include the product field in block 508. In block 510, the computing device may create a query that is specifically designed to extract the product field from the webpage. These queries may have the effect of codifying statements such as: "extract the text that appears between the first HTML <h1> tags that are immediately inside the first HTML <header> tags in the document," or "extract the text that appears between the second HTML <p> tags that are inside the second HTML <section> tags." The computing device may repeat the operations in block 506-510 until a query has been created for all of the identified product fields. In response to determining that a query has been created for all of the identified product fields (i.e., determination block 506="Yes"), the computing device may determine that no further processing is required, and exit or conclude performing method 500 in block 512.

There are some potential disadvantages to implementing or using the screen scraping method 500 illustrated and described with reference to FIG. 5. For example, the screen scraping method 500 may require that skilled software developers create the necessary queries for every type of webpage that is to be screen scraped. This means that it may not be possible to identify components and extract their values from a webpage of a type that has not been seen beforehand. Consequently, the onboarding of new webpages may become exceedingly slow and expensive. Another potential disadvantage is that any small change to the webpage may cause the query to fail in identifying and extracting the component values. Alternatively, a change to the webpage may cause the query to identify and extract the wrong component. In this case, the software would appear to be working fine, but producing inaccurate or useless information. The various embodiments described below overcome these and other potential disadvantages of the screen scraping method 500 illustrated and described with reference to FIG. 5.

There are various characteristics that may be used to identify collection product webpages and single product webpages, and subsequently segment them so that their product fields may be extracted more efficiently than screen scraping or by using existing or conventional solutions. In the context of a collection product webpage, perhaps the most significant characteristic is that there may be a structure (representing a single product) that is repeated numerous times. This structure may include product fields and it may be represented within the DOM as a sub-branch that repeats itself.

Figure 6:
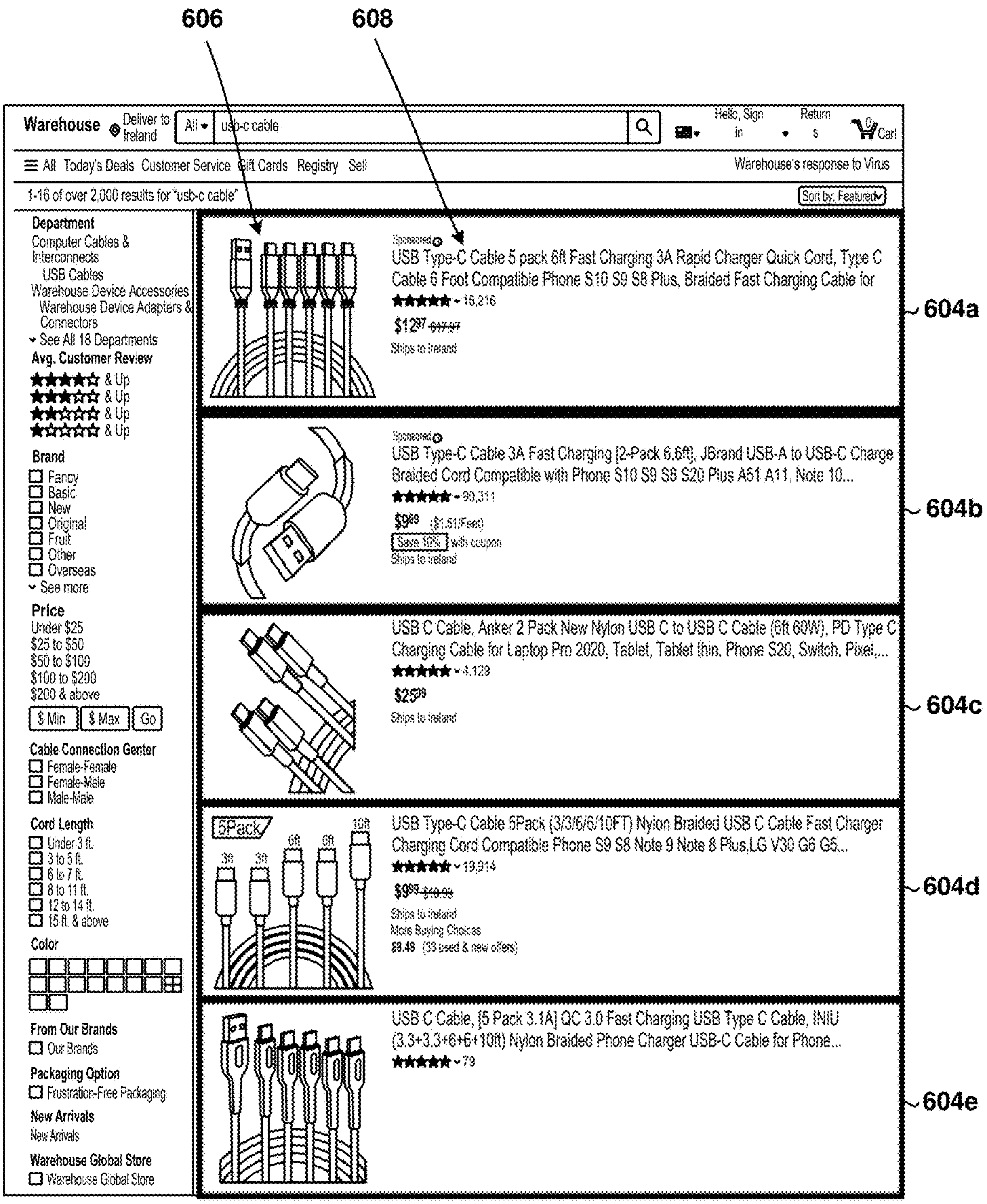
FIG. 6 is a component diagram that illustrates a collection product webpage that includes repeating structures that could be identified and used by a computing device to evaluate how products are presented and sold on an eCommerce website in accordance with some embodiments.

FIG. 6 illustrates a collection product webpage that includes repeating structures 604*a-e* that each represent a single product. Each structure 604*a-e* may include a plurality of product fields, such as a product image 606 and a product title 608.

Figure 7:
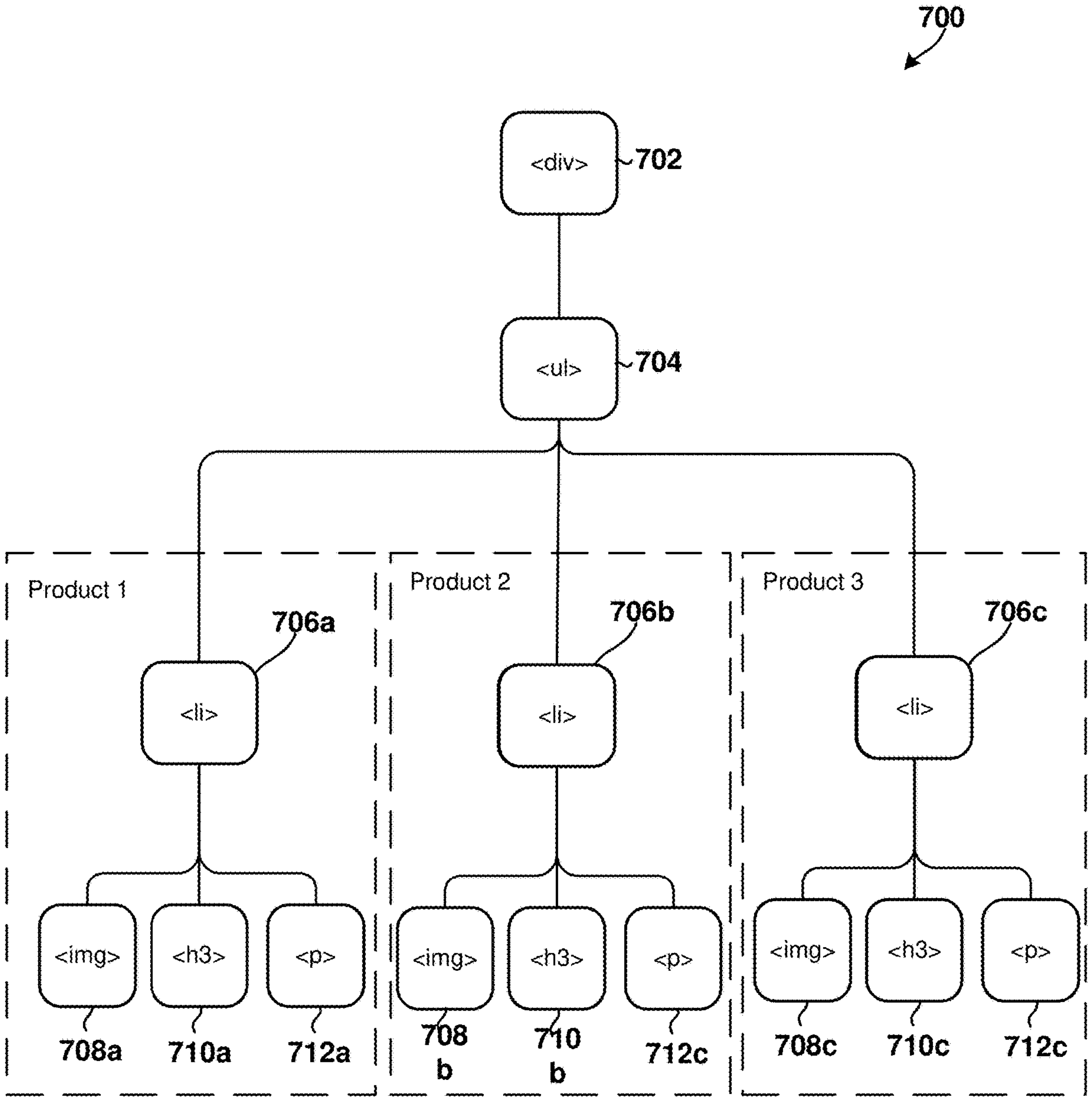
FIG. 7 is a component diagram that illustrates a subset of a document object model (DOM) of a collection product webpage that includes repeating structures that could be identified and used by a computing device to evaluate how products are presented and sold on an eCommerce website in accordance with some embodiments.

FIG. 7 illustrates a simplified subset of a DOM 700 for the collection product webpage illustrated in FIG. 6. The DOM 700 includes an HTML <div> node 702 that defines a division or a section in the HTML document, and an HTML <ul> node 704 that defines an unordered list of items (e.g., products 1-3) within that division/section. The <ul> node 704 includes an HTML list item <li> node 706*a-c* for each of the products. Each HTML <li> node 706*a-c* includes an HTML image <img> node 708*a-c*, HTML header <h2> node 710*a-c*, and HTML paragraph <p> node 712*a-c*.

Some embodiments may include a computing device (or web browser) that is configured to intelligently and efficiently determine that the DOM 700 includes a repeating product structure (e.g., HTML <li> nodes 706*a-c*) and/or that the HTML <li> nodes 706*a-c* correspond to repeating structures 604*a-c*. The computing device may efficiently extract the relevant product fields (e.g., product image 606, a product title 608, etc.) from the repeating product structure, and subsequently generate information that is suitable for use in understanding how a product is presented and sold on the collection product webpage.

Figure 8A:
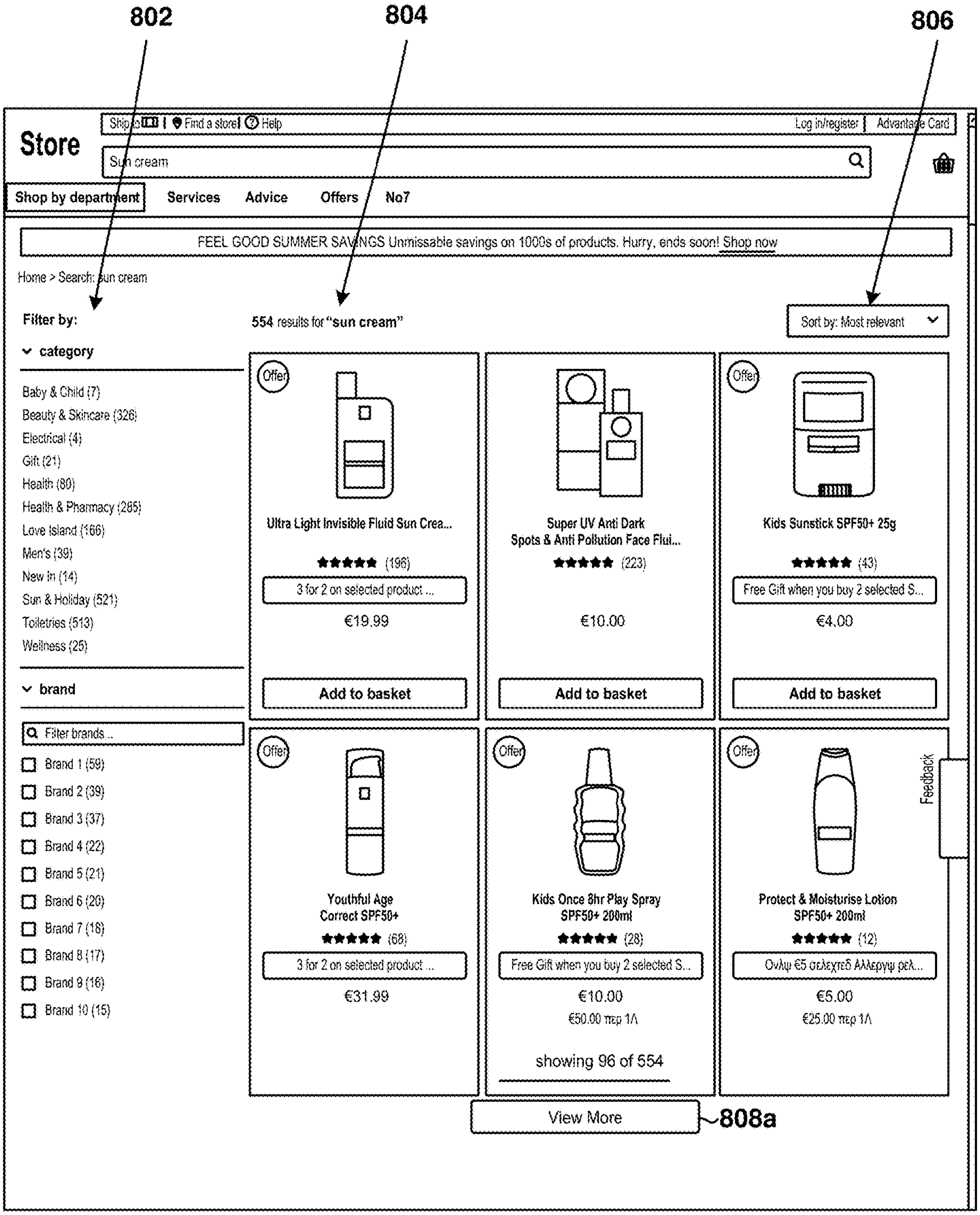
FIGS. 8A and 8B are component diagrams that illustrate collection product webpages that include various additional product fields that could be extracted, segmented, and used by a computing device to evaluate how products are presented and sold on an eCommerce website in accordance with some embodiments.
Figure 8B:
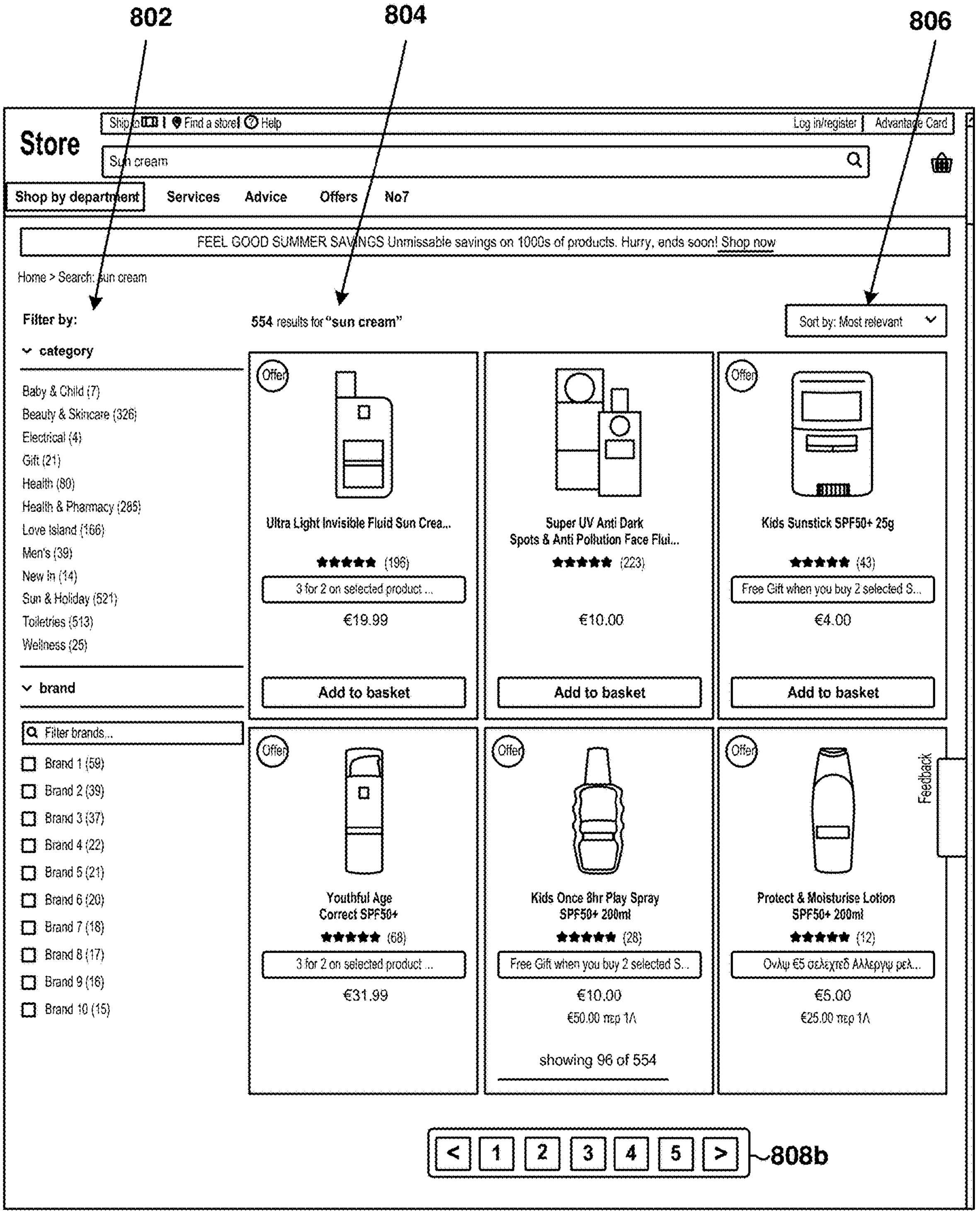

FIGS. 8A and 8B illustrate a collection product webpage that includes a filter 802 component, a total results 804 component, a sort 806 component, and a navigation panel 808 component. The filter 802 component may enable the viewer to reduce the number of products displayed. The total results 804 component may display the total number of products that match the current criteria. The sort 806 component may enable the user to set a preferred ordering of the products that are displayed (e.g., by relevance, price, rating). The navigation panel 808 component may offer the user a means of navigating to view more products within the collection that are displayed on different webpages. This may be necessary if the webpage viewport is not large enough to display all of the products at once. There may also be an option to display more or less products on each webpage other than the default number of products. In the example illustrated in FIG. 8A, the navigation panel 808*a* component is a "view more" button (e.g., similar to the "view more" button illustrated in FIG. 1A, etc.). In the example illustrated in FIG. 8B, the navigation panel 808*b* component is a page navigation component that shows the current page in relation to a number of adjacent pages.

Some of the repeating structures within the collection product webpage may represent products that are being promoted or that may be popular. Such products may appear together (often before any other products), may have different styling, may be associated with a specific HTML attribute, and may include specific keywords (e.g., "Sponsored," "Promotion," Special Offer," "Best Sellers," "Popular"). In some embodiments, the computing device may be configured to detect any or all of these characteristics based on a combination of the presence of specific characters (e.g., "<" and ">" for page navigation) and keywords (e.g., "filter," "sort," "previous" and "next" for page navigation), images, a repeating pattern in the DOM, and/or their location relative to the HTML tag that includes the repeating product structure.

In single product webpages, while there may be repeating structures within some of the unique branches of the DOM tree (e.g., relating to product variations, user reviews, etc.), there is generally no predominant or significant repeating structure in the DOM (i.e., there is no repeating branch structure closer to the root node of the DOM tree than the non-repeating nodes relating to a single product).

Figure 9:
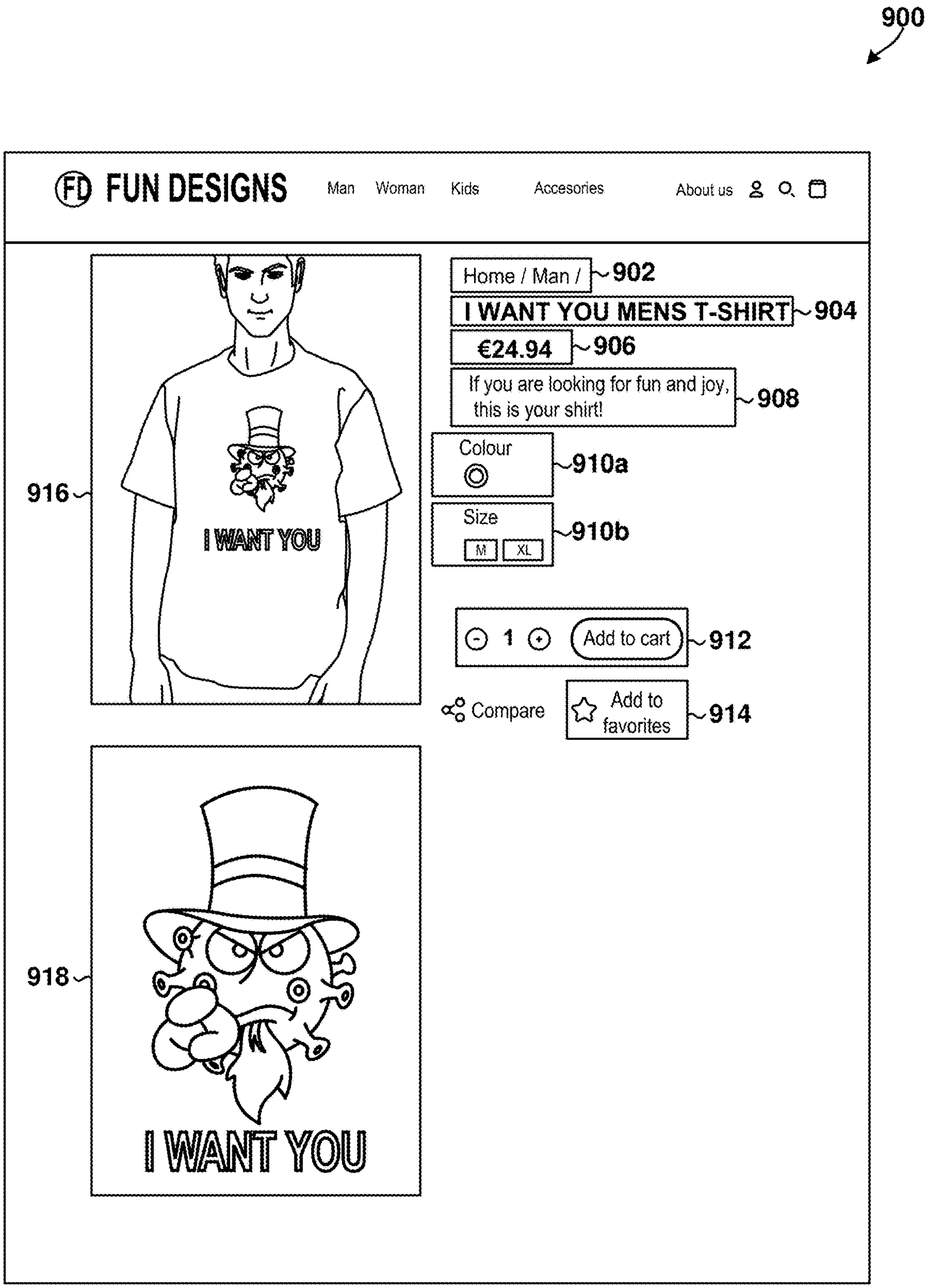
FIG. 9 is a component diagram that illustrates a single product webpage that includes various additional product fields that could be extracted, segmented, and used by a computing device to evaluate how products are presented and sold on an eCommerce website in accordance with some embodiments.

FIG. 9 illustrates a single product webpage 900 that includes various product fields, including a breadcrumb trail field 902, a product name field 904, a product price field 906, a product summary description field 908, a product variation field 910, a product purchase control field 912, a favorites control field 914, a main product image field 916, and an alternative product image field 918. While not expressly illustrated in FIG. 9, a single product webpage may also include a product unit price field, a previous product price field, an offer product price field, a product stock number field, a product stock level field, a detailed product information field, a product user rating field, a user review field, and/or other additional fields that include information about product variants, complementary products, recommended products, and/or which provide additional presentation attributes or cues.

The breadcrumb trail field 902, product name field 904 and/or product price field 906 may act as a central point, or anchor, on the webpage. Accordingly, in some embodiments, the computing device may be configured to determine or evaluate the characteristics of all or many of the product fields in the single product webpage 900 based on their proximity to a central point (e.g., the breadcrumb trail field 902, product name field 904, product price field 906, etc.). In some embodiments, the computing device may be configured to determine the proximity between two product fields or two HTML tags/elements based on the distance between them within the DOM. For example, two HTML tags may have a distance of one (1) if they are immediately adjacent to each other in the same level of the DOM (e.g., the HTML <img> tag 708 and the HTML <h3> tag 710 with reference to FIG. 7). Two HTML tags may have a distance of two (2) if they are separated from each other in the same level of the DOM by one other HTML tag (e.g., the HTML <img> tag 708 and the HTML <p> tag 712 with reference to FIG. 7, etc.). Further, the different layers in the DOM could be associated with different weights to relate the distances between HTML tags (e.g., the HTML <img> tag 708 and the HTML <li> tag> 706 with reference to FIG. 7 may be a distance of 0.5 from each other because they are child and parent, etc.). Alternatively, the proximity between two HTML elements may be calculated as the distance between them when they are rendered for display (e.g., measured in pixels, etc.). In some embodiments, the distance between two HTML tags may be determined based on the Euclidian distance between the centers of their bounding boxes, or the minimum distance between the edges of their bounding boxes.

The breadcrumb trail field 902 may identify how the product fits into a hierarchy. The layers in the hierarchy may be separated using a single symbol, image, or character (e.g., ">," "-", "/," etc.).

The product name field 904 is generally the largest text on the page, located at the top of a column of information, and is in close proximity to the main product image field 916. The text used for the product name field 904 may be styled in a different way than the surrounding text (e.g., bold, italic, etc.). The product name field 904 may include a primary attribute of the product (e.g., its size, measurement, style, color, etc.) and/or information about the product manufacturer.

The product price field 906 may be located in close proximity to the product name field 904 and/or the product summary description field 908. The product price field 906 may include a number and a recognized currency symbol (e.g., $, $, £, etc.), which may appear together under a common parent in the DOM. The currency symbol may be directly included in the rendered HTML, and it may be included using an entity reference (e.g., "€" for "€," etc.). The text of the product price field 906 may be displayed using a different font, color, and font size relative to the rest of the text on the webpage.

The product summary description field 908 may include several sentences, and it may be displayed using the same font, color, and font size as the rest of the text on the webpage.

The product variation fields 910*a-b* may include controls that enable the user to change the product size and/or color, and this may result in changes to other product fields (e.g., the product price, the product stock level, the product images, etc.).

The product purchase control field 912 may allow one or more instances of the product to be purchased, and the favorites control field 914 may allow the product to be stored for later retrieval. These control fields 912, 914 are typically located in close proximity to the product price field 906, and they are often implemented using a HTML form (i.e., there may be a HTML <form> tag). Other means of identifying these control fields 912, 914 include: identifying a link that has a single product identifier encoded within it (e.g., a HTTP GET request with a product stock number parameter, etc.), an input control (e.g., a button, etc.) that is part of the HTML form that submits data to the web server when activated (e.g., using a HTTP POST request, etc.), and a code (e.g., JavaScript®, etc.) event associated with a control that is triggered by the webpage viewer by interacting with the control field 912, 914 (e.g., by clicking on button, etc.) that causes product details to be stored within the web browser (e.g., within a cookie, etc.) or transferred to the web server. The control fields 912, 914 may be displayed using a different font, color, and font size relative to the rest of the text on the webpage, and it may include a synonym for purchasing the products (e.g., "Add to Cart," "Purchase," "Buy Now," "Checkout," etc.).

The main product image field 916 may be displayed prominently, and it may be the largest image in the webpage. The main product image field 916 is typically displayed in close proximity (e.g., to the side, etc.) of the product name field 904 and product price field 906 when the webpage is displayed on a wide screen. The main product image field 916 may also be identified by the presence of a mechanism that enables the webpage viewer to zoom in and out of the image.

There may also be alternative product image fields 918. These may be statically displayed on the webpage (as is illustrated in FIG. 9), or they may dynamically replace the main product image field 916 when they are selected, clicked, or activated. The alternative product image fields 918 may be the same size as the main product image field 916. The alternative product image fields 918 may include animated images, videos, and interactive 3D models representing the product. The webpage viewer may be able to navigate through the alternative product image fields 918, and there may be smaller versions of the alternative product image fields 918 arranged in a linear manner adjacent to the main product image field 916 (e.g., the alternative product images may be to the left of the main product image, etc.).

There may be metadata associated with the main product image field 916 and/or the alternative product image field 918 (e.g., HTML <img>"alt" or "title" attributes including text describing the images for visually impaired users, EXIF information embedded within the images, etc.).

As mentioned above, while not expressly illustrated in FIG. 9, the single product webpage 900 may also include a product unit price field, a previous product price field, an offer product price field, a product stock number field, product stock level field, detailed product information field, product user rating field, etc.

A product unit price field may include a number, a recognized currency symbol, a recognized divisor character, symbol, or word (e.g., "/," "per"), and a recognized unit (e.g., kg, ml), any or all of which may appear together under a common parent in the DOM.

A previous product price field may include the regular or original price of the produce (e.g., the product price field 906 may identify a special discount or sale price). There may be a mathematical relationship between the values of product price field 906 and the previous product price field (e.g., they may be within 50% of each other, etc.). The previous product price field may be in close proximity to the product price field 906, and they may be together under a common parent in the DOM. The text of the previous product price field may be displayed using a different font, color, and font size relative to the rest of the text on the webpage. In particular, the previous product text may be struck out (e.g., using the CSS "line-through" text decoration).

An offer product price field may indicate a discount if multiple instances of the product are bought together, if the product is bought in conjunction with another product, etc. The offer product price field may be in close proximity to the product price field 906, and they may be together under a common parent in the DOM. The offer product price field may include specific characters and words (e.g., "%," "discount," "offer," special"), and they may be displayed using a different font, color, and font size relative to the rest of the text on the webpage.

A product stock number field may include a number that uniquely identifies the product (e.g., a stock keeping unit (SKU), a global trade item number (GTIN), an amazon standard identification number (ASIN), etc.). The product stock number field may be in close proximity to the product name field 904 or product price field 906, and it may have a very well-defined structure (e.g., a fixed number of digits, etc.). If displayed, the product stock number field may use a font size that is smaller than the font size that is used for the rest of the text on the webpage. Additionally, the product stock number field may be displayed within the main product image field 916. Even if the product stock number field is not displayed, it may still be present in the DOM (e.g., within the main product image URL, within the purchase control link, as part of a computational event that is associated with activating a product field, etc.).

A product stock level field may indicate whether the product is currently in stock and/or may report the number of products in-stock. The product stock level field may be in close proximity to the product price field 906, and they may be together under a common parent in the DOM. The product stock level field may include digits and specific words (e.g., "units," stock," etc.), and it may be displayed using a different font, color, and font size relative to the rest of the text on the webpage.

A detailed product information field may describe the product's features and benefits, ingredients, usage information, regulatory and legal compliancy details, safety warnings, manufacturing details, etc. The detailed product information field may also include information relating to the product supplier, distributor, manufacturer, and country of origin. The detailed product information field may include the most text, and may be displayed using the same font, color, and font size as the rest of the text on the webpage. The detailed product information field may be a branch in the DOM, where its children are sections with headings, text (e.g., there may be sections for "specification," "requirements," and "warranty" on a webpage for an electrical product, etc.), and tables.

A product user rating field may include a single number (that may be expressed as a fraction or a percentage), and it may also include a series of repeating identical images (e.g., stars, etc.). It may also indicate the total number of reviews that the product has received. All of these characteristics may be in close proximity to each other, and they may be in close proximity to the product name field 904 and product price field 906. The product user rating text may be displayed using a different font, color, and font size relative to the rest of the text on the webpage.

A user review field may include user reviews of the product, which are typically not located near the top of the webpage. The user review fields may be represented using a structure (representing a single review) that is repeated numerous times (e.g., in the DOM, etc.). The use user review fields may be a supporting product field that is represented as a series of key-value pairs.

A single product webpage may enable a user to submit a review of the product. This is typically not located near the top of the webpage, and it may include an input mechanism (e.g., a HTML form, etc.) that enables the webpage viewer to select a rating, submit freeform text, and submit one or more photos. There may be a button with a label such as "Submit," that may trigger the form to be sent to the web server. There may also be special characters associated with the product review (e.g., "–", "+," "<," ">," etc.).

A single product webpage may also include information about product variants (e.g., different styles of men's t-shirts, etc.), complementary products (e.g., lens filters, etc.), and recommended products. These may be represented using a structure (representing a single product) that is repeated numerous times, as described in the context of a collection product page.

Some of the above-described product fields may only be found in one type of webpage (e.g., collection product page, collection promotion webpage, collection brand webpage, single product page, etc.). Others (e.g., the product name field 904, etc.) may be found in multiple types of pages. In either case, all or many of the product fields (and characteristics of the webpage) may be identified by a pattern in the DOM, and their locations relative to other product fields on the rendered webpage. Some of the product details may be located within a popup window that is associated with the product field. For example, the requirements necessary to avail of the offer product price may appear in a popup window that appears when the webpage viewer hovers the mouse over the offer product price.

The number of values for the product fields may be equal to the number of products on the collection product webpage in which the product features and some of the product fields may be unique (e.g., the product name field 904, etc.).

In embodiments in which the product fields are presented to the user using a means other than a screen, there may be additional presentation attributes or cues that could be used to identify the product fields. For example, if the webpage is being presented in an audio format to a user, then the product name field 904 may be presented using a different voice, a different pitch of the same voice, or a different volume of the same voice. If the webpage is being presented to the user in a VR format, then the product name field 904 may be presented in a spatially prominent manner.

In some embodiments, the computing device may be configured to first identify the type of webpage, and subsequently identify the product fields (if necessary). For example, the identification of individual product fields may not be necessary if the computing device determines that a webpage is a collection product webpage. In this case, the identification of a repeating pattern within a single section may be sufficient for the analysis and/or performance of the various methods disclosed throughout this application.

In some embodiments, the computing device may be configured to identify the product fields first, and subsequently use the product fields to identify the type of webpage. For example, the computing device may use information included in a breadcrumb trail field to determine if the webpage is a single product webpage.

Figure 10A:
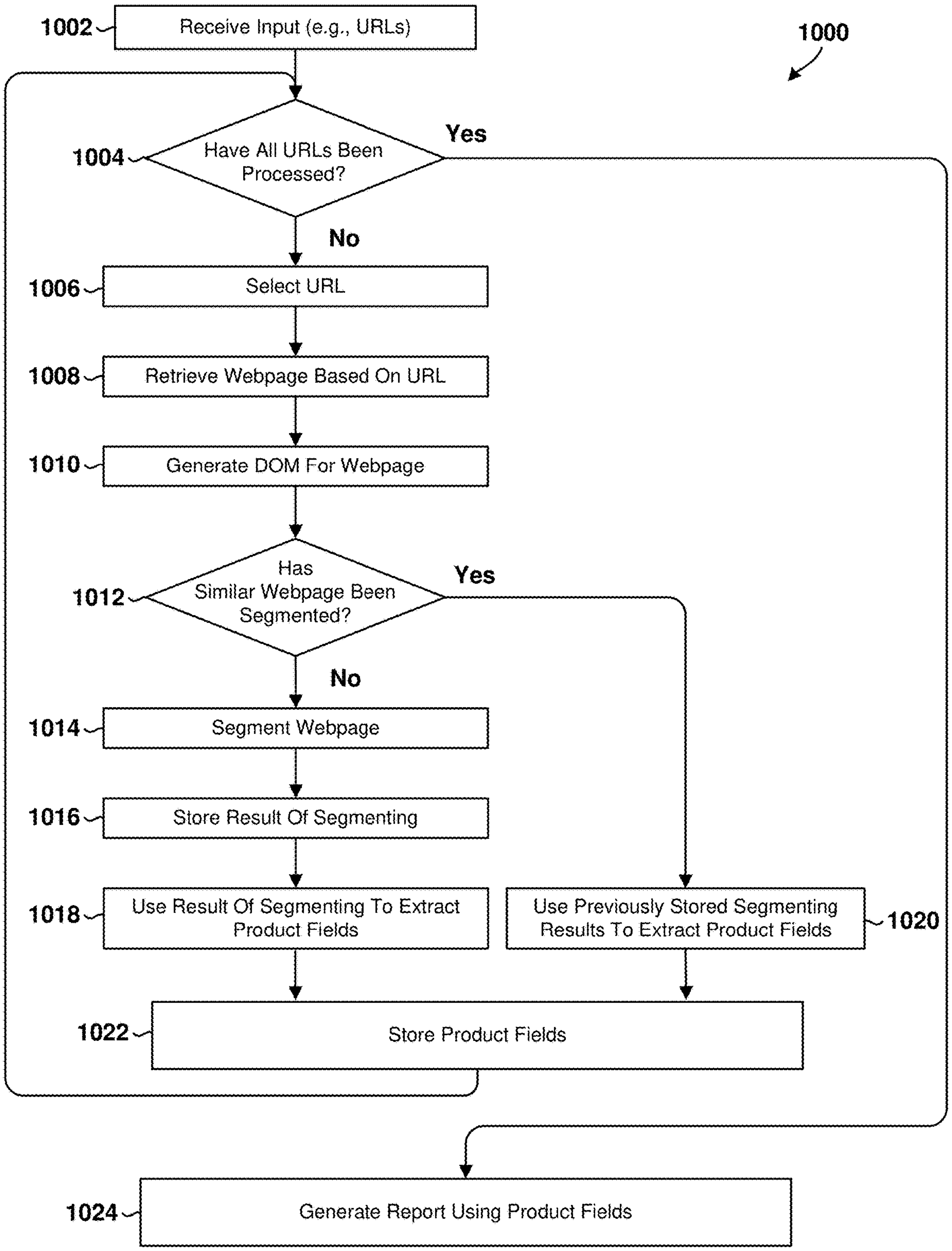
FIGS. 10A and 10B are process flow diagrams that illustrate methods of segmenting and extracting product information (product fields) from product webpages on an eCommerce website in accordance with some embodiments.
Figure 10B:
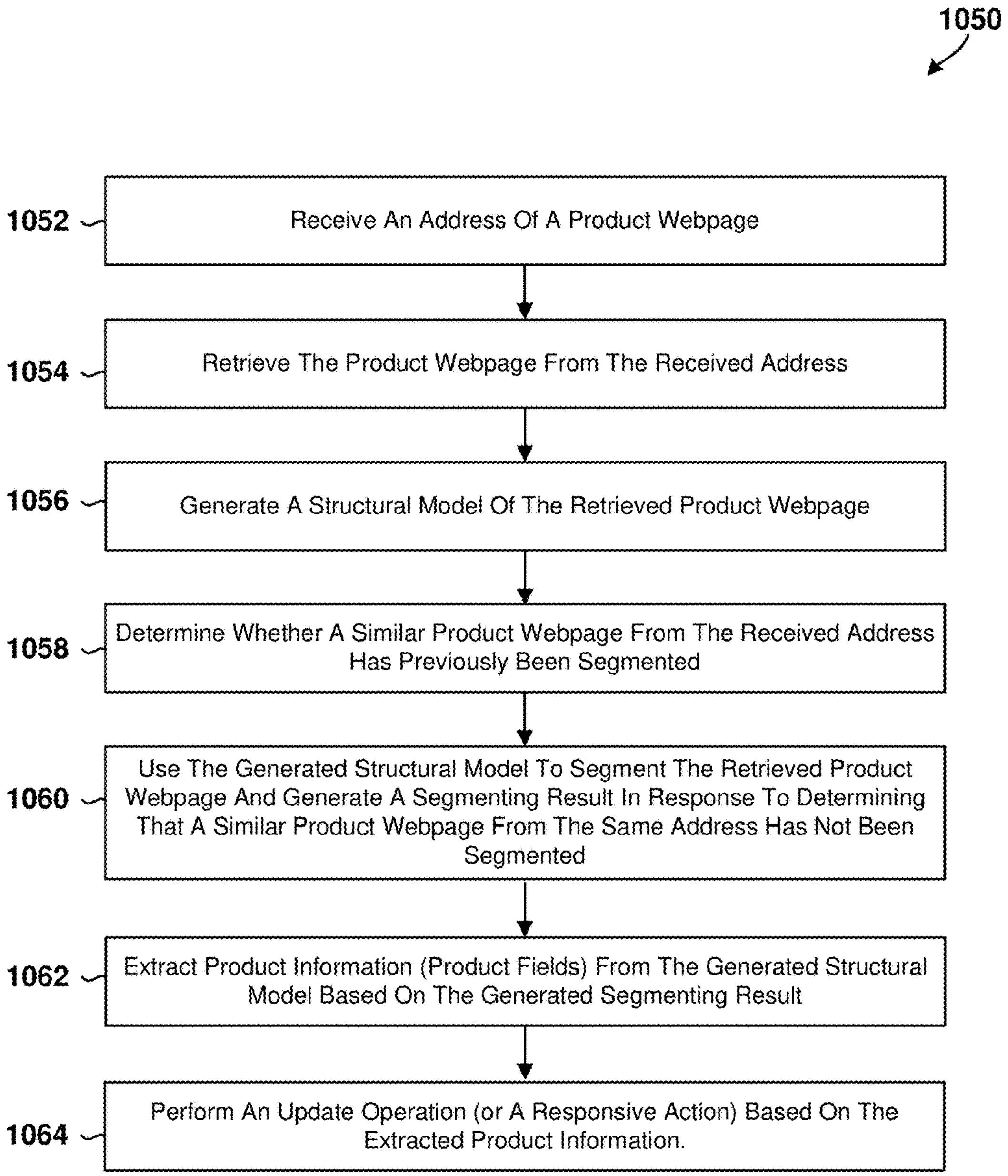

FIGS. 10A and 10B illustrate methods 1000, 1050 of determining the product fields in a webpage, including segmenting and extracting product information (i.e., one or more product fields, etc.) from product webpages on an eCommerce website, in accordance with some embodiments. Methods 1000, 1050 may be performed by one or more processors in a computing device, such as a computing device that includes a web browser 350.

With reference to FIG. 10A, in block 1002, the computing device may receive user input (e.g., from a product or brand manager, a software developer, etc.) in the form of one or more URLs (e.g., an address of a product webpage, a plurality of web addresses, etc.). The URLs may identify one or more websites, and they may be entered into a web portal or provided using an application programming interface (API).

In determination block 1004, the computing device may determine whether all the URLs included in the received user input have previously been processed (e.g., segmented to extract product fields, etc.). For example, in some embodiments, in determination block 1004, the computing device may determine whether product information (e.g., one or more product fields, etc.) has previously been extracted from a product webpage from a web address in the plurality of web addresses included in the received user input.

In response to determining that not all of the URLs included in the received user input have been previously processed (i.e., determination block 1004="No"), the computing device may select a not-yet-processed URL in block 1006. In block 1008, the computing device may retrieve a webpage based on the selected URL (e.g., using a HTTP request, using a WebSocket, etc.). In some embodiments, in block 1006 and 1008, the computing device may retrieve a product webpage from the received web address in response to determining that product information has not previously been extracted from the product webpage from the web address in the plurality of web addresses included in the received user input. In some embodiments, as part of the operations in block 1008, the computing device may retrieve all of the web resources referenced in the retrieved webpage (as described with reference to block 312 of FIG. 3).

In block 1010, the computing device may generate a DOM (or another single structural model) for the retrieved webpage. That is, the computing device may generate a structural model of the retrieved product webpage in block 1010. The generated structural model may include nodes that represent the product fields. The generated structural model may identify the components (e.g., nodes that represent HTML tags that include the product fields, etc.), relative structure, relationships, and behavior of the respective components (e.g., nodes, etc.) that define the retrieved product webpage. In some embodiments, the computing device may also render the resulting webpage (e.g., on an electronic display of the computing device, etc.) in block 1010.

In determination block 1012, the computing device may determine whether a similar webpage from the website in the URL has been previously segmented. In some embodiments, the computing device may determine whether a similar webpage from the website in the URL has been previously segmented by determining whether all or portions of the generated structural model matches all or portions of a stored structural model of another webpage retrieved from the web address. The computing device may determine that the generated structural model matches the stored structural model by determining that they include the same nodes and the same structure, but different values for the product fields.

In response to determining that a similar webpage has been previously segmented (i.e., determination block 1012="Yes"), the computing device may use previously stored segmenting results (e.g., the mappings from the locations in the DOM to the product fields, etc.) to extract the product fields from the retrieved webpage in block 1020. In some embodiments, in block 1020 the computing device may extract product information from the generated structural model based on a previously stored mapping of nodes in the stored structural model to the product fields in response to determining that the generated structural model matches the stored structural model of another webpage retrieved from the web address.

In response to determining that a similar webpage has not been previously segmented (i.e., determination block 1012="No"), the computing device may segment the retrieved webpage in block 1014. That is, the computing device may use the generated structural model (DOM) to segment the retrieved product webpage and generate a segmenting result in response to determining that a similar product webpage from the same address has not been segmented. In some embodiments, in block 1014, the computing device may generate a mapping of the nodes in the generated structural model to the product fields (segmenting results), and extract the product information from the generated structural model based on the generated mapping (segmenting results), in response to determining that the generated structural model does not match the stored structural model of another webpage retrieved from the web address. In some embodiments, as part of the operations in block 1014, the computing device may use one or more of a plurality of suitable or available identification or query mechanisms, techniques or technologies (e.g., XPath, etc.) to determine, identify, and/or represent locations in the DOM for the retrieved webpage.

In some embodiments, the computing device may be configured to use multiple or different techniques to identify a single location in the DOM (e.g., the HTML <h3> tag 710 in FIG. 7 may be identified as either a <h3> tag 710 inside a <li> tag 706 or as a <h3> tag 710 immediately after an <img> tag 708, the HTML <h3> tag 710 may be identified based on a unique HTML "id" attribute associated with it, etc.).

In some embodiments, the computing device may be configured to determine the efficiency of the available identification or query mechanisms (e.g., based upon its complexity and consequently the time taken to locate a tag, based upon the number of web resources that need to be retrieved in order to build the location in the DOM, etc.), and use the most efficient (e.g., most computationally efficient (e.g., least CPU and memory, least time, etc.), etc.) identification or query mechanism. For example, the computing device may determine whether an HTML tag includes a unique "id" attribute. If so, the computing device may determine, identify, and/or represent the location of the HTML tag in the DOM based on the HTML tag's unique "id" attribute. If not, the computing device may identify the location of the HTML tag based on the nearest HTML tag that does have a HTML "id" attribute.

In some embodiments, the computing device may be configured to use two or more identification or query mechanisms to identify a single location in the DOM. This has the advantage that if one of the identification or query mechanisms fails (e.g., the HTML "id" attribute cannot be found, etc.), then an alternative identification or query mechanism may be used (e.g., XPath, etc.). In some embodiments, the computing device may be configured to use the most efficient identification or query mechanism first, and then use progressively less efficient identification or query mechanisms as the more efficient identification or query mechanism fail.

Returning to FIG. 10A, in block 1016, the computing device may store the result of the segmenting (e.g., the mappings from the locations in the DOM to the product fields, etc.) for future use. In block 1018, the computing device may use the result of the segmenting (e.g., mappings, etc.) to extract product information (e.g., product fields, product field values, etc.) from the DOM (e.g., using XPath, etc.). In block 1022, the computing device may store the extracted product fields in memory. The computing device may then perform the operations in blocks 1004-1022 until it determines that all the URLs included in the received user input have been processed (e.g., segmented to extract product fields, etc.) and/or stored in memory.

In response to determining that all the URLs included in the received user input have been processed (i.e., determination block 1004="Yes"), the computing device may generate a report in block 1024 that includes the extracted product fields for each webpage that was segmented. In some embodiments, the computing device may generate the report as a machine-readable file (e.g., a CSV file, etc.) and/or as a human readable file.

In some embodiments, in bock 1024, the computing device may perform a responsive action based on the generated report. For example, the computing device may generate an updated webpage based on the extracted product information and send the updated webpage to a second computing device for display on an electronic display of the second computing device.

As another example, if the report generated in block 1024 indicates that a product price is less than a threshold percentage of the average product price across multiple competitors' websites, the computing device may determine that there is a high probability that the product price is incorrect or that the product is in fact a counterfeit product. In response, the computing device may perform various operations to immediately freeze sales of the product in bock 1024.

As yet another example, the computing device may generate and send an alert to a website owner in response to determining that the report generated in block 1024 indicates that a competitor offers a promotional or discounted product price for a market leading product. Alternatively or in addition, in response to determining that the report generated in block 1024 indicates that a competitor offers a promotional or discounted product price for a market leading product, the computing device may automatically adjust the pricing on the website in order to offer a matching or improved offer for the same market leading product.

In some embodiments, the computing device may be further configured to store the URLs that are of interest (e.g., using a web interface to a portal) in memory.

In some embodiments, the computing device may be further configured to determine the frequency in which the webpages should be scanned based on user input.

In some embodiments, the computing device may be further configured to determine the product fields that are of interest based on user input (e.g., a user may only be interested in analyzing the product name and product price, etc.).

With reference to FIG. 10B, in block 1052, the computing device may receive an address of a product webpage. In block 1054, the computing device may retrieve the product webpage from the received address. In block 1056, the computing device may generate a structural model of the retrieved product webpage. In block 1058, the computing device may determine whether a similar product webpage from the received address has previously been segmented. In block 1060, the computing device may use the generated structural model to segment the retrieved product webpage and generate a segmenting result in response to determining that a similar product webpage from the same address has not been segmented. In block 1062, the computing device may extract product information from the generated structural model based on the generated segmenting result.

In block 1064, the computing device may perform an update operation (or any responsive action discussed in this application) based on the extracted product information. For example, the computing device may generate an updated webpage based on the extracted product information (extracted product fields, etc.), and send the updated webpage to a second computing device for display on an electronic display of the second computing device. As another example, the computing device may generate a communication message that includes information suitable for causing a web server to generate an updated product webpage based on the extracted product information. As further examples, the computing device may generate a communication message that includes information suitable for causing a third-party server to dynamically adjust any or all of pricing information, supply chain information, advertising spend information, targeting information, counterfeit labels/classifications, manufacturing information, customer demand information, raw material order information, etc.

In some embodiments, performing an update operation in block 1064 may include generating an updated webpage based on the extracted product information (extracted product fields, etc.), and sending the updated webpage to a second computing device for display on an electronic display of the second computing device.

Figure 11:
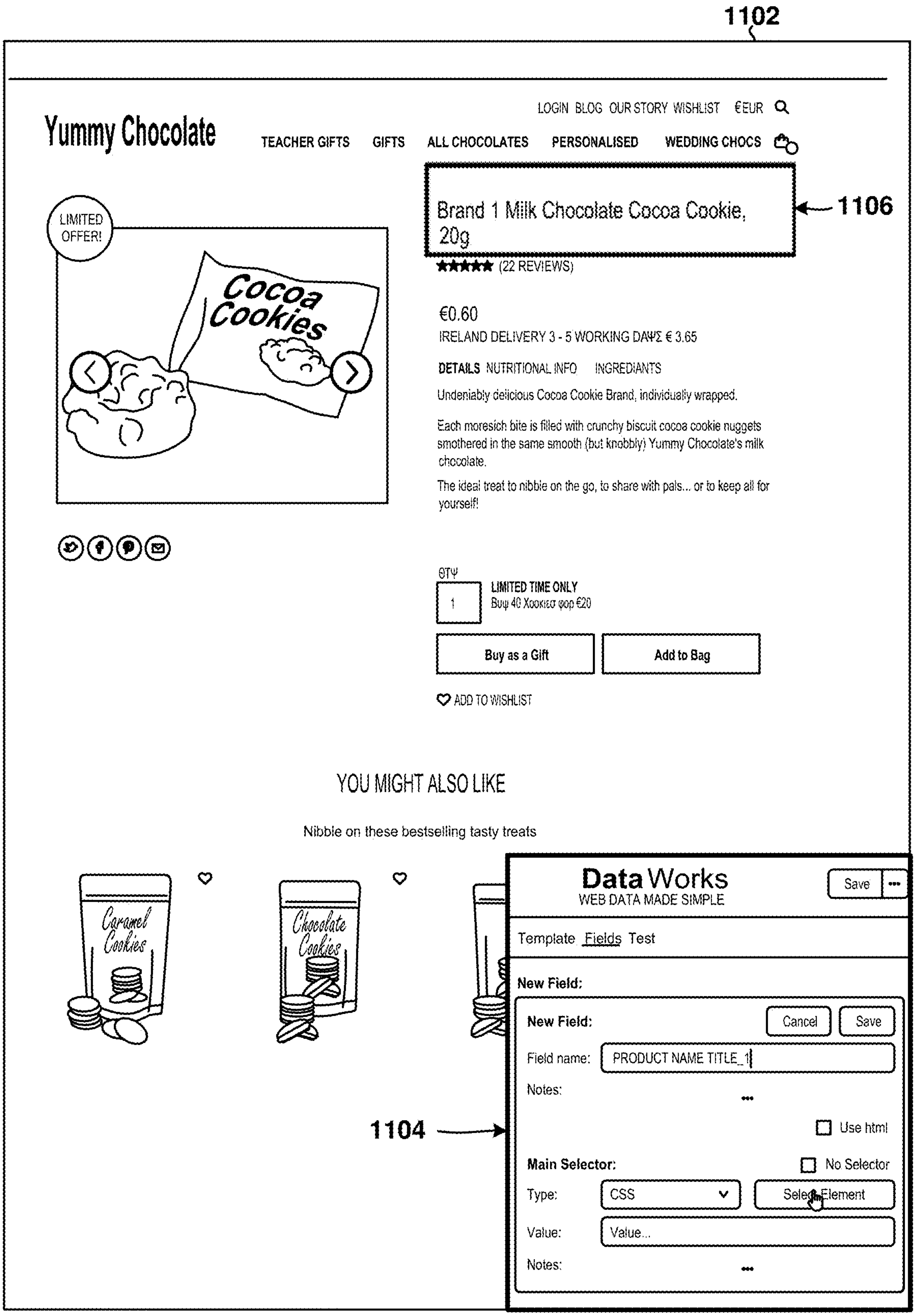
FIG. 11 is a component diagram that illustrates a dialogue box that could be superimposed on a product webpage and used to collect information suitable for implementing the various embodiments.

FIG. 11 illustrates that the computing device may superimpose a dialogue box 1104 on a product webpage 1102. The dialogue box 1104 may allow a user to graphically select the product fields that are of interest (e.g., using a bounding box) and assign various value or properties to the product fields. In the example illustrated in FIG. 11, the user has selected the product name field 1106, and has indicated that the product name field 1106 be presented as a field called "PRODUCT NAME TITLE_1" in the report.

In some embodiments, the computing device may be configured to allow a user to associate a condition with a product field in a webpage that causes an alert (e.g., send an alert if the product is reported as being out-of-stock, send an alert if the product moves to a lower row in a collection product webpage, etc.).

For example, the computing device may allow a user to set alerts based upon changes to the extracted product fields (e.g., send an alert if a product price has changed since the previous segmentation, etc.). To accomplish this, the computing device may allow the user to identify a subset of the product information that is of interest (i.e., one or more product fields), and store the identified subset after it is extracted. The next time that the computing device extracts the same or similar subset of information from the webpage, it may compare the extracted and stored subsets of product information to determine whether there are differences and/or whether there have been changes to the extracted subsets of product information. The computing device may send an alert in response to determining that there are differences/changes.

Figure 12:
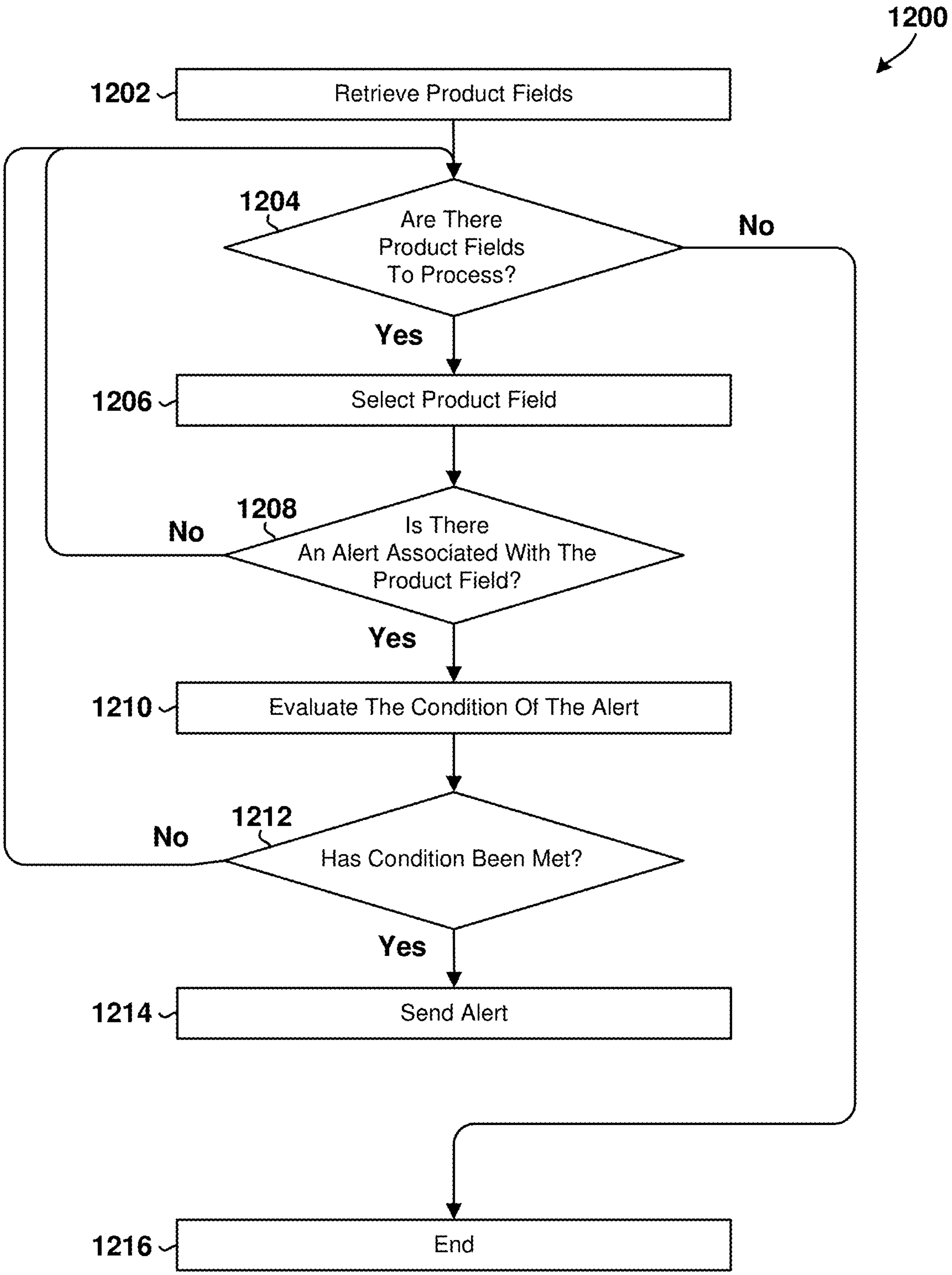
FIG. 12 is a process flow diagram that illustrates a method of setting and sending alerts based on extracted product fields in accordance with some embodiments.

FIG. 12 illustrates a method 1200 of setting and sending alerts (e.g., email alerts, chat messages in an alerts channel, etc.) based on extracted product fields (e.g., as part of block 1018 or 1020 in FIG. 10A, etc.) in accordance with some embodiments. Method 1200 may be performed by one or more processors in a computing device, such as a computing device that includes a web browser 350.

In block 1202, the computing device may retrieve extracted product fields (e.g., from memory, stored as part of block 1022 in FIG. 10A). In determination block 1204, the computing device may determine whether there are product fields to process. In response to determining that there are no more product fields to process (i.e., determination block 1204="No"), the computing device may terminate, exit or end the method in block 1216. In response to determining that there are product fields to process (i.e., determination block 1204="Yes"), the computing device may select a product field in block 1206.

In determination block 1208, the computing device may determine whether an alert has previously been set against the product field. In response to determining that an alert has not previously been set against the product field (i.e., determination block 1208="No"), the computing device may determine whether there are any more product fields to process in determination block 1204. Thus, if no alert was previously set against the product field in operation 1208, then no further action is taken for that product field. On the other hand, in response to determining that an alert has previously been set against the product field (i.e., determination block 1208="Yes"), the computing device may evaluate the product field against the condition (e.g., is product out-of-stock, did product move to a lower row in a collection product webpage, etc.) of the alert in block 1210.

In determination block 1212, the computing device may determine whether the condition has been met (i.e., is true, positive, etc.). Determining whether the condition has been met may include the computing device performing various additional operations that are specific to the condition to be performed (e.g., retrieve a previous value for the product field, etc.). In response to determining that condition has not been met (i.e., determination block 1212="No"), the computing device may determine whether there are any more product fields to process in determination block 1204. Thus, if it was determined that the condition was not met in operation 1212, then no further action is taken for that product field. On the other hand, in response to determining that condition has been met (i.e., determination block 1212="Yes"), the computing device may send an alert in block 1214.

In some embodiments, the computing device may also perform any or all of the responsive actions described in this application instead of or in response to sending the alert in block 1214.

Figure 13:
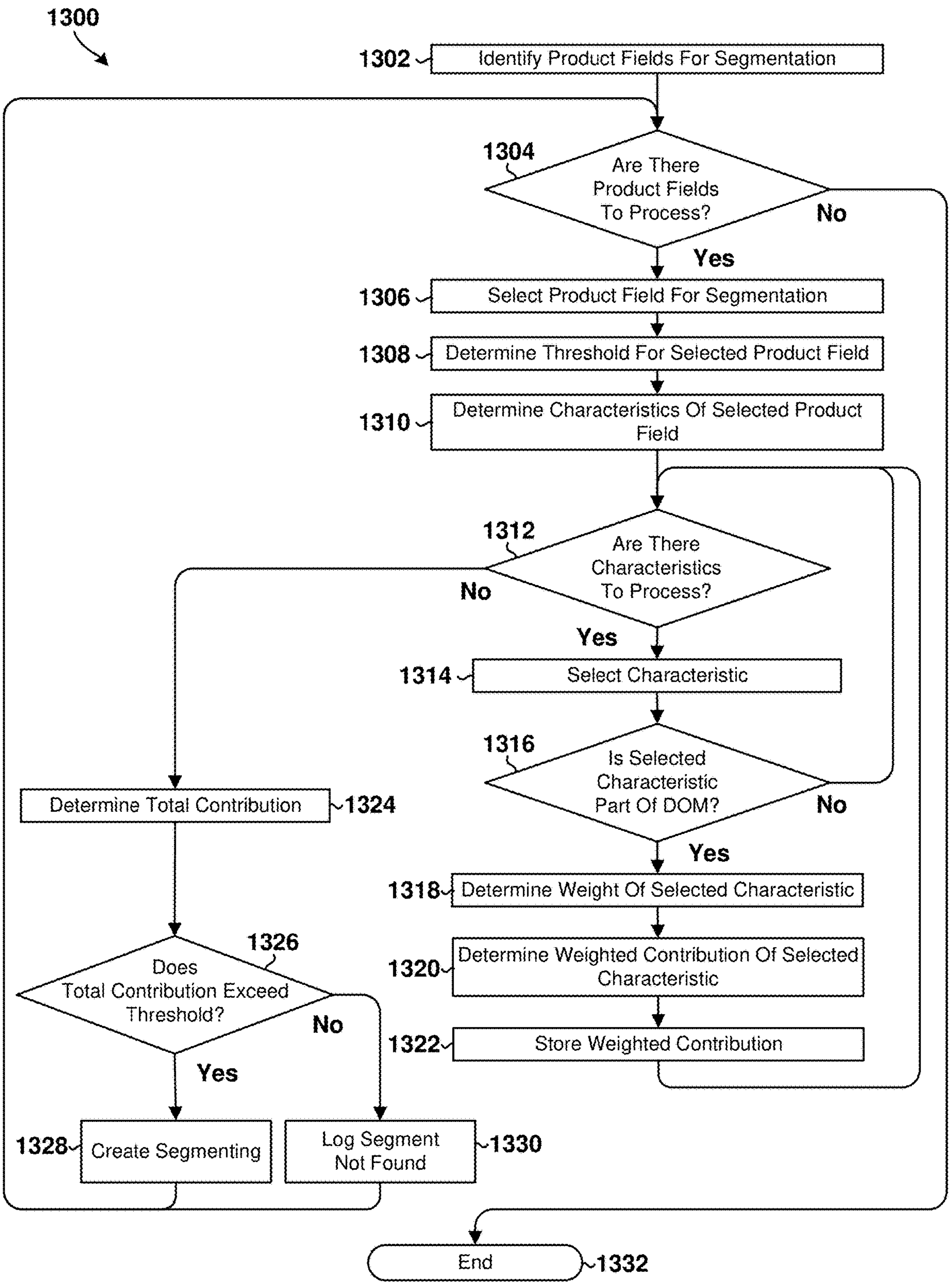
FIG. 13 is a process flow diagram that illustrates a method of using heuristics to identify single product webpages and collection product webpages, and subsequently segment them for the extraction of product fields in accordance with some embodiments.

FIG. 13 illustrates a method 1300 using heuristics to identify single product webpages and collection product webpages, and subsequently segment them for the extraction of product fields (e.g., in blocks 1014-1018 in FIG. 10A, etc.) in accordance with some embodiments. Method 1300 may be performed by one or more processors in a computing device, such as a computing device that includes a web browser 350.

In block 1302, the computing device may identify the product fields that need to be segmented for a specific webpage. In some embodiments, the computing device may identify the product fields based on user input or user preferences as specified in a web portal. In some embodiments, the computing device may use a graphical tool (e.g., dialogue box 1104 illustrated in FIG. 11) to allow the user to identify the product fields in the webpage (e.g., the product name field 1106 illustrated in FIG. 11, etc.).

In determination block 1304, the computing device may determine whether any of identified product fields require processing (e.g., have not been previously processed, etc.). In response to determining that there are product fields that require processing (i.e., determination block 1304="Yes"), the computing device may select one of the yet-to-be processed product fields in block 1306. In block 1308, the computing device may determine a threshold associated with the product field (e.g., by looking up or retrieving a static value stored in memory, etc.). A high threshold may mean that the probably of correctly identifying the product field is high.

In block 1310, the computing device may determine the characteristics associated with the selected product field (e.g., via a static lookup, etc.). For example, for a specific single product webpage, the segmentation of a product price field may require two characteristics: the position of the product price field relative to the product name field, and the presence of a currency symbol and digits in the product price field.

In determination block 1312, the computing device may determine whether there are characteristics that require processing (e.g., have not been previously processed, etc.). In response to determining that there are characteristics that require processing (i.e., determination block 1312="Yes"), the computing device may select one of the characteristics in block 1314.

In determination block 1316, the computing device may evaluate or check the DOM to determine whether the selected characteristic is present in, included in or part of the DOM. In response to determining that the selected characteristic is not part of the DOM (i.e., determination block 1316="No"), the computing device may determine that no further processing should be done with that characteristic. The computing device may then determine whether there are any additional characteristics that still require processing in determination block 1312.

In response to determining that the selected characteristic is part of the DOM (i.e., determination block 1316="Yes"), the computing device may determine the weight of the characteristic in block 1318 (e.g., via a static lookup, etc.). A large weight may mean that the characteristic is a strong determinant of the product field. In block 1320, the computing device may determine the weighted contribution of the characteristic. In some embodiments, the computing device may compute or determine the weighted contribution of the characteristic as a function of an aspect of the characteristic and the associated weight (e.g., the size of the font in terms of the largest font multiplied by the weight, etc.). In block 1322, the computing device may store the weighted contribution in memory. The computing device may then determine whether there are any additional characteristics that still require processing in determination block 1312.

In response to determining that there are no remaining characteristics that still require processing (i.e., determination block 1312="No"), the computing device may determine a total contribution associated with the selected product field (a total contribution value) in block 1324. In some embodiments, the computing device may determine the total contribution associated with the selected product field by summing the previously stored weighted contributions (e.g., values stored in block 1322, etc.).

In determination block 1326, the computing device may determine whether the total contribution associated with the product field (determined in block 1324) meets or exceeds (e.g., is equal to or greater than, etc.) the determined threshold for the product field (i.e., determined in block 1308). In response to determining that the total contribution meets or exceeds the determined threshold for the product field (i.e., determination block 1326="Yes"), the computing device may determine that the part of the DOM that triggered the characteristics includes the product field, and commence segmenting the webpage (i.e., the mapping of the location in the DOM to the product field) in block 1328. In response to determining that the total contribution does not meet or exceed (e.g., is less than, etc.) the determined threshold for the product field (i.e., determination block 1326="No"), the computing device may determine that the product field is not located within the DOM, and log the absence of segmenting in block 1330. The computing device may repeat the operations in blocks 1304-1330 until in determination block 1304 the computing device determines that there are no more product fields to process. In response to determining that there are no more product fields to process (i.e., determination block 1304="No"), the computing device may terminate, exit or end the method 1300 in block 1332.

In some embodiments, the computing device may also perform any or all of the responsive actions described in this application instead of or in response to ending the method 1300 in block 1332.

As an example of method 1300, consider the product name in a specific single product webpage. The product name threshold may be 1, and the product name segmentation may be based upon only the size of the font used (e.g., it may be 1 if the product name is the largest text on the page). If the weight of this characteristic is 1, the computing device may determine the total contribution in block 1324 to be: 1*1=1. In determination block 1326, the computing device may determine that the total contribution meets or exceeds (i.e., is equal to) the threshold (i.e., 1), and map the location in the DOM to the product name in block 1328.

As another example, consider the product price in a specific single product webpage. The product price threshold may be 1.5. The product price segmentation may be based upon only the position of the product price in relation to the product name (e.g., it may be 1 if the product price is immediately before or after the product name in the DOM) and the presence of a currency symbol and digits (e.g., it may be 1 if they are present). If the weight of each of these characteristics is 1, the computing device may determine the total contribution in block 1324 to be: (1*1)+(1*1)=2. In determination block 1326, the computing device would determine that the total contribution meets or exceeds (i.e., is greater than) the threshold (i.e., 1.5), and map the location in the DOM to the product field in block 1328.

In some embodiments, the computing device may be configured to use heuristics to perform segmentation by identifying product fields. For example, the computing device may determine whether the product field that includes the largest font size includes a number and a currency symbol. The computing device may determine that the product field is the product price in response to determining that the product field with the largest font size includes a number and a currency symbol. In addition, the computing device may determine the product field with the second largest font size, which may also be in close proximity to the product price, is the product name.

As a further example, the computing device may determine that the product field that includes the largest font size includes text. In response, the computing device may determine that the product field is a product name. The computing device may determine that the product field with the second largest font size, which may also include a number and a currency symbol and be in close proximity to the product name, is a product price.

Some of the product fields may be in separate parts of the DOM (e.g., different leaves or branches of the tree), but they may be located close to each other within a larger common part of the DOM (e.g., they may share a common ancestor node in the tree, etc.). In some embodiments, the computing device may be configured to identify and use these common parts of the DOM as part of the segmenting (i.e., it can be used within the mapping, etc.). For example, the common part may include a unique identifier (e.g., a HTML "id" attribute, etc.) that could be used by the computing device for segmenting. As another example, some product fields may share a common identifier in the DOM (e.g., a CSS "class" selector, etc.), which could be used by the computing device for segmenting.

In an embodiment, the computing device may be configured so that, once a product field has been mapped to a location in the DOM, that location is excluded from further searches of the DOM for other product fields.

In an embodiment, the computing device may be configured so that, when the parent node of two or more core product fields is identified in the DOM, further searches for core product fields are restricted to the branch of the DOM tree that includes the parent node of the two or more product fields as its root node.

In some embodiments, the computing device may be configured to identify one field first with a high degree of certainty (e.g., the product price field, etc.), and then expand out from this product field to locate the other product fields. This is equivalent to locating the product field in the DOM, and then initially expanding the search on the DOM by considering only the directly connected nodes in the tree (i.e., parents, siblings, children). The computing device may continuously, repeatedly, or progressively expand search space in this manner.

In some embodiments, the computing device may be configured to consider or evaluate a group of characteristics together, and compare them as a whole to expected values (e.g., an average specific to the website from which the webpage being analyzed was retrieved, a system-wide average, etc.).

Figure 14:
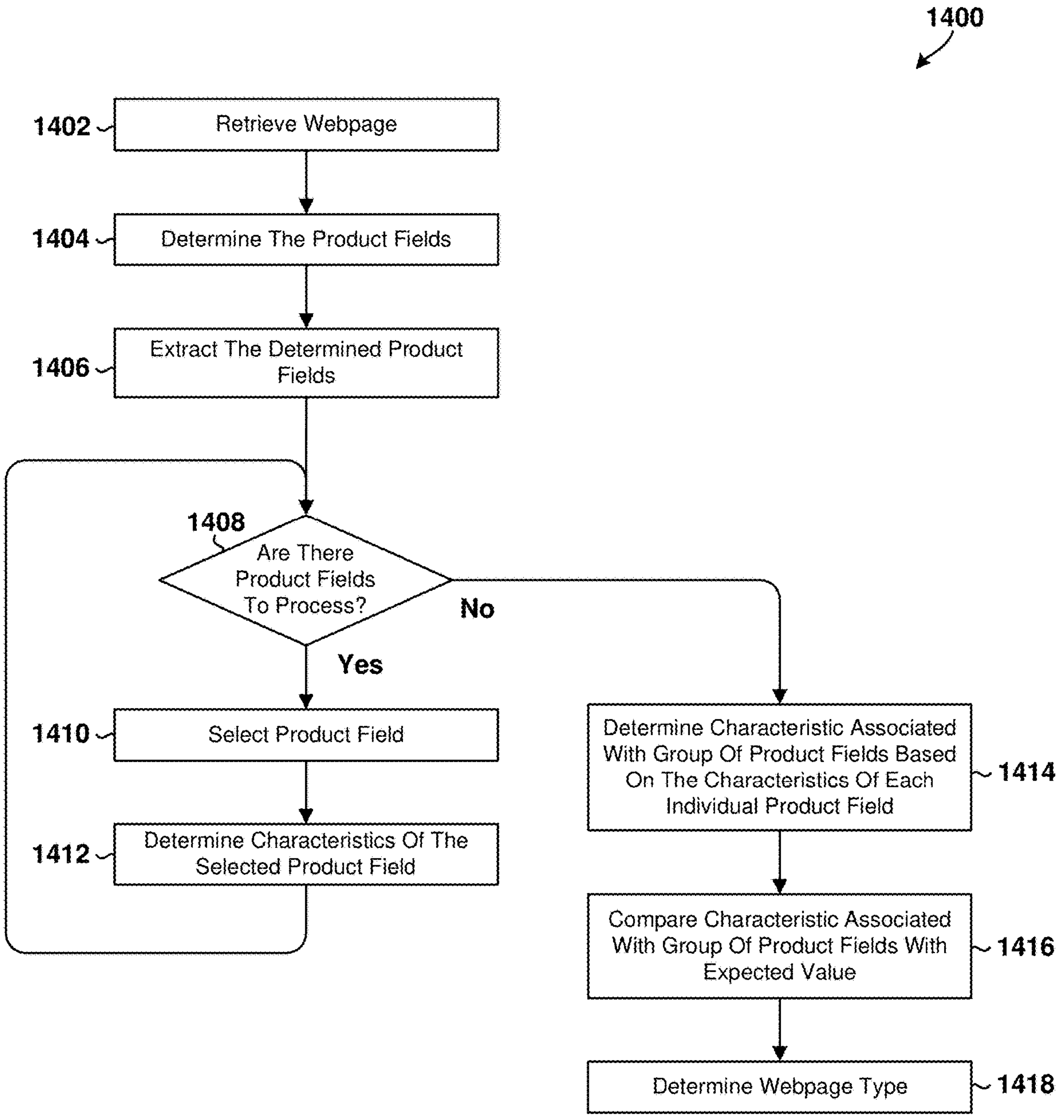
FIG. 14 is a process flow diagram that illustrates a method of using heuristics to identify types of webpages using a group of characteristics in accordance with some embodiments.

FIG. 14 illustrates a method 1400 of using heuristics to identify types of webpages using a group of characteristics in accordance with some embodiments. Method 1400 may be performed by one or more processors in a computing device.

In block 1402, the computing device may retrieve a webpage. In block 1404, the computing device may determine the product fields that are required. In block 1406, the computing device may extract the required product fields from the webpage. In determination block 1408, the computing device may determine whether there are product fields to process (e.g., whether any of the extracted product field have not been previously processed, etc.). In response to determining that there are product fields to process (i.e., determination block 1408="Yes"), the computing device may select a product field in block 1410 and determine the characteristics associated with the selected product field in block 1412. The computing device may perform the operations in blocks 1408-1412 repeatedly until all of the extracted product fields are processed.

In response to determining that there are no more product fields to process (i.e., determination block 1408="No"), the computing device may determine a characteristic associated with the group of product fields in block 1414. In some embodiments, the computing device may determine the characteristic associated with the group of product fields by combining the individual characteristics associated with each of the individual product fields. In block 1416, the computing device may compare the characteristic associated with the group of product fields with an expected value (e.g., determine if it is equal to, greater than, less than, within a specified percentage of, equivalent to, etc.) to generate a result. In block 1418, the computing device may use the generated result to determine the webpage type (e.g., single product webpage, collection product webpage, etc.).

In some embodiments, the computing device may also perform any or all of the responsive actions described in this application in response to determining the webpage type in block 1418.

In an example embodiment in which the computing device is configured to use heuristics to determine whether a webpage is a single product webpage or a collection product webpage, the computing device may determine the distances between the product name field and each of the product price field, main product image field, and the product user rating field. The computing device may then determine the average of these distances, and compare the determined average to expected averages for both single product webpages and collection product webpages from the same website to determine which value it is closer to, and hence identify which type of webpage is being analyzed. After identifying the webpage type, the computing device may update the average for that type of webpage with the average for the newly identified webpage.

In some embodiments, the computing device may be configured to use a subset of the DOM that represents the initial viewport of the webpage. This reduces the amount of compute and storage resources that are needed to process the webpage, and thus allows the computing device to process more webpages. This approach works because the most critical product fields are likely to be visible to the user in the initial viewport (e.g., it would be poor design if a user had to scroll to the bottom of a page in order to determine the price of a product, etc.).

In some embodiments, the computing device may be configured to use natural language processing and named entity recognition to identify and extract product fields. For example, the product name field may include words from a relatively small set of nouns representing goods and products, the product size unit field may be from an even smaller sets of words representing measurement units, or the manufacturer's address or seller's address may be in a reference database (e.g., a geolocation database, phone directory, etc.).

In some embodiments, the computing device may be configured to use statistics as part of the segmentation (e.g., a distribution analysis may be performed on all DOM nodes that include text and their associated font attributes, etc.).

In some embodiments, the computing device may be configured to use machine learning techniques to identify single product webpages and collection product webpages, and subsequently segment to extract their product fields. An advantage of using machine learning techniques is that they may more effectively identify characteristics (which may not be apparent to a human), and automatically generate the weights and thresholds associated with each characteristic in the context of identifying and extracting each product field.

Some embodiments may include a computing device configured to train a machine learning component (e.g., a neural network, a deep neural network, a convolutional neural network). The computing device may be provided with a DOM for a web page and the identified product fields. The product fields may need to be identified by a human (i.e., a trainer). As such, the computing device may render a tool that displays the rendered webpage, allows the trainer to select the product field to be identified (e.g., "Product Name" could be selected from a dropdown list, etc.), allows the trainer to select/highlight the product name on the rendered webpage, and then maps the highlighted product name to the underlying DOM. The underlying DOM could represent the entire webpage or only the initial viewport. The computing device may repeat these operations for each product field on numerous webpages until the training provides sufficient coverage.

In order to perform inference, the trained machine learning component operating on the computing device may be provided with a DOM (or a part of the DOM that represents the initial viewport). The machine learning component may subsequently identify the product fields so that they can easily be extracted from the DOM.

In an alternative embodiment, the computing device may be configured to train the machine learning component by providing it with an image representing the web page (e.g., a screenshot) and the identified product fields. Thus, the machine learning component may perform machine vision. The image could represent the entire webpage or only the initial viewport. The product fields may need to be identified by a human (i.e., a trainer). As such, the computing device may render or generate a tool or webpage, convert it to an image, display the image, allow the trainer to select the product field to be identified (e.g., "Product Name" could be selected from a dropdown list)), allow the trainer to select/highlight the product name on the displayed, and then map the highlighted portion of the image back to the underlying DOM. The computing device may repeat these operations for each product field on numerous webpages until the training provides sufficient coverage.

In order to perform inference, the trained machine learning component operating on the computing device may be provided with an image representing the web page (or a part of the image that represents the initial viewport). The machine learning component may subsequently identify the product fields so that they can easily be extracted from the DOM.

In an embodiment, the computing device may be configured to combine the machine learning component used to perform inference on the DOMs with the machine learning component used to perform inference on the image of the webpage in order to form an ensemble of machine learning components.

In an alternative embodiment, the computing device may be configured to use only one of these machine learning components for inference initially. The computing device may compare the inference results (i.e., their confidence, probability, etc.) to a threshold value, and use the second machine learning component if the inference results are below the threshold value.

In some embodiments, the computing device may be configured to use named-entity recognition (NER) techniques to segment product webpages so that their product fields can be efficiently extracted.

In some embodiments, the computing device may be configured to present some (e.g., a random sample) or all of the segmenting results to a user graphically for verification.

In some embodiments, the computing device may be configured to process (e.g., segment, etc.) any type of website that includes a collection of data (e.g., webpages) that follow a common structure. Examples of such websites may include websites selling services (e.g., tourism related services such as flights, hotel bookings, car rentals), news websites, reference websites (e.g., Wikipedia), and social media websites.

In some embodiments, the computing device may be configured to use a combination of heuristics and machine learning techniques to further identify and segment collection webpages. For example, the computing device may identify a collection brand webpage that lists products from the same company or brand by detecting the company or brand name in the information associated with each product (e.g., within either of the product name or the product summary description field, etc.). Additionally, the company or brand name may be included as a parameter in the URL for the collection brand webpage, or it may be selected as a filter option within a filter pane within the collection brand webpage.

Further, a collection brand webpage that lists products from the same company or brand may be identified by determining that a majority of the products have a similar or identical product manufacturer or product distributor information, or by determining that a majority of the products have links that have similar URL patterns and/or lead to predominantly similar webpages.

In an enhanced embodiment, the computing device may be configured to apply machine learning techniques to the product images in order to detect and identify the product name, product brand, or product logo. This technique is effective because brand names and logos are normally displayed prominently on products, and product manufactures normally ensure that official product images provide unimpeded views of the brand name or logo. Company or brand names may be associated with logos manually or by using machine learning techniques with collection product webpages. For example, the collection brand webpage shown in FIG. 1C shows shoes from the same brand, and the product names include the brand name and/or the product images include products bearing the same logo.

In an embodiment, the computing device may be configured to determine that collection product webpages is a collection brand webpage that relates to a product name or brand in response to determining that the number of products displayed on a collection webpage are associated with a single product name, type, or brand exceed a threshold (e.g., a percentage, etc.).

In some embodiments, the computing device may be configured to use a combination of heuristics and machine learning techniques to further identify and segment collection webpages into collection promotion webpages. Perhaps the most distinctive characteristic of a collection promotion webpage is that it may normally include a large heading above the product details, and this heading may include information (e.g., keywords) that identifies the common characteristic of the products (e.g., "Christmas" and "Personalised Christmas Gifts" with reference to FIG. 1D). This heading may include text or one or more images (in which case image recognition techniques may be used). Alternatively, the heading may be stylized as a sticker or banner that is superimposed on the webpage. Further, every product may include a previous product price, and there may be commonality between these previous product prices (e.g., the may all include "20% off").

In some embodiments, the computing device may be configured to provide efficient product field segmentation and extraction without requiring the downloading of the entire webpage and all of its associated resources from the eCommerce website and/or without generating and searching the entire DOM.

As previously described (e.g., with reference to FIG. 3, etc.), building the DOM for a webpage (e.g., in operation 320, etc.) may require the web browser to retrieve referenced web resources. It is not uncommon for a single product webpage to reference hundreds of such web resources, and they may need to be retrieved from two or more web servers.

Figure 15:
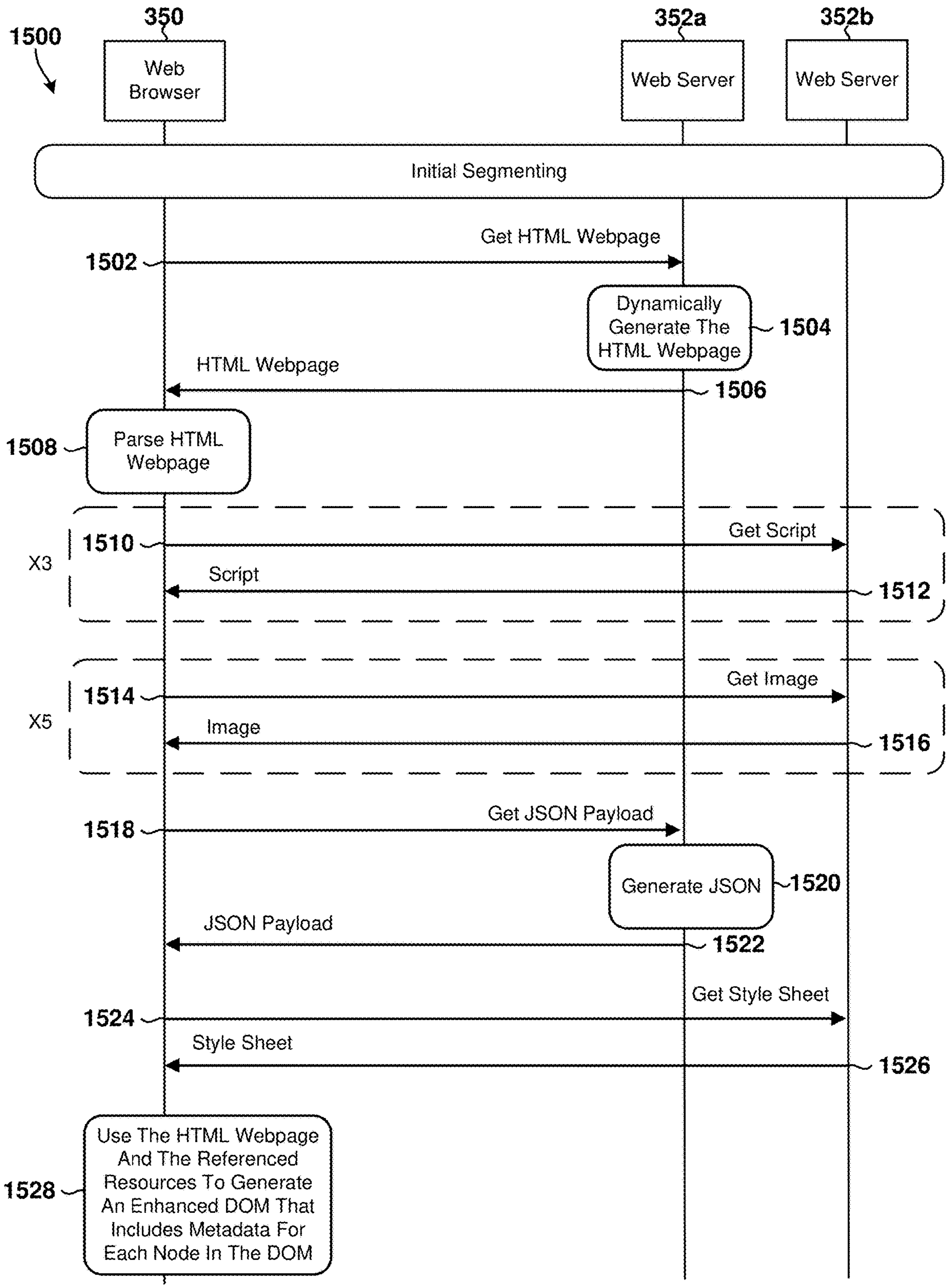
FIG. 15 is an activity diagram that illustrates the components, operations and communications in a system configured to implement a method of retrieving a webpage and its associated web resources to create an initial segmentation and using the webpage and its associated web resources to generate an enhanced document object model (DOM) in accordance with some embodiments.

FIG. 15 illustrates an exemplary method 1500 of retrieving a webpage and its associated web resources in order to create an initial segmentation, and using these to generate an enhanced DOM in accordance with some embodiments. Method 1500 may be performed by one or more processors in a computing device that includes a web browser 350 and/or by one or more processors in one or more server computing devices that include web servers 352*a*, 352*b*. In some embodiments, method 1500 may be performed after an initial round of segmenting operations or as part of the initial segmenting operations.

In operation 1502, the web browser 350 may send a HTTP request to a first web server 352*a* to retrieve a HTML webpage. In operation block 1504, the web server 352*a* may generate the requested HTML webpage. In operation 1506, the web server 352*a* may send the generated HTML webpage to the web browser 350.

In operation 1508, the web browser 350 may parse the HTML webpage, and determine which additional web resources are required. In the example illustrated in FIG. 15, the web browser 350 determines that the following web resources are needed: 3 JavaScript® files, 5 images, 1 JSON payload, and a CSS stylesheet.

Operations 1510-1512 are repeated for each of the three referenced JavaScript® files. In operation 1510, the web browser 350 may request a JavaScript® file from the second web server 352*b*, and in operation 1512, the web server 352*b* may send the JavaScript® file to the web browser 350.

Operations 1514-1516 are repeated for each of the five referenced images. In operation 1514, the web browser 350 may request the image file from the second web server 352*b*, and in operation 1516, the web server 352*b* may send the image file to the web browser 350.

In operation 1518, the web browser 350 may request a JSON payload from the first web server 352*a*. In operation block 1520, the web server 352*a* may generate the JSON payload. In operation 1522, the web server 352*a* may send the generated JSON payload to the web browser 350.

In operation 1524, the web browser 350 may request a CSS stylesheet from the second web server 352*b*. In operation 1526, the web server 352*b* may send the CSS stylesheet to the web browser 350.

In operation block 1528, the web browser 350 may combine the web resources to generate an enhanced DOM that includes metadata for each node in the tree that links the node back to the web resource that contributed to giving the node its value. The enhanced DOM, or the details of the web resources that contribute to giving the nodes their values, may be stored for future use when segmenting the same or similar webpages.

In some embodiments, the computing device may also perform any or all of the responsive actions described in this application based on the generated enhanced DOM and/or in response to generating the enhanced DOM in block 1548.

In an alternative embodiment, after a webpage has been segmented, the web browser 350 may repeat the retrieval and it may scan or search each web resource as it is retrieved in order to determine whether it includes an identified product field (e.g., the product name field "Brand 1 Milk Chocolate Cocoa Cookie, 20 g" with reference to 1106 in FIG. 11). If the web resource is found to include the product field, then the details of the web resource may be associated with the segmenting for the product field.

Figure 16:
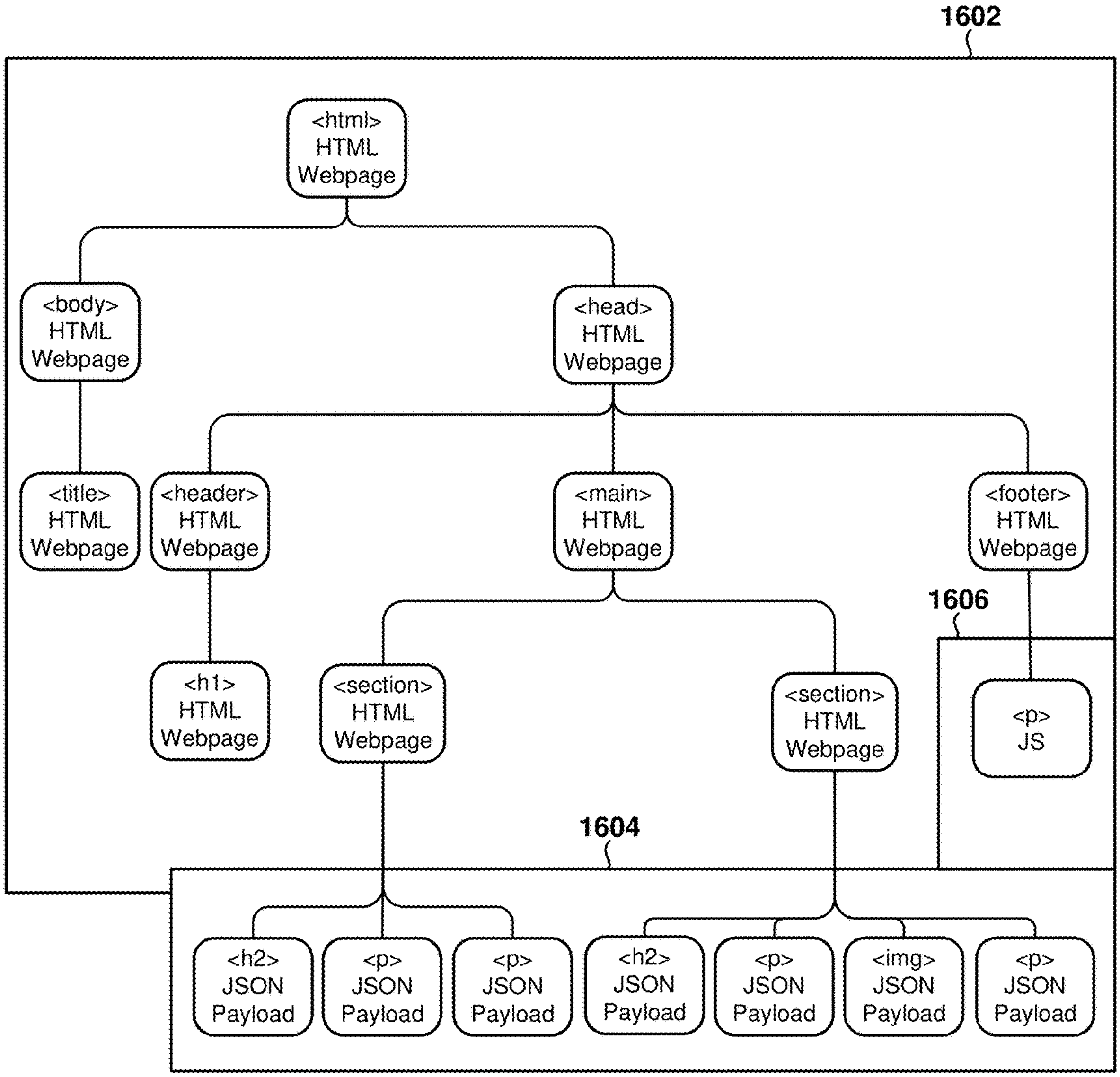
FIG. 16 is a component diagram that illustrates an enhanced document object model (DOM) that could be generated based on a retrieved webpage and its associated web resources and used to implement the various embodiments.

FIG. 16 illustrates an enhanced DOM that is based upon the exemplary DOM 400 illustrated and described with reference to FIG. 4. Each node in the enhanced DOM has additional metadata to indicated the web resource from which its value originated. The value of a node may originate from two or more web resources (e.g., a product price may be calculated by multiplying the product price in a base currency originating from one JSON file by a currency conversion rate originating from a JavaScript® file, etc.), and in such cases the metadata would indicate these two or more web resources. The nodes 1602 that give the webpage its structure may be labeled to indicate that their values originated in the HTML webpage (i.e., operation 1506 with reference to FIG. 15). The nodes 1604 including the variable content may be labeled to indicate that they originated in the JSON payload (i.e., operation 1522 with reference to FIG. 15). The node 1606 including the footer text may be labeled to indicate that it originated in the first JavaScript® file (i.e., operation 1512 with reference to FIG. 15).

In the above example, there were eleven HTTP requests and responses needed to generate this HTML webpage, but only three of these responses contributed to the DOM (i.e., operations 1506, 1512, and 1522 with reference to FIG. 15).

Figure 17A:
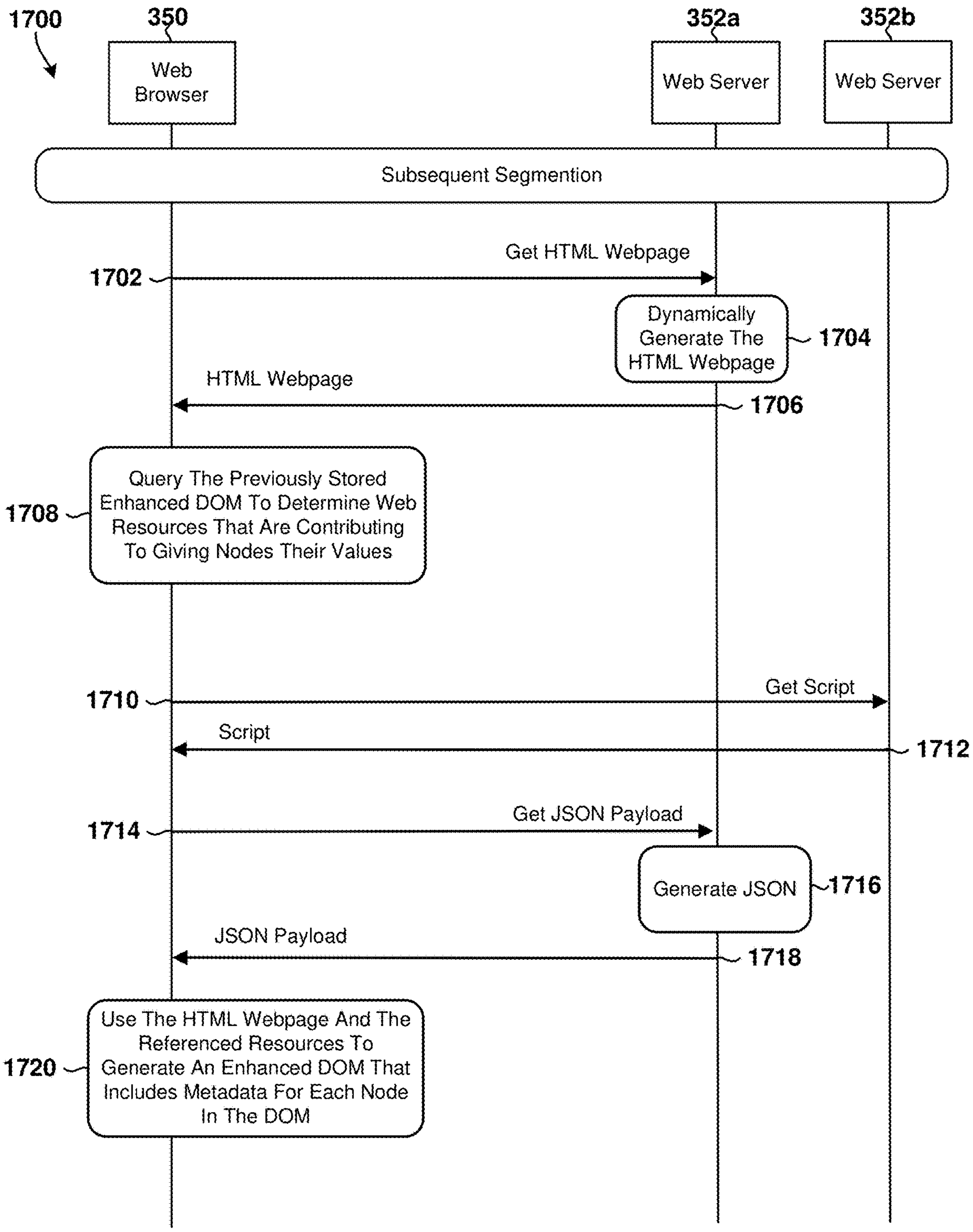
FIG. 17A is an activity diagram that illustrates the components, operations and communications in a system configured to implement a method for using a previously generated enhanced document object model (DOM) to segment a webpage and its web resources in accordance with some embodiments.
Figure 17B:
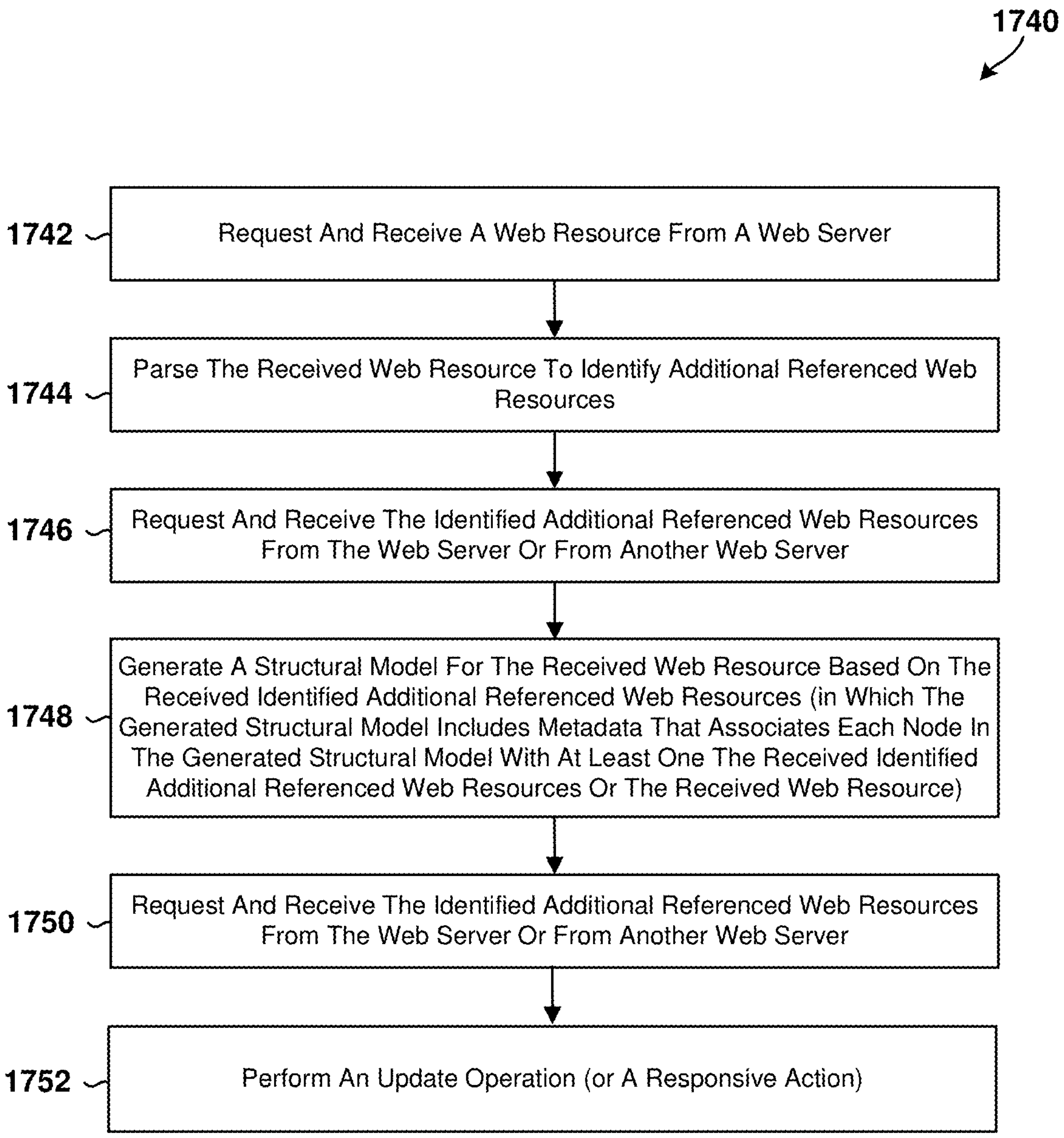
FIGS. 17B and 17C are process flow diagrams that illustrate methods of extracting information from a segmented webpage in accordance with some embodiments.
Figure 17C:
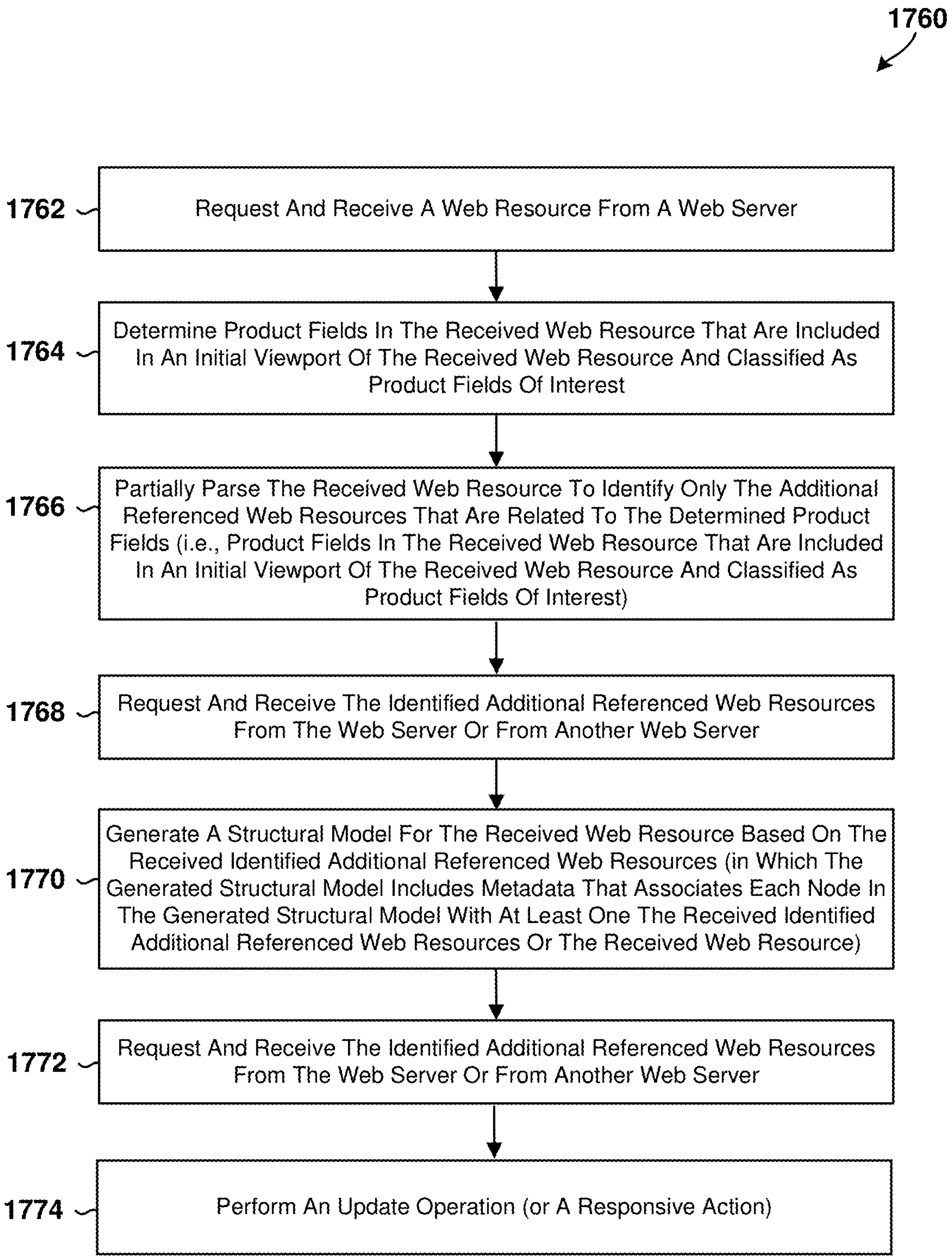

FIGS. 17A-17C continue the example introduced in FIG. 15 by illustrating methods 1700, 1740, 1760 of retrieving the same webpage and its associated web resources in order to create a subsequent segmentation using a previously generated enhanced DOM (e.g., the DOM illustrated in FIG. 16, etc.) in accordance with some embodiments. Methods 1700, 1740, 1760 may be performed by one or more processors in a computing device that includes a web browser 350 and/or by one or more processors in one or more server computing devices that include web servers 352*a*, 352*b*.

With reference to FIG. 17A, in operation 1702, the web browser 350 may send a HTTP request to a first web server 352*a* to retrieve a HTML webpage. In operation block 1704, the web server 352*a* may generate the requested HTML webpage. In operation 1706, the web server 352*a* may send the generated HTML webpage to the web browser 350.

In operation block 1708, the web browser 350 may query the previously stored enhanced DOM in order to determine which web resources are contributing to giving the nodes their values. Continuing the example illustrated in FIG. 15, the contributing web resources may be determined to be one JavaScript® file and one JSON payload. In operation 1710, the web browser 350 may request the JavaScript® file from the second web server 352*b*. In operation 1712, the web server 352*b* may send the JavaScript® file to the web browser 350. In operation 1714, the web browser 350 may request a JSON payload from the first web server 352*a*. In operation block 1716, the web server 352*a* may generate the JSON payload. In operation 1718, the web server 352*a* may send the JSON payload to the web browser 350.

In operation block 1720, the web browser 350 may combine the web resources in order to generate the enhanced DOM. If the web browser 350 cannot generate the enhanced DOM due to missing web resources (e.g., if the HTML page changed since it was previously segmented), then the web browser 350 may request the missing web resources.

In some embodiments, the computing device may also perform any or all of the responsive actions described in this application based on the generated enhanced DOM and/or in response to determining that it cannot generate the enhanced DOM due to missing web resources.

In an embodiment, the web browser 350 may store (or "cache") copies of web resources that are static (i.e., they are not dynamically generated by the web server for each request) and that are used frequently (e.g., they are referenced by a webpage that is retrieved and processed frequently, they are referenced by two or more webpages that are processed at approximately the same time). Referring back to FIG. 15, the first JavaScript® file may be stored by the web browser 350 after it is received in operation 1512. Referring back to FIG. 17, the first JavaScript® file may be retrieved from storage by the web browser 350 as part of operation block 1708. This could eliminate the need for operations 1710 and 1712.

Some websites require that a web browser 350 makes requests for some web resources before making requests for other web resource. For example, the first web server 352*a* presented in FIG. 15 may require that the web browser 350 requests the HTML webpage in operation 1502 before it requests the JSON payload in operation 1518. If the web browser 350 does not do this, then the web server 352*a* may return a JSON payload including an error in operation 1522. In an embodiment, the web browser 350 may make multiple requests to the web server 352*a* for the same web resource in isolation and in different orders and subsequently determine whether the responses are different. If they are different, the necessary preceding web resources may be included within the metadata for a node in the enhanced DOM.

Many websites use cookies in order to generate webpages specific to the user. These cookies are initially sent by the web server 352*a* to the web browser 350 (e.g., as part of operation 1506 with reference to FIG. 15), and the web browser 350 subsequently sends them to a web server 352 as part of each request (e.g., operations 1510, 1514, 1518, and 1524 with reference to FIG. 15) regardless of whether or not the web server 352 needs them. In an embodiment, the web browser 350 may make each subsequent request to the web server 352 with and without cookies, and then compare the responses in order to determine whether the cookies were needed. In response to determining that a cookie is needed, the web browser 350 may add additional metadata to a node in the enhanced DOM to indicate that a specific request should be made to get a cookie, and that this cookie should then be included in the request to retrieve the web resource that contributes to giving the node its value.

Referring back to FIG. 10A, in some embodiments, block 1008 could be enhanced to use the methods shown in FIG. 15 and FIG. 17. Further, these methods may be applied to any of the requests to retrieve web content (i.e., not only the initial request for the HTML webpage).

In some embodiments, the computing device may be configured to calculate and use a subset of the DOM that represents the initial viewport of the webpage. This may reduce the compute and storage resources needed to process the webpage, and may also enable the computing device to process more webpages. Further, the computing device may be configured to use the enhanced DOM method previously described in conjunction with a reduced DOM to further reduce the number of HTTP requests and responses needed. This approach works because the most critical product fields will likely always be visible to the user in the initial viewport (e.g., it would be extremely poor design if a user had to scroll to the bottom of a page in order to determine the price of a product, etc.).

With reference to FIG. 17B, in block 1742, the computing device may request and receive a web resource from a web server. In block 1744, the computing device may parse the received web resource to identify additional referenced web resources. In block 1746, the computing device may request and receive the identified additional referenced web resources from the web server or from another web server. In block 1748, the computing device may generate a structural model for the received web resource based on the received identified additional referenced web resources (in which the generated structural model includes metadata that associates each node in the generated structural model with at least one the received identified additional referenced web resources or the received web resource). In block 1750, the computing device may request and receive the identified additional referenced web resources from the web server or from another web server. In block 1752, the computing device may perform an update operation (or a responsive action).

With reference to FIG. 17C, in block 1762, the computing device may request and receive a web resource from a web server. In block 1764, the computing device may determine product fields in the received web resource that are included in an initial viewport of the received web resource and classified as product fields of interest. In block 1766, the computing device may partially parse the received web resource to identify only the additional referenced web resources that are related to the determined product fields (i.e., product fields in the received web resource that are included in an initial viewport of the received web resource and classified as product fields of interest). In block 1768, the computing device may request and receive the identified additional referenced web resources from the web server or from another web server. In block 1770, the computing device may generate a structural model for the received web resource based on the received identified additional referenced web resources (in which the generated structural model includes metadata that associates each node in the generated structural model with at least one the received identified additional referenced web resources or the received web resource). In block 1772, the computing device may request and receive the identified additional referenced web resources from the web server or from another web server. In block 1774, the computing device may perform an update operation (or a responsive action).

Figure 18:
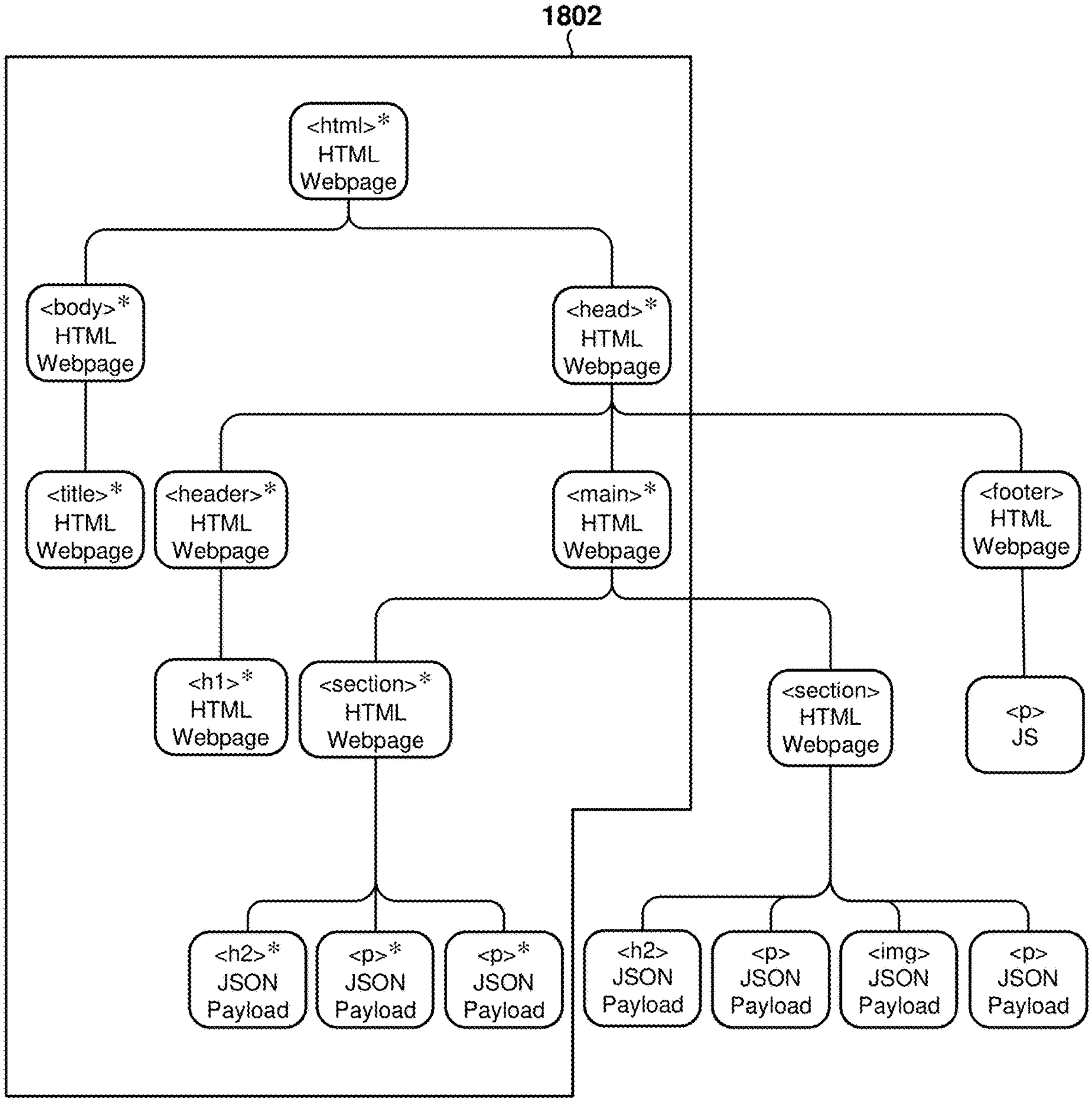
FIG. 18 is a component diagram that illustrates an enhanced document object model (DOM) that could be generated based on a retrieved webpage and its associated web resources and used to implement the various embodiments.

FIG. 18 illustrates an enhanced DOM based on the DOM illustrated in FIG. 16. In the example illustrated in FIG. 18, only the initial nodes 1802 are visible in the initial viewport for a desktop web browser. Additional metadata could be added to the enhanced DOM to identify which nodes are in the initial viewport (e.g., * has been used in FIG. 18).

Referring back to FIG. 15, operation 1528 could be extended to also calculate, and only store, the reduced DOM including only the nodes that are visible in the initial viewport (i.e., nodes 1802 with reference to FIG. 18). Referring back to FIG. 17A, operation 1708 could be extended to query the previously stored reduced DOM in order to determine the web resources that are contributing to giving the nodes their values. This could further eliminate the need for more HTTP requests and responses when generating the enhanced DOM in operation 1720 of FIG. 17A (e.g., operations 1710 and 1712 for retrieving the JavaScript® file are no longer needed because the JavaScript® file is not required for any nodes that are visible in the initial viewport).

Different devices, and consequently different web browsers, may have different display/screen sizes. However, modern product webpages may be required to render well on all sizes of screens, and this may require them to be displayed in different ways on different devices. For example, a collection product webpage may display the product details in a table with four columns on an average desktop computer screen (e.g., as illustrated in FIG. 1B), but the same webpage may be displayed with only a single column on a mobile phone.

There are at least two ways that this may be achieved. Firstly, the web browser could include information relating to itself and the device in each request that it makes to the web server (e.g., operations 304 and 314 in FIG. 3). This is referred to as the "User-Agent" in the HTTP protocol, and it enables the web server to adjust the HTML webpage and/or web resources to best suit the web browser and device. Secondly, the webpage may be designed so that it can dynamically adjust to the screen size of the web browser and device.

In some embodiments, the computing device may be configured to use this behavior in order to more easily identify and extract the product fields (e.g., the viewport size could be reduced in order to reduce the DOM). This could be achieved in block 1008 of FIG. 10 by specifying the "User-Agent" in the HTTP protocol.

In some embodiments, the computing device may be configured to determine and use a subset of the enhanced DOM that only includes the nodes representing the product fields that have previously been segmented.

In some embodiments, the computing device may be configured to use the frequencies of node distribution (e.g., list items, etc.) to classify a webpage (e.g., determine whether a webpage is a single product webpage or a collection product webpage, etc.). The node distribution may be based upon image analysis of the rendered webpage or it may be based on node distribution within the DOM. Further, the frequency analysis may involve comparing the frequencies of nodes occurring in the initial viewport to the frequencies of nodes occurring outside of the initial viewport.

For example, a collection product webpage may have a relatively low number of lists (e.g., relative to the number of nodes in the webpage, etc.), but one of these lists may include a relatively large number of individual list items (e.g., relative to the number of nodes in the webpage, relative to the numbers of list items in other lists within the webpage, etc.). Further, this list node normally spans the initial viewport and all subsequent viewports (assuming that there are a sufficient number of products present on the webpage).

In contrast, a single product webpage may have a relatively high number of lists (e.g., relative to the number of nodes in the webpage, etc.), but each of these lists may include a relatively small number of individual list items (e.g., relative to the number of nodes in the webpage, relative to the numbers of list items in other lists within the webpage, etc.). Further, these collections of list nodes may be included within a single viewport of the webpage. In some embodiments, the computing device may be configured to perform frequency analysis and clustering on the contents of the product fields in order to classify a webpage (e.g., determine whether a webpage is a single product webpage or a collection product webpage, etc.). If a word (or its synonyms) occurs in a relatively large number of the product fields within a webpage then it is likely that the webpage is a collection product webpage. For example, each of the product name fields in FIG. 1A includes the words "USB," "Type C," and "Cable." In an enhanced embodiment, the computing device may be configured to use the results of the frequency analysis to automatically create a description of the collection product webpage.

In some embodiments, the computing device may be configured to provide quality management, and it may do this for two distinct types of users. Firstly, the computing device may use quality management to ensure that the embodiments are meeting or exceeding their expected performance levels in terms of the product webpage segmentation and extraction processes. This is important because web pages may change over time (e.g., from one request to the next for websites that use dynamic frameworks to generate the webpages (e.g., the HTML "id" and "class" attributes may be generated randomly for each request, user session, etc.), over longer time periods as the website is developed, etc.). The segmentation and extraction processes may not immediately detect these changes. Further, some websites use tactics to intentionally make it difficult for automated web browsers to accurately perform segmentation and extraction. These tactics are often used to prevent competitors gaining intelligence. One such tactic is to include misleading, incorrect, or unrelated product information in a webpage, but to do so in a way so that it is not visible to a human when the webpage is rendered on a screen (e.g., by using the same color font for the text and the background, by using the CSS stylesheet to not display the text or images, by placing another part of the webpage over the text or images, etc.). Another such tactic is that a website returns webpages that are structurally accurate and include accurate product information except for the product prices (e.g., the product prices may be quadrupled, etc.), when they detect that the web browser is an automated web browser (e.g., based upon the IP address that the web browser is using, based upon the frequency of requests, etc.).

Secondly, users (e.g., product or brand managers) may use quality management to ensure the extracted information is correct, accurate, and consistent, in the context of the product. This is important because a consumer may be less likely to purchase a product if there is contradictory information about the product on the webpage (e.g., the product name for a tube of toothpaste may include "100 ml" whereas the main product image field may show a tube of toothpaste that has "125 ml" on it, etc.).

In some embodiments, the computing device may be configured to compare two or more product fields to each other in order to ensure that they are consistent. The product fields may be extracted from a single webpage at the same time (i.e., as part of the same extraction process), from two different instances of the same webpage retrieved from the web server at different times, or from two different instances of the same webpage retrieved from the web server using two different web browsers (e.g., mobile devices, audio devices, augmented reality headset devices). If two different web browsers are used to retrieve the webpages, then they may use different values for the "User-Agent" in the HTTP requests, and they may be associated with different IP addresses. The product fields may be extracted from different webpages from different websites that are known to refer to the same product (e.g., the two product fields may both be product descriptions from two different webpages that include identical product stock numbers).

In an embodiment, the second product field may be selected based upon the strength of its likely relationship to the first product field (e.g., the product name and the main product image field should have a strong relationship, whereas the product name and the product user rating may not have a strong relationship).

In an embodiment, the product images (i.e., the main product image and the alternative product images) may be compared to the product details (e.g., the product name, product summary description, product detailed description) in order to ensure that they are consistent. The computing device may perform machine learning techniques (e.g., using Facebook's GrokNet)) to identify (e.g., classify) the product in the main product image field (and alternative product images). Example identifications include chocolate, wine bottle, toy truck, lens (with reference to FIG. 2A), shoe (with reference to FIG. 2B). The computing device may compare the result of this identification to the product name and product summary description to determine whether they include the identified product. The computing device may use machine learning techniques to determine attributes of the identified product (e.g., "black" in reference to the lens in FIG. 2A, "laced" in reference to the shoe in FIG. 2B). These attributes can be compared to, or used to complement (e.g., if they were not already present), the product summary description and the detailed product information. The computing device may also use machine learning identification to determine that all of the alternative product images relate to the same product (e.g., that they are different views of the same product).

If the product image includes text, the computing device may extract the text (e.g., using image-based text analysis, etc.), and compare it to the product name and product summary description. If the product image is consistent with the product name and product summary description then there should be a relatively large intersection of the words found in the text. For example, with reference to FIG. 9, the text extracted from the main product image 916 would consist of three words (i.e., "I," "want," and "you"), and all three of these words are present in the product name field 904. Thus 100% of the words extracted from the main product image field are also in the product title. The relative number of words that are required to match may be expressed as a percentage threshold.

Similarly, the image metadata (e.g., HTML <img> tag "alt" or "title" attributes, EXIF information) may be compared to the product details, or the main product image field and the alternative product images may be compared to each other.

Additionally, the semantic description of a product field may be created and subsequently used for comparisons. For example, the semantic description of the main product image field may be compared to the semantic description of the product name and product summary (e.g., if the product in the product image was identified as a "jumper," then it would be deemed a match to any of "pullover," sweater," "cardigan," and "long-sleeve t-shirt").

Figure 19A:
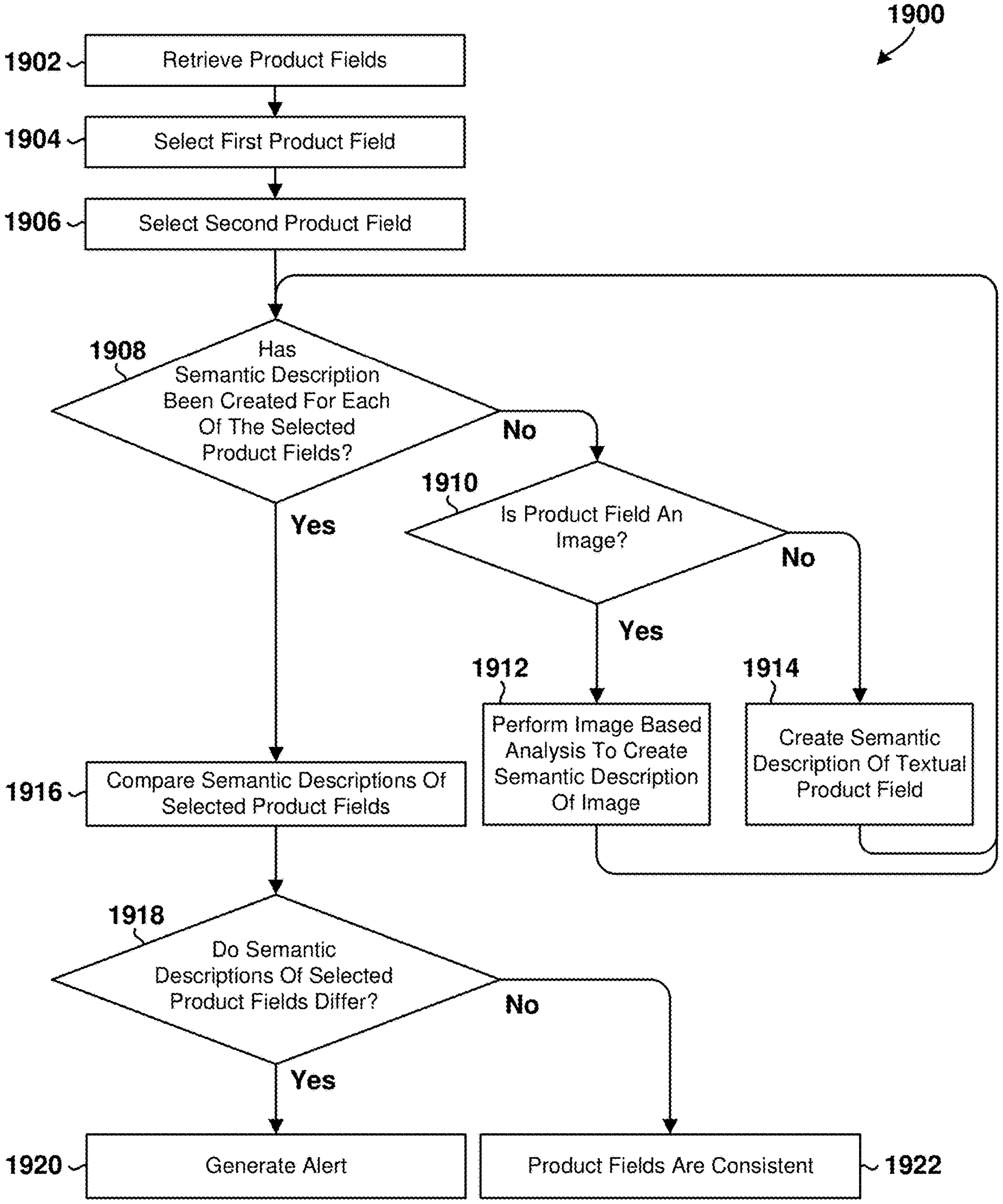
FIGS. 19A and 19B are process flow diagrams that illustrate methods of extracting and using product fields to perform quality management in accordance with some embodiments.
Figure 19B:
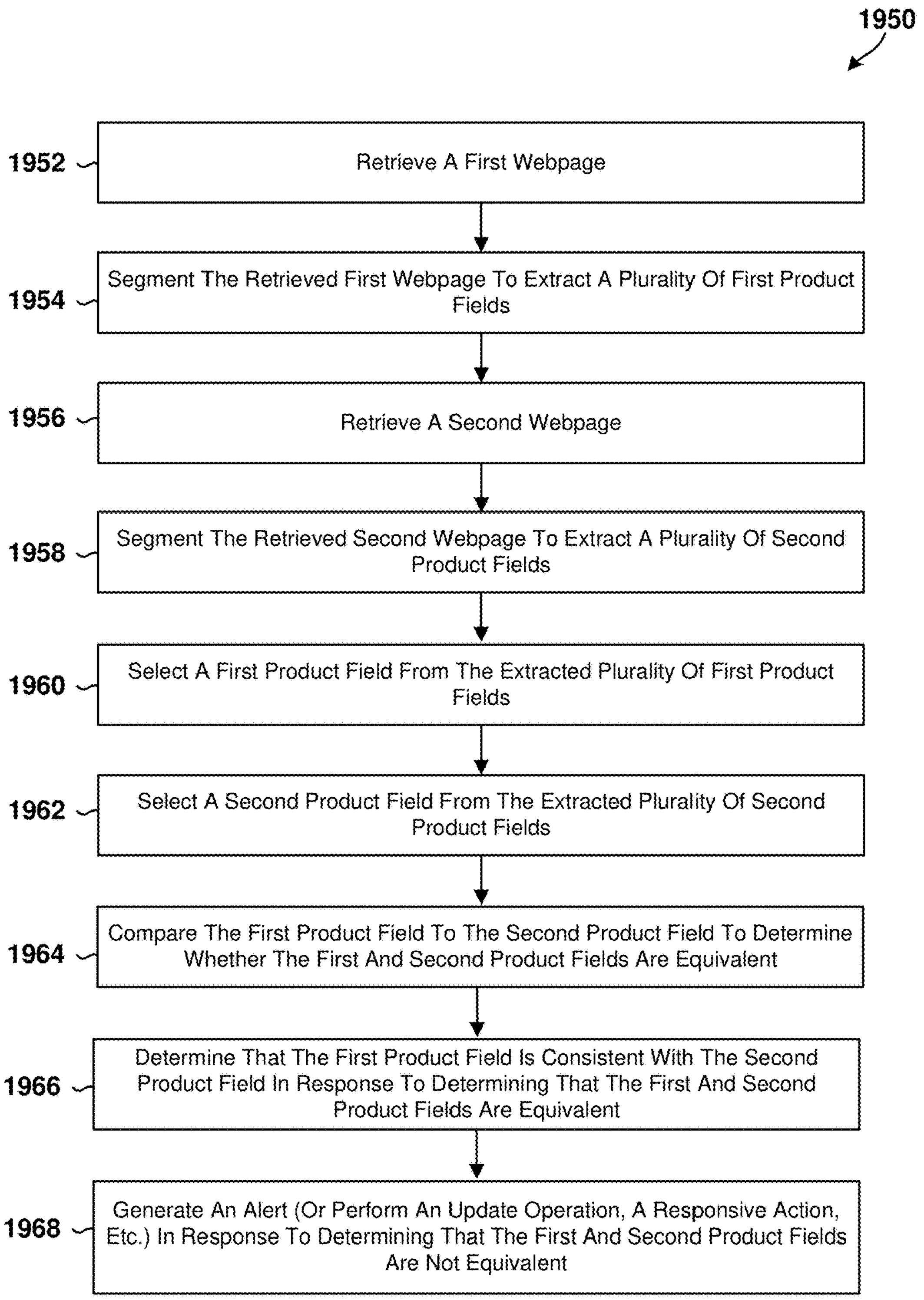

FIGS. 19A and 19B illustrate methods 1900, 1950 of performing quality management using the extracted product fields (e.g., as part of block 1024 in FIG. 10A, etc.) in accordance with some embodiments. Methods 1900, 1950 may be performed by one or more processors in a computing device.

With reference to FIG. 19A, in block 1902, the computing device may retrieve the extracted product fields (e.g., from wherever they were stored as part of block 1022 in FIG. 10A, etc.). In block 1904, the computing device may select a first product field. In block 1906, the computing device may select a second product field. In determination block 1908, the computing device may determine whether a semantic description has been generated for both the first and second selected product fields.

In response to determining that a semantic description has not been generated for both the first and second selected product fields (i.e., determination block 1908="No"), the computing device may determine whether one of the selected product fields is an image in determination block 1910. In response to determining that the selected product field is an image (i.e., determination block 1910="Yes"), the computing device may perform image-based analysis to create a semantic description of the image in block 1912. In response to determining that the selected product field is not an image (i.e., determination block 1910="No"), the computing device may create a semantic description based upon the textual information in the product field in block 1914. The computing device may repeat the operations in blocks 1908-1914 until it determines that a semantic description has been generated for both the first and second selected product fields.

In response to determining that a semantic description has been generated for both the first and second selected product fields (i.e., determination block 1908="Yes"), the computing device may compare the semantic descriptions in block 1916. In determination block 1918, the computing device may determine whether the semantic descriptions differ from each other. This may be based upon exceeding a threshold so that some amount of differing between the product fields is allowed. In response to determining that the semantic descriptions differ from each other (i.e., determination block 1918="Yes"), the computing device may generate an alert in block 1920. The alert be an entry in a log, a notification on a screen, an entry in a report, a trigger message, etc. In response to determining that the semantic descriptions do not differ from each other, or the difference is below a threshold, (i.e., determination block 1918="No"), the computing device may determine that the two selected product fields are consistent in block 1922.

In some embodiments, the computing device may be configured to perform any or all of the responsive actions discussed in this application in lieu of or in response to generating the alert in block 1920 and/or determining that the product fields are consistent in block 1922.

In an embodiment, the alert that is generated in block 1920 may enable a user to identify the alert as a false alert (i.e., to specify that the semantic descriptions of the products fields are equivalent). This false alert identification may be provided as feedback to the method so that it can be used in future determinations. In an alternative embodiment that uses machine learning, this false alert identification may be provided as part of the training operations (e.g., in conjunction with a neural network).

In some embodiments, the computing device may implement and use method 1200 illustrated in FIG. 12 to set an alert that is triggered if it is determined that the location of a product field within the DOM has changed (i.e., in determination block 1212 with reference to FIG. 12). In addition to sending an alert (i.e., in block 1214), the segmenting may be auto-healed by performing the segmenting again (e.g., operations in blocks 1014 and 1016 with reference to FIG. 10).

In an enhanced embodiment, the computing device may be configured to perform re-segmenting operations. The re-segmenting may initially be performed on the nodes of the DOM tree that are closest to the original location of the product field within the DOM (e.g., the parent node, the child nodes, the sibling nodes). The re-segmenting may continue outwards (e.g., to grandparents, grandchildren, cousins, etc.) until the correct product field is located or the entire tree has been searched. This may be an effective search strategy because very often there may have only been a small change to the webpage and the originally sought product field is still relatively close (e.g., a new product field might have been inserted before the product field that is being sought).

In some embodiments, the computing device may be configured to use machine learning models (e.g., reinforcement learning, generative adversarial networks, etc.) to generate webpages and subsequently test the performance and accuracy of the segmenting process (e.g., with reference for FIGS. 10A and 13, etc.) on the generated webpages.

With reference to FIG. 19B, in block 1952, the computing device may retrieve a first webpage. In block 1954, the computing device may segment the retrieved first webpage to extract a plurality of first product fields. In block 1956, the computing device may retrieve a second webpage. In block 1958, the computing device may segment the retrieved second webpage to extract a plurality of second product fields. In block 1960, the computing device may select a first product field from the extracted plurality of first product fields. In block 1962, the computing device may select a second product field from the extracted plurality of second product fields. In block 1964, the computing device may compare the first product field to the second product field to determine whether the first and second product fields are equivalent. In block 1966, the computing device may determine that the first product field is consistent with the second product field in response to determining that the first and second product fields are equivalent. In block 1968, the computing device may generate an alert (Or perform an update operation, a responsive action, etc.) in response to determining that the first and second product fields are not equivalent.

As has already been described, most eCommerce websites consist of numerous types of webpages. These types of webpages may include collection product webpages and single product webpages, and these can be identified and segmented in order to obtain product information. Another type of webpage found on an eCommerce website is a landing webpage (or homepage). Typically there is only one of these on an eCommerce website, and it is the starting point for a typical visit to the website. It is normally returned by the web server when the web browser requests a URL that does not include a specific page or path (e.g., the requested URL may include only a domain name).

The landing webpage is usually a mixture of menus, advertisements, webpage parts, and other unrelated information, and it is often difficult to automatically isolate this information. However, the landing webpage can normally be used to quickly identify and subsequently visit the required collection product webpage and/or single product webpage.

Websites (including eCommerce websites) are typically created for easy use by humans, and therefore they do not tend to follow specific structures, or provide metadata, that enables a machine to obtain a sematic understanding of the website structure. The website structures may be generally inconsistent and brittle due to the vagaries of code implementations by the software engineers who either develop the website frameworks or the websites.

There have been some attempts to address this lack of consistent structural information for websites. For example, the most successful and consistent advances in website data machine readability have been in the area of accessibility (e.g., enabling visually impaired users to navigate websites using non visual information, etc.). However, many websites (including many of the most popular eCommerce websites) do not support such accessibility standards. Another attempt involved the creation of "sitemap" files on websites that identified all of the individual webpages forming the website, but the sitemap files have limited usage and their presence on websites is in decline.

Thus, it is generally challenging to either easily obtain, or automatically generate, a high-level semantic description of the structure of an entire website. Indeed, visitors to websites normally rely exclusively on the visual information provided on a website to enable them to navigate the website.

The various embodiments presented herein may be used to extract information about the overall structure of a website. Further, the various embodiments may also be used in order to create a taxonomy of products that are available for purchase on an eCommerce website.

Figure 20A:
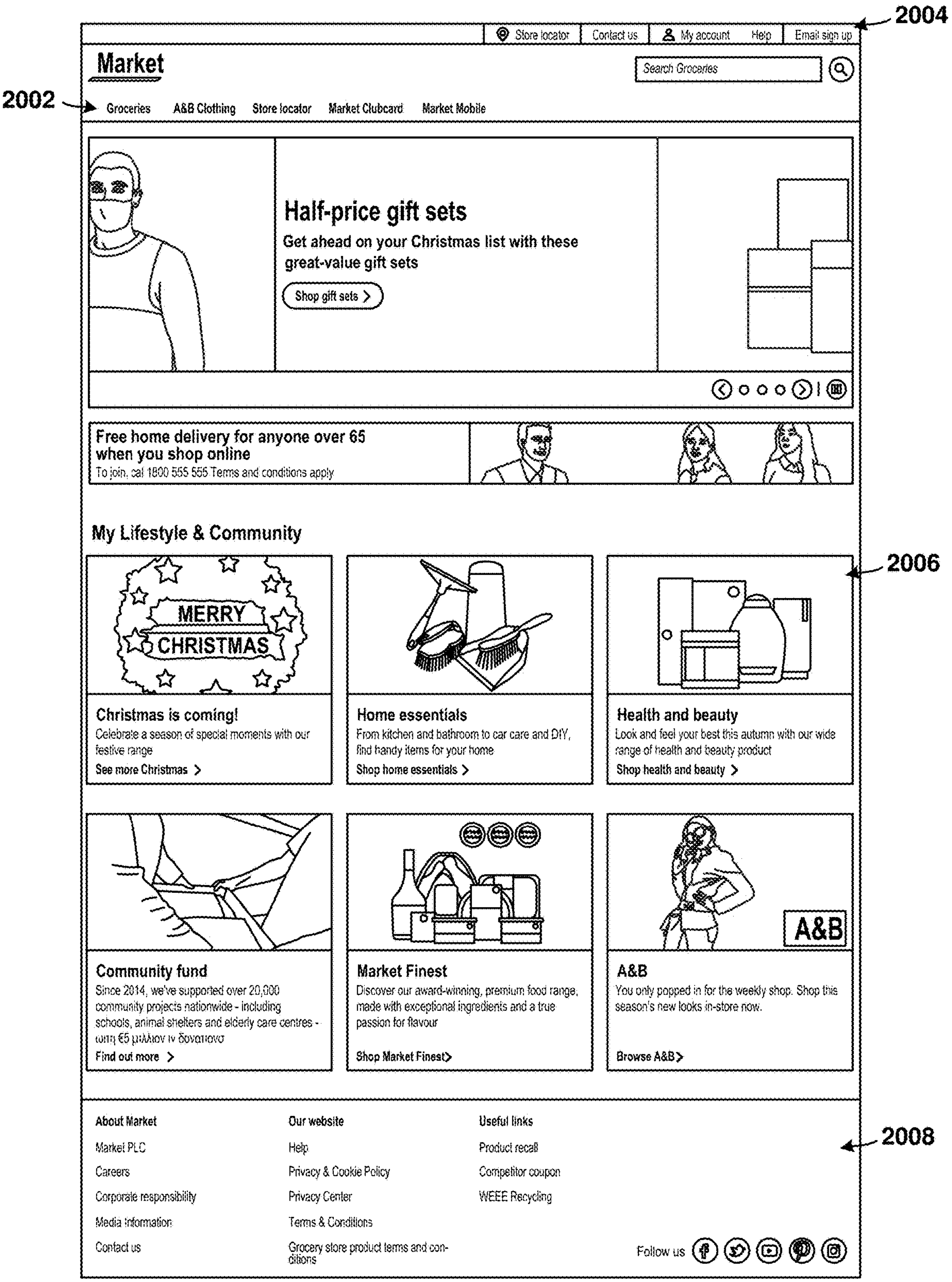
FIGS. 20A-20C are component diagrams that illustrate landing webpages that include various characteristics and product fields that could be extracted and used by a computing device to evaluate how products are presented and sold on an eCommerce website in accordance with some embodiments.
Figure 20B:
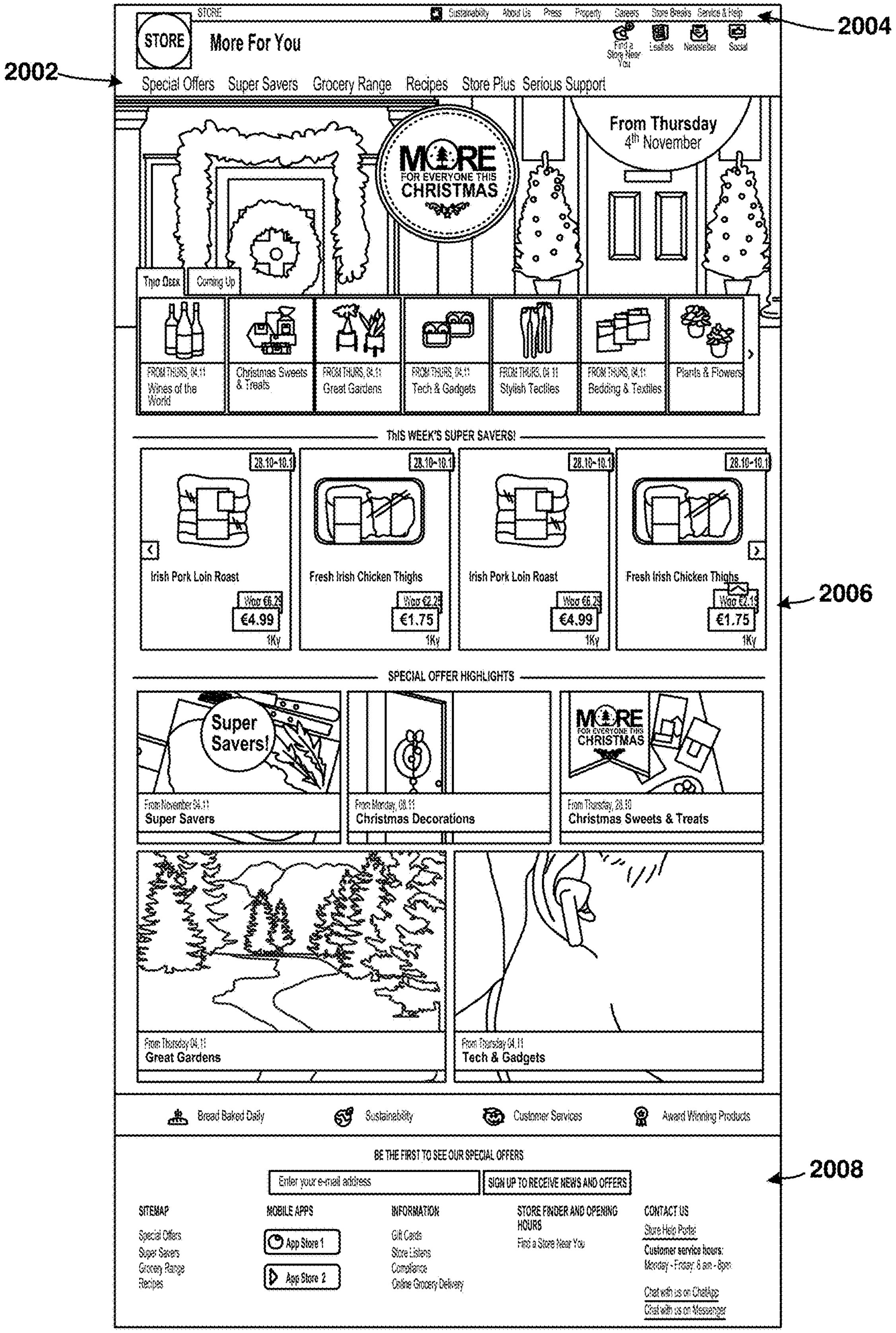
Figure 20C:

FIGS. 20A-20C illustrate example website landing webpages. There are various characteristics that may be used to identify landing webpages and subsequently extract information about the overall structure of the website.

The landing webpage may often include one or more popup windows that are displayed to the user immediately when the webpage is loaded, and it may be impossible to interact with other aspects of the webpage until the user has interacted with the popup windows. Alternatively, it may be possible for the user to interact with other aspects of the webpage and website without the user interacting with the popup windows, but this may cause the popup windows to remain visible irrespective of which webpages the user visits on the website. The popup windows may be removed once the user has interacted with them.

A popup window is likely to include text relating to promotions, the terms and conditions of using the website, and/or information relating to the use of cookies by the website. In such cases, the user can normally click on an "Accept" button in order to dismiss the popup window. The example website landing webpage illustrated in FIG. 20C includes two popup windows 2030, 2034. The popup window 2030 relates to a promotion and it may be dismissed by clicking on an icon 2032, and the popup windows 2034 relates to cookies and it may be dismissed by clicking on a button labelled "Accept All Cookies" 2036.

The main website navigation menu 2002 part of a webpage typically represents the most high-level structure for the website. It may include a list of options (or menu items), and some of these options may be further lists (or menus). It may normally be present near the top of the initial viewport.

The main website navigation menu 2002 may be located immediately adjacent to, or in close proximity to, a keyword such as "Menu," "Navigation," or "Home" (or equivalents in other languages). Alternatively, the main website navigation menu 2002 may be located immediately adjacent to, or in close proximity to, a graphical icon such as the outline of a house, a "hamburger" (so called due to its resemblance to a burger consisting of bread on the top and bottom and a meat filling in the middle), or a company logo. Alternatively, the main website menu navigation 2002 may be rendered in a distinct way relative to its surroundings (e.g., the font color and background color may be inverted, etc.).

In some embodiments, the computing device may be configured to use image recognition techniques on the rendered webpage in order to identify the main website navigation menu 2002.

The main website navigation menu 2002 typically expands or appears over the webpage when the user either clicks on the main website navigation menu 2002, or hovers over it. FIGS. 21A-21D illustrate examples of expanded main website navigation menus 2102 on website landing webpages. The visual representation of the underlying or main part of webpage may be altered when the main website navigation menu is activated (e.g., the webpage is darkened or put out of focus in FIG. 21B-D, etc.). This dynamically expanding behavior of the main website navigation menu is typically enabled using JavaScript® events the act upon the DOM.

Once the main website navigation menu has been activated it may display a list of menu items, headings, or high-level groupings 2104, and each of these list items may include further lists 2106. Indeed, there may be several levels of lists within lists. List items in different levels of the list hierarchy may be rendered differently in order to distinguish them (e.g., different font sizes, different font style, indentation, alongside arrow icons, etc.). List items may include special characters (e.g., ">", etc.) or icons, or they may react to events (e.g., changing the styling of the list item when hovered over, etc.), in order to indicate that they include further lists.

Figure 21A:
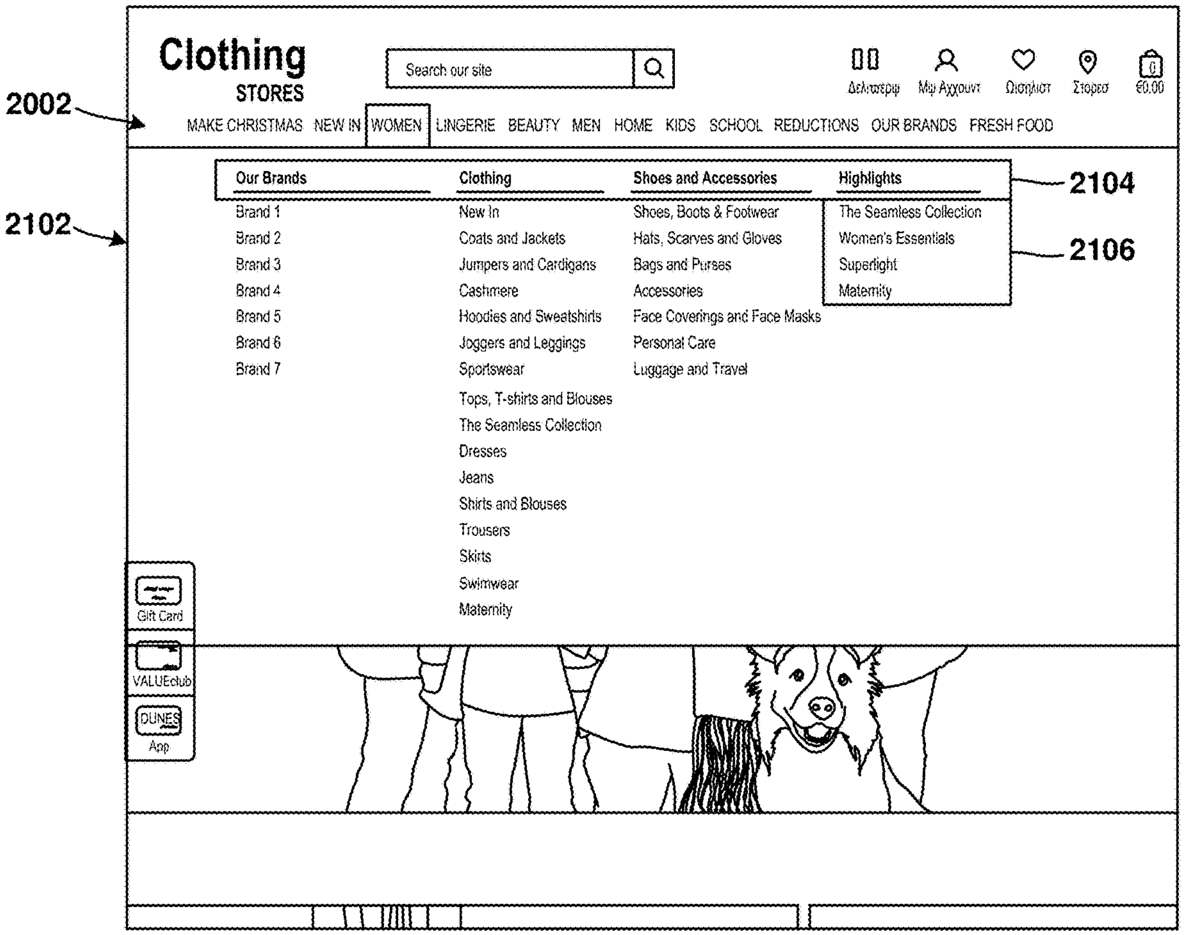
FIGS. 21A-21D are component diagrams that illustrate expanded main website navigation menus of landing webpages that could be used by a computing device to evaluate how products are presented and sold on an eCommerce website in accordance with some embodiments.
Figure 21B:
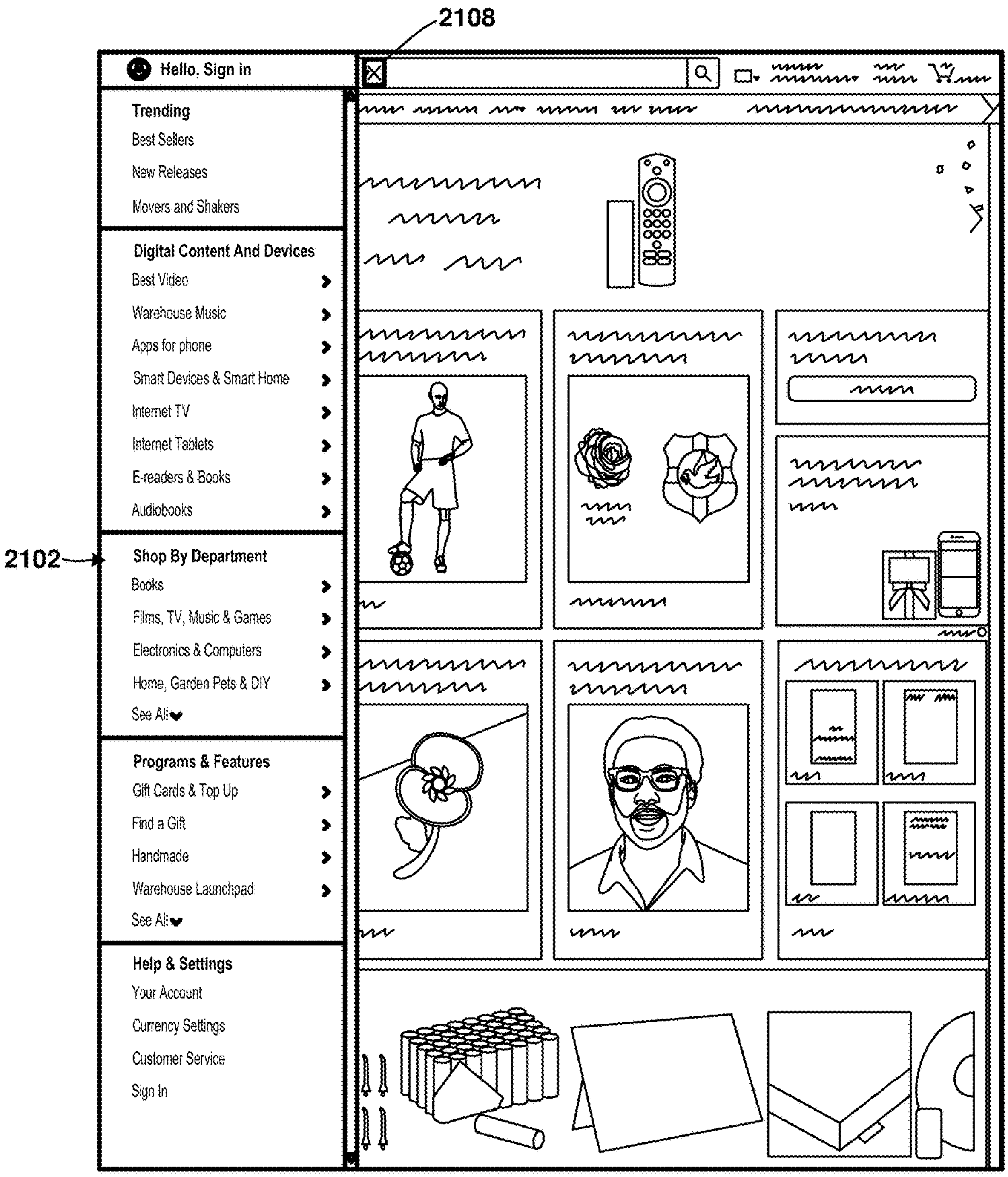
Figure 21C:
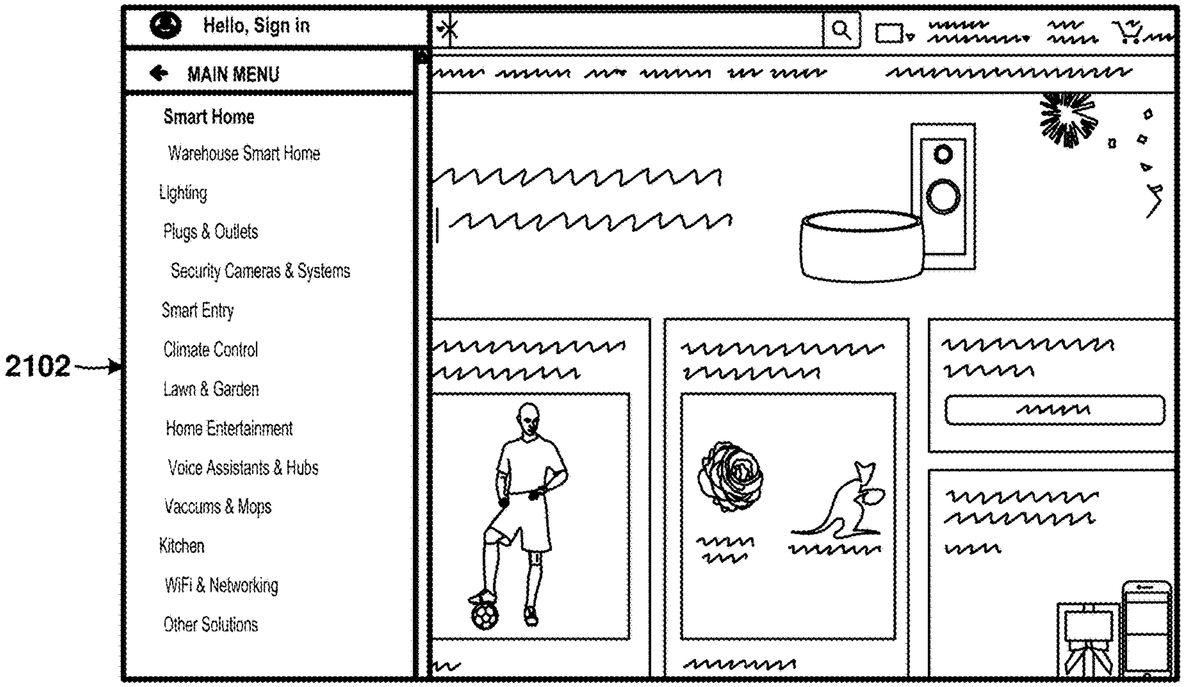

The main website navigation menu may expand down (as shown in FIG. 21A) and/or left and right (as shown in FIG. 21B) when activated, and the list items may be rendered in a grid layout (as shown in FIG. 21A) or in a hierarchical list layout (as shown in FIG. 21B).

Figure 21D:
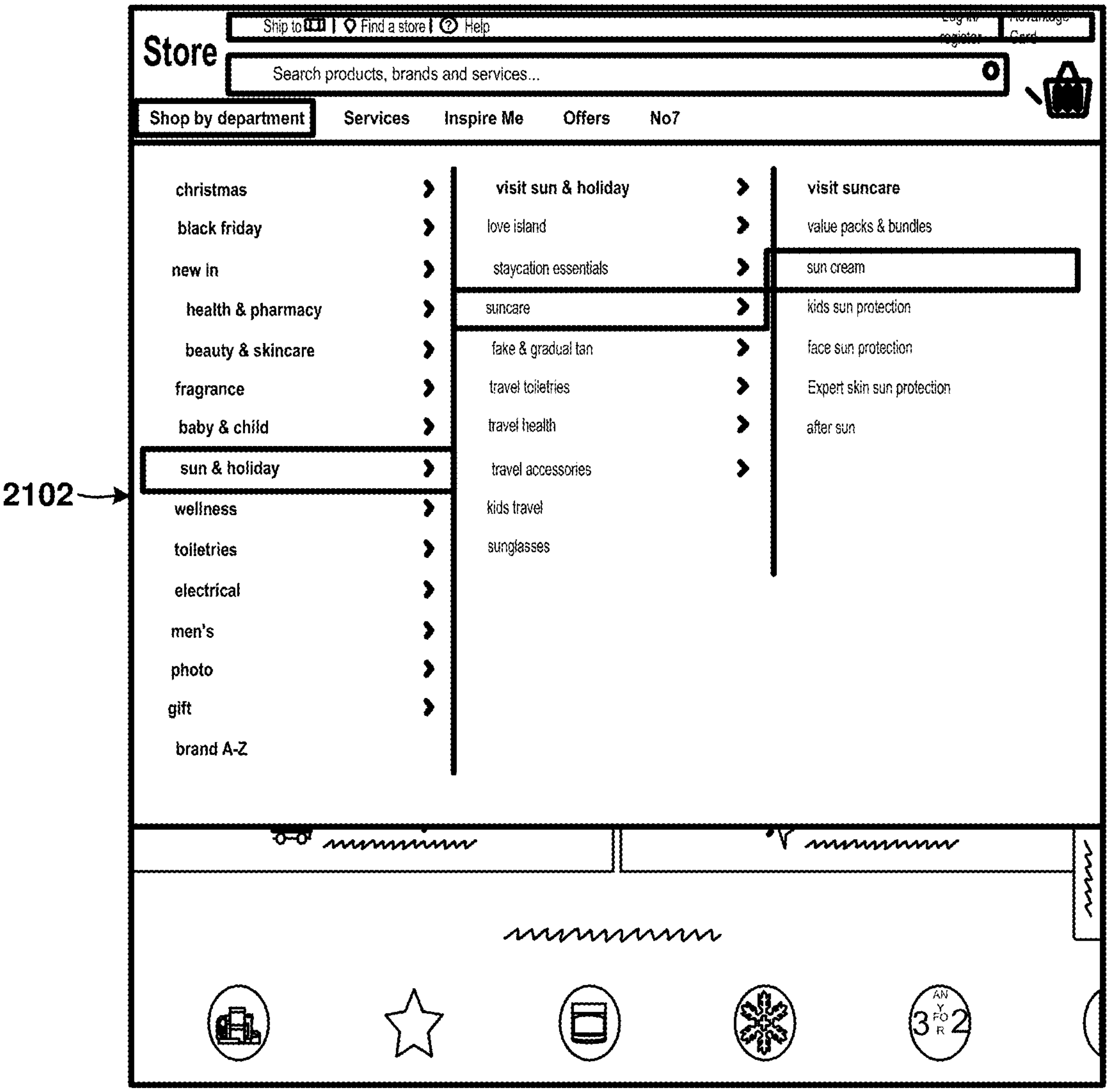

There may be further events associated with any of the list items (e.g., further list expansion when the user hovers over them or clicks them, etc.), and the expanded list may replace the existing list (e.g., the "Smart Home" list in FIG. 21C has replaced the main website navigation menu in FIG. 21B, etc.), or the main website navigation menu may expand further (e.g., the "sun & holiday" list item has expanded to create a new list including a "suncare" list item, which has in turn expanded to a new list including a "sun cream" item in in FIG. 21D, etc.).

Ultimately the list items may be links to collection product webpages.

The main website navigation menu may display some navigation characters or icons (e.g., "<" to indicate backwards navigation, ">" to indicate forwards navigation), and it may include a breadcrumb trail. The main website navigation menu may display text or an icon (e.g., the "X" 2108) that when it is activated it enables the user to close or contract the main website navigation menu.

Figure 22A:
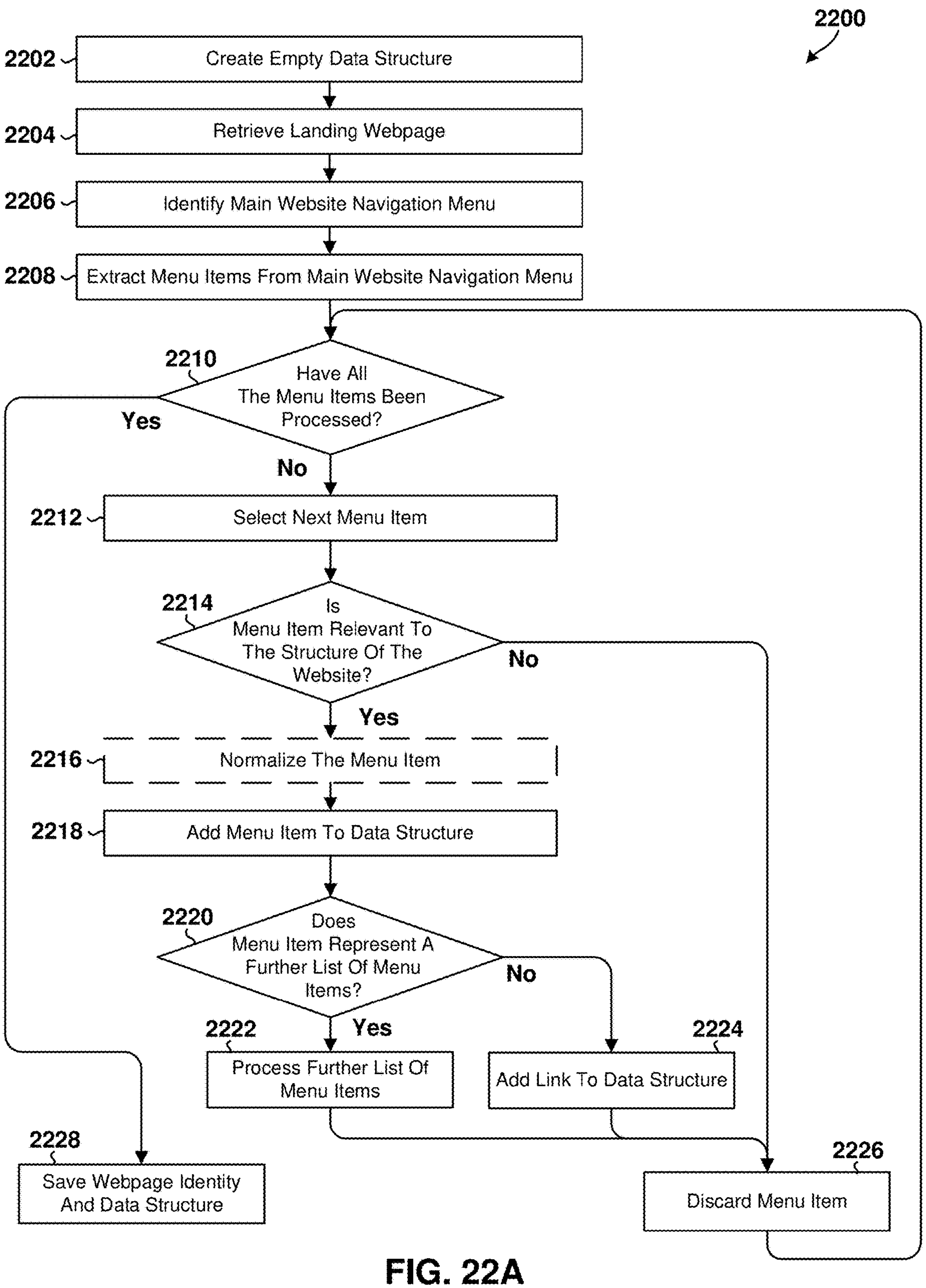
FIGS. 22A and 22B are process flow diagrams that illustrate methods of extracting information relating to the overall structure of a website (e.g., an eCommerce website) and creating a taxonomy of products that are available for purchase on the website in accordance with some embodiments.
Figure 22B:
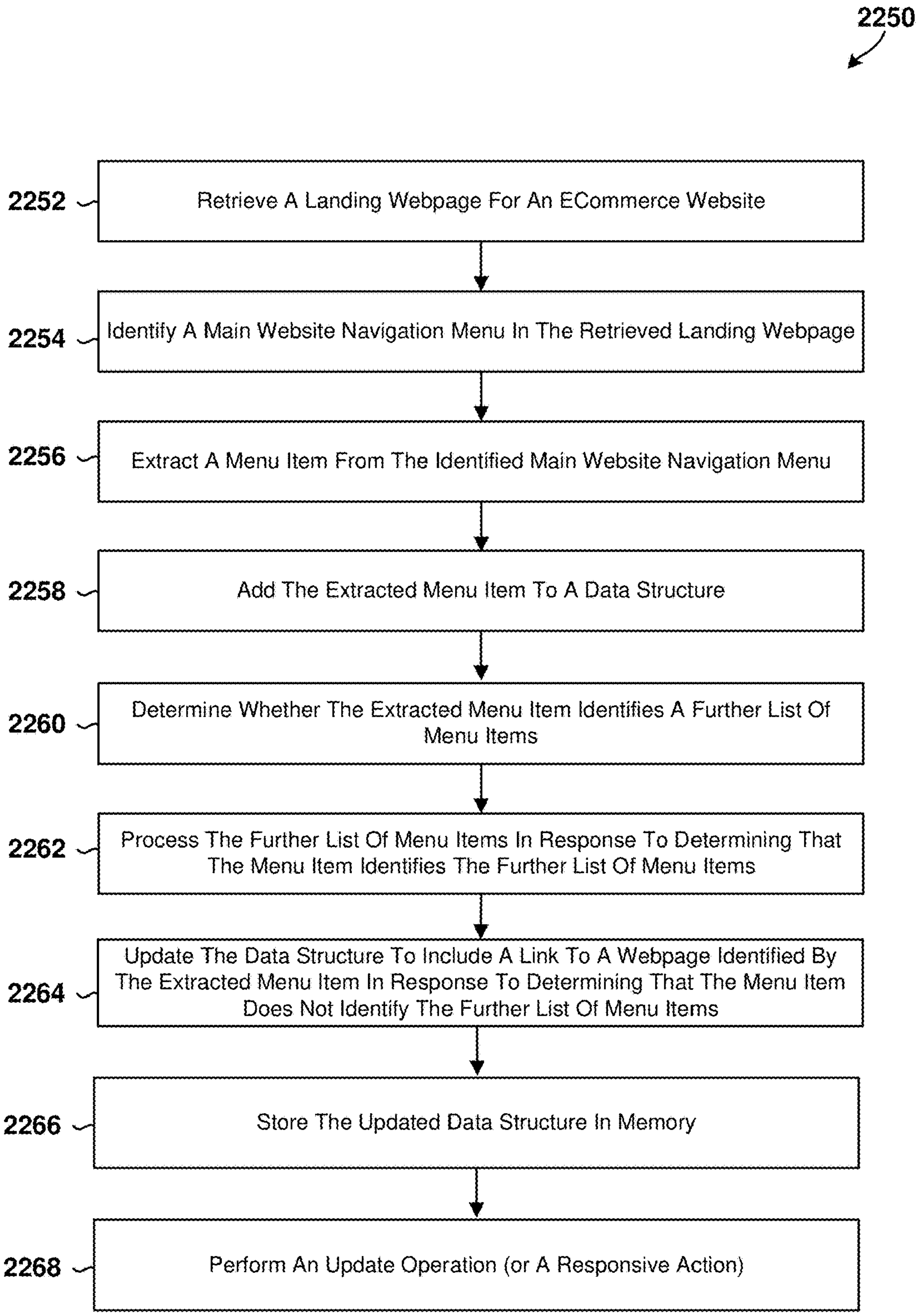

FIGS. 22A and 22B illustrate methods 2200, 2250 of extracting information relating to the overall structure of a website (e.g., an eCommerce website) and creating a taxonomy of products that are available for purchase on the website in accordance with some embodiments. Methods 2200, 2250 may be performed by one or more processors in a computing device.

With reference to FIG. 22A, in block 2202, the computing device may create an empty data structure (e.g., a tree data structure). In block 2204, the computing device may retrieve a landing webpage for the website (e.g., identified using a domain name) and generate its associated DOM. This operation may be further enhanced by using the techniques previously described (e.g., by only generating the portion of the DOM that relates to the initial viewport, by only obtaining the web resources that are needed in order to generate the main website navigation menu, etc.).

In block 2206, the computing device may identify the main website navigation menu using the characteristics previously described (e.g., the presence of specific keywords, icons, or styling, etc.).

The operations in blocks 2208-2226 generally describe how the computing device analyzes the main website navigation menu to extract and process all of the menu items within it (each menu item represents a group of products that are available for purchase on the website). The computing device may perform these operations iteratively and/or recursively, and it may use any well-known search technique (e.g., depth-first search, breath-first search).

In block 2208, the computing device may extract the initial (or top-level) menu items from the main website navigation menu. In determination block 2210, the computing device may determine whether all of the menu items from this initial group of menu items have been processed. In response to determining that not all of the menu items from this initial group of menu items have been processed (i.e., determination block 2210="No"), the computing device may select the next menu item to be processed in block 2212.

In determination block 2214, the computing device may determine whether the selected menu item is relevant to the structure of the website. The relevance of a menu item could be determined statically for all websites, or it could be determined dynamically based upon a user's preference for the specific website or the specific data structure generation for the website. Menu items that may be deemed irrelevant generally relate to collection promotion webpages (e.g., FIG. 1D, "Best Sellers" with reference to FIG. 21B, "black friday" with reference to FIG. 21D), collection brand webpages (e.g., FIG. 1C), or general site operations (e.g., "Your account" with reference to FIG. 21B). These menu items are readily identifiable because they tend to use a relatively small subset of keywords. In response to determining that the selected menu item is not relevant to the structure of the website (i.e., determination block 2214="No"), the computing device may discard the menu item in block 2226.

In response to determining that the selected menu item is relevant to the structure of the website (i.e., determination block 2214="Yes"), the computing device may normalize the menu item in block 2216. Normalization may involve replacing the menu item name with a synonym of the menu item name (e.g., "TVs" may be replaced with "Televisions", etc.). Further, normalization may involve translating the menu item name when the website uses a different language (e.g., the German menu item "Fernseher" may be replaced with "Televisions", etc.).

In an embodiment, a single template set of normalization rules may be used when creating taxonomies for all websites. Further, this template set of normalization rules may be updated automatically based upon the information extracted from a website (e.g., if a new type of item is found).

In block 2218, the computing device may add the menu item to the data structure such that its relationships to other menu items (e.g., child, parent, sibling) is stored. The menu item may be added to either a new part of the data structure (e.g., if it is a new type of menu item) or an existing part of the data structure (e.g., if it is the same as an existing menu item after it has been normalized, etc.). If the menu item was normalized, then additional metadata relating to the original menu item may also be added to the data structure (e.g., the original menu item value, the original menu item language).

In determination block 2220, the computing device may determine whether the menu item represents a further list of menu items (or a link to a collection product webpage). This may be done by examining the rendered webpage, the DOM, or the JavaScript® events associated with the menu item.

In response to determining that the menu item represents a further list (i.e., determination block 2220="Yes"), the computing device may process the further list of menu items in block 2222 (e.g., by recursively processing it as described in blocks 2210-2226).

In response to determining that the menu item does not represent a further list, or in response to determining that the menu item represents a link to a collection product webpage (i.e., determination block 2220="No"), the computing device may add the link to the data structure in bloc 2224. The collection product webpage may be identified and segmented as previously described (e.g., with reference to FIG. 10A).

In an enhanced embodiment, if the segmentation of the collection product webpage identifies a selection mechanism, then the selection options in the selection mechanism may be used to further update the data structure if appropriate. For example, if the menu item in the data structure and the associated collection product webpage relate to "Drinks," and the collection product webpage includes a selection mechanism (e.g., HTML check boxes) with selection options for "Alcoholic" and "Non-Alcoholic," then "Alcoholic" and "Non-Alcoholic" may be added as child menu items to the "Drinks" menu item in the data structure.

In response to determining that all of the menu items from this initial group of menu items have been processed (i.e., determination block 2210="yes"), the computing device may save webpage identity and the associated data structure (e.g., in a relational database or a hash table) in block 2228. The computing device may also store additional information as metadata along with the data structure (e.g., the date and time when the data structure was generated, the amount of time it took to generate the data structure, the criteria that were used to determine if menu items were relevant, any errors, etc.).

In some embodiments, the computing device may be configured to perform any or all of the responsive actions discussed in this application based on the saved webpage identity and the associated data structure and/or in response to saving webpage identity and the associated data structure in block 2228.

With reference to FIG. 22B, in block 2252, the computing device may retrieve a landing webpage for an eCommerce website. In block 2254, the computing device may identify a main website navigation menu in the retrieved landing webpage. In block 2256, the computing device may extract a menu item from the identified main website navigation menu. In block 2258, the computing device may add the extracted menu item to a data structure. In block 2260, the computing device may determine whether the extracted menu item identifies a further list of menu items. In block 2262, the computing device may process the further list of menu items in response to determining that the menu item identifies the further list of menu items. In block 2264, the computing device may update the data structure to include a link to a webpage identified by the extracted menu item in response to determining that the menu item does not identify the further list of menu items. In block 2266, the computing device may store the updated data structure in memory. In block 2268, the computing device may perform an update operation (or a responsive action).

Figure 23A:
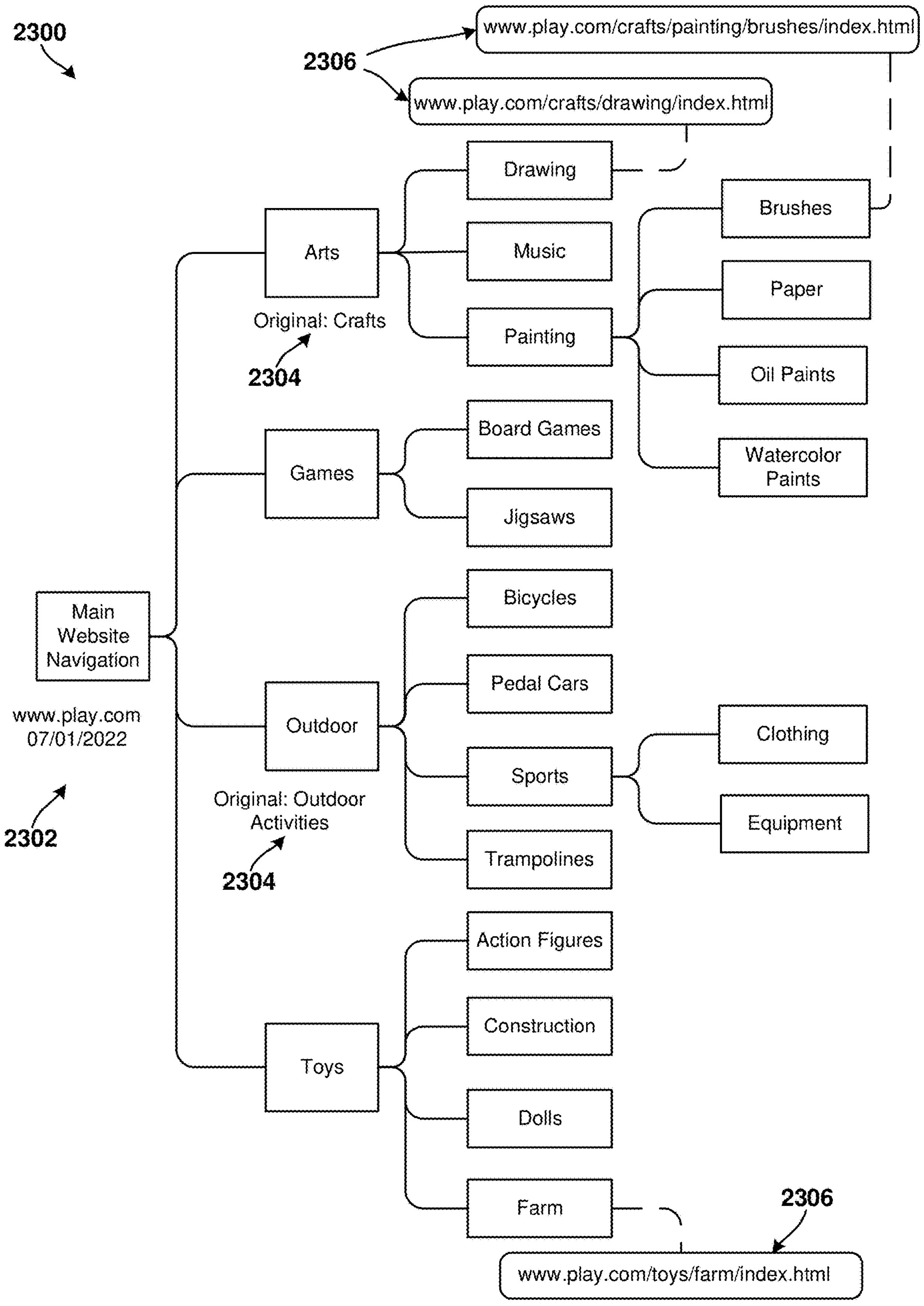
FIGS. 23A and 23B are component diagrams that illustrate example data structures that could be generated and used to evaluate how products are presented and sold on an eCommerce website in accordance with some embodiments.

FIG. 23A illustrates an example data structure 2300 that could be generated and used in some embodiments. In the example illustrated in FIG. 23A, the data structure 2300 that has been populated with information relating to the overall structure of a fictitious website that sells children's toys (www.play.com). The data structure is a tree, and the website identity and the date when the data structure was generated 2302 are associated with the root node (e.g., as a result of the computing device saving the webpage identity and the associated data structure in operation 2228 with reference to FIG. 22A, etc.).

Each node may represent a menu item, and the menu items may represent categories of products. The menu items "Arts" and "Outdoor" were normalized (e.g., as part of operation 2216 with reference to FIG. 22A), and the original menu items have been saved as metadata 2304 (i.e., "Crafts" and "Outdoor Activities").

Every leaf node in the tree (i.e., a menu item that does not include further menu items) has metadata including a link 2306 to a collection product webpage (e.g., as a result of operation 2224 with reference to FIG. 22A). For brevity, and to focus the discussion on the most relevant features, that not all of these links are illustrated in FIG. 23A.

In some embodiments, the computing device may be configured to compare two or more data structures that were generated for a single website at different times, and use the results of the comparison to identify changes to the structure and taxonomy of the website. These changes may include the addition of new menu items, the removal of menu items, the relocation of menu items, and changes to the links to the collection product webpages.

Figure 23B:
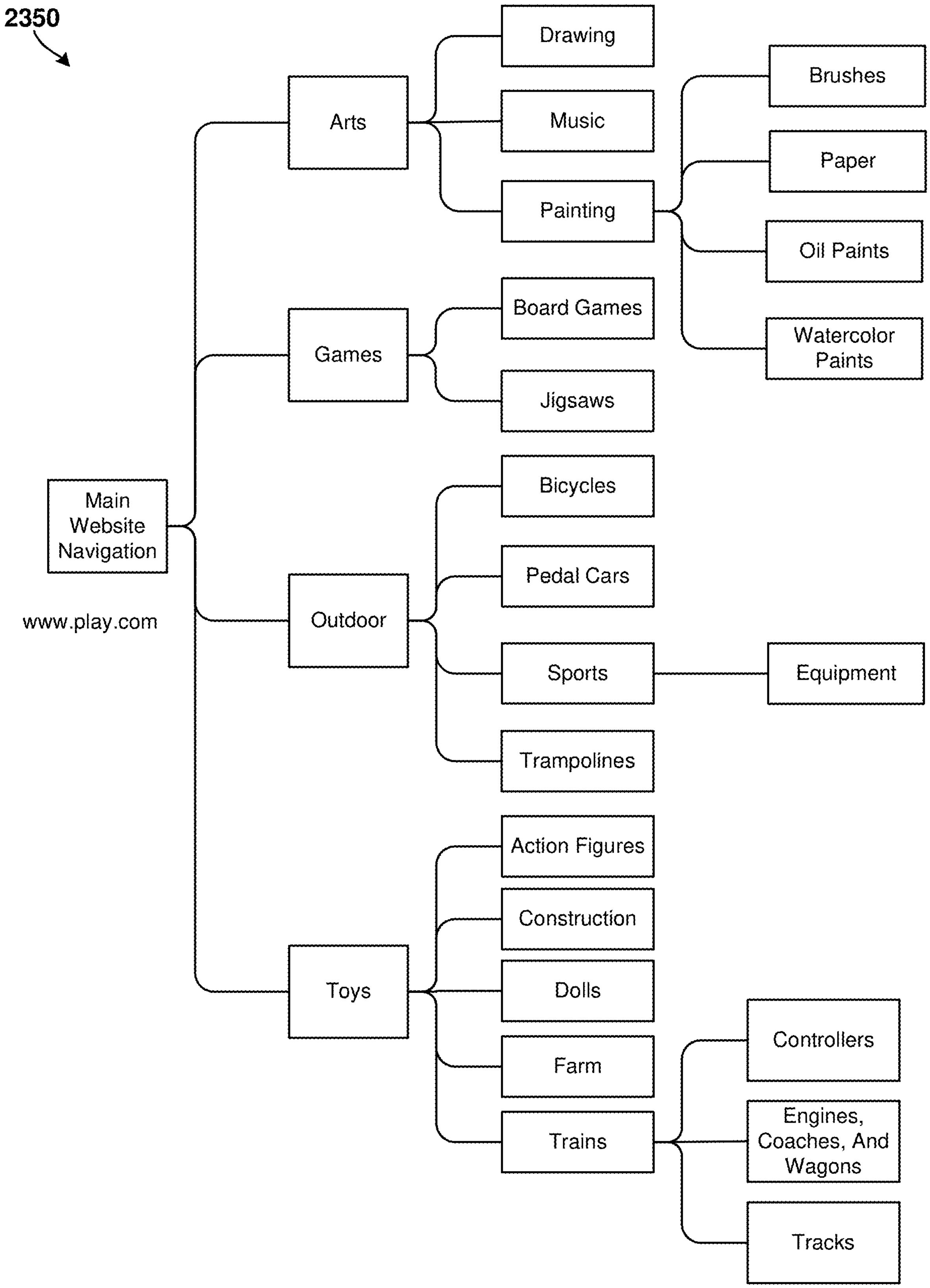

FIG. 23B illustrates an example data structure 2350 that has been populated at a later time with information relating to the overall structure of the same fictitious website that was used in FIG. 23A (i.e., www.play.com). For brevity, and to focus the discussion on the most relevant features, the metadata is not illustrated in FIG. 23B.

When compared to data structure 2300, the data structure 2350 adds the nodes "toys/trains/controllers," "toys/trains/engines_coaches_wagons," and "toys/trains/tracks," and removes "outdoor/sports/clothing."

In some embodiments, the computing device may be configured to produce reports that show only the changes to the website structure and taxonomy, and present these changes in chronological order. For example, a report showing the changes to the data structure illustrated in FIG. 23B compared to the data structure illustrated in FIG. 23A would show that the following menu items were added: "toys/trains/controllers," "toys/trains/engines_coaches_wagons," and "toys/trains/tracks." Further, the same report may show that the following menu items were removed: "outdoor/sports/clothing." The reports may be graphical or textual.

In some embodiments, the computing device may be configured to enable a user to specify the criteria for receiving alerts relating to changes to a website structure (e.g., using a graphical user interface, etc.). The alerts may be general alerts relating to the entire website (e.g., send an alert if a new menu item appears in the taxonomy, etc.) or specific alerts relating to only a part of the website (e.g., send an alert if there is a change within the "Trending" part of the data structure, etc.). In an embodiment, an alert may be sent if the link associated with a menu item is broken (i.e., the web server is unable to return a collection product webpage).

In some embodiments, the computing device may be configured to associate product fields (e.g., a product name that was obtained from the identification and segmentation, etc.) with menu items in the data structure. Thus, each product may be associated with the menu items that may be used to locate the product on the website (i.e., the menu items that link to collection product webpages including the product). Product manufacturers, distributors, and resellers may use this information to determine whether their products can be located using the correct (or most obvious) menu item. For example, a "Polly Dolly" doll should be associated with the "toys/dolls" menu item in FIG. 23A, and it would be detrimental to sales if the "Polly Dolly" doll would be associated with the "toys/action_figures" menu item in FIG. 23A. Further, product manufacturers, distributors, and resellers may be able to set alerts if their products are associated with new menu items, or if their products become dissociated from all menu items.

The comparison of data structures, and the sending of alerts, could occur after operation 2228 in FIG. 22A.

In some embodiments, the computing device may be configured to extract information relating to the overall structure of a website and use it to populate an existing data structure that represents an existing taxonomy of products. For example, an existing data structure that represents an existing taxonomy of products sold by a toy shop may include "Sports" at the same level in the hierarch as "Arts," "Games," "Outdoor," and "Toys." As another example, it may group "Oil Paints" and "Watercolor Paints" together simply as "Paints." Similarly, the various embodiments may be able to convert a data structure that represents a taxonomy of products into a different data structure that represents a different taxonomy of the same products.

In some embodiments, the computing device may be configured to perform quality management on the populated data structure. This may be done by the computing device comparing the path in the link metadata with the path from the root node of the tree to the leaf node associated with the link. These should be broadly similar (after allowing for normalization), as shown in the link metadata examples 2306.

Further quality management may be performed on the populated data structure by comparing the breadcrumb trail 150 on the linked webpage with the path from the root node of the tree to the leaf node associated with the linked webpage. Again, these should be broadly similar (after allowing for normalization).

In some embodiments, the computing device may be configured to use the taxonomy of products that are available for purchase on the website in order to improve the webpage identification and segmentation (e.g., by identifying characteristics for product fields as part of operations 1312-1322 with reference to FIG. 13). For example, if the webpage being identified and segmented is related to "Craft Beer" according to the taxonomy, then the product name or the product summary description are likely to include words relating to the product form (e.g., "can," bottle") and volume (e.g., "330 ml," 500 ml," "0.5 l"). As another example relating to the same webpage, the "Craft Beer" taxonomy of the webpage makes it very likely that there may be detailed product information relating to the percentage of alcohol in the beer (which may be segmented by detecting the presence of the percentage symbol).

In a reverse manner, in some embodiments, the computing device may be configured to use the webpage identification and segmentation in order to improve the taxonomy of products that are available for purchase on the website (e.g., by using extracted product fields as part of block 1018 or 1020 with reference to FIG. 10A, etc.). For example, if the product name or the product summary description within a webpage include words such as "beer" or "ale," words relating to the product form (e.g., "can," bottle"), and words relating to volume (e.g., "330 ml," 500 ml," "0.5 l"), then it is likely that the webpage should be associated with "Craft Beer" according to the taxonomy for the website.

Some websites may include one or more micro-sites that can act as independent websites within the website (e.g., a website that sells women's clothes may have a micro-website dedicated to selling maternity clothes). In some embodiments, the computing device may be configured to process the main website navigation menu, and the micro-website navigation menus, in order to create a single structure and taxonomy of products for the main website and all of the micro-sites (e.g., by recursively repeating the methods previously described herein).

Referring back to FIGS. 20A-20C, the user navigation 2004 typically represents generic operations that a regular user of the website would want to do (e.g., log into the website, view the current contents of a shopping basket, seek assistance, etc.). It may include a list of options that link to user navigation type webpages, and it may normally be present near the top of the initial viewport.

The promotions 2006 part of a webpage typically includes information that has a short lifetime (e.g., a special offer that is only valid for the next weekend, product information about a newly launched product, seasonal products that are now in stock, extended opening hours, competition details, etc.), and the promotions are changed frequently. The promotions are normally displayed in a block list or grid layout, and they normally start on, and continue off the bottom of, the initial viewport. The promotions typically link to collection promotion webpages.

The operational navigation 2008 part of a webpage typically represents navigational options relating to general webpages that are unrelated to any specific activity that the user is performing (e.g., FAQ, policies and procedures relating to product delivery and return, "About Us," "Contact Us," "Terms of Use," privacy policy, cookie preferences). It consists of a list of options based upon keywords (perhaps arranged in a grid layout), and it may normally be present at or near the bottom of the webpage.

Another type of webpage that is found on most eCommerce websites is an operational webpage, and webpages of this type are normally linked to from the operational navigation 2008 part of a webpage. Operational webpages may be further divided into general operational webpages and legal operational webpages.

General operational webpages may be identified based upon the characteristic that they are linked to from the operational 2008 part of a webpage. Further, general operational webpages are normally linked to from every collection webpage and single product webpage on a website.

As another example, general operational webpage may include promotional information generally relating to all products available on the website without listing any specific products (e.g., details relating to a 24 hour flash sale, etc.). The promotional information may also include general terms and conditions associated with the promotion (e.g., limits on the number of items that can be purchased at the sale price, etc.).

In some embodiments, the computing device may be configured to use natural language processing and named entity recognition techniques to identify general operational webpages. As an example, a "Frequently Asked Questions" general operational webpage may be identified using a combination of the webpage title including "FAQ" or "Frequently Asked Questions" and the DOM including a repeating structure consisting of two parts, where the text in the first part predominantly starts with a question word (e.g., "what," "when," "how") and ends with a question mark.

Legal operational webpages may include legal text that controls and regulates the usage of the website, and there may be some legal text that is specific to certain areas (i.e., groups of webpages) of the website. The legal text may also relate to products that are sold on the website and that have some form of regulation associated with them (e.g., minimum age requirements relating to the purchase of alcoholic drinks, compliance of products to health and safety standards such as ISO, EN, and Kite standards). The legal text should normally by complied with by both the owner of the website (e.g., the business selling the products) and the user of the website (e.g., a consumer purchasing products from the website).

Legal operational webpages may be identified based upon the characteristic that they are linked to from the general operational navigation 2008 part of a webpage. Further, legal operational webpages are normally linked to from every collection webpage and single product webpage on a website.

Legal operational webpages may also be identified and segmented based upon the characteristic that they include legal keywords that are unlikely to be found on any other webpages within the website (e.g., "Copyright information,"

"Order acceptance," "Trading information," "Disposal of waste electrical and electronic equipment," "Conditions of use," "Recommendations and personalization," "Trademarks, patents, and other intellectual property," "License and access," "Applicable laws"). Indeed, specific legal keywords may be used to identify the type of legal operational webpage, and to segment the parts within the legal operation webpage (e.g., the term "GDPR" may always relate to the privacy policy).

In some embodiments, the computing device may be configured to further process the segmented parts of legal operational webpages in order to create semantic legal rules that are machine readable and generally equivalent to (or representative of) the legal text (which may often be unstructured and verbose) in the segmented part of the legal operational webpage. For example, legal rules may be created relating to the jurisdiction of applicable law, restrictions on export or transfer of product ownership, and restrictions on data access relating to specific webpages within the website. The computing device may validate the legal rules by using additional information obtained from other parts of the website (e.g., from the machine readable robots.txt file that is generally available in the root folder of all websites, from a cookies notice that was segmented from the main landing webpage of the website, from a detailed product information field that was segmented from a single product webpage, etc.).

In some embodiments, the computing device may be configured to compare two or more segmentations of a legal operational webpage that were generated at different times to identify changes to the legal text. Further, the computing device may compare two or more versions of the legal rules associated with a single legal operational webpage that were generated at different times in order to identify changes to the legal rules. These changes may include the addition of new legal text or legal rules, the removal of legal text or legal rules, the relocation of legal text or legal rules within the legal operational webpage, and changes to the legal text or legal rules.

In some embodiments, the computing device may be configured to produce reports that show only the changes to the legal text or legal rules, and the various embodiments may enable a user to specify the criteria for receiving alerts relating to changes to the legal text or legal rules within a legal operational webpage.

In some embodiments, the computing device may be configured to use natural language processing and named entity recognition techniques to identify, segment, and create rules for legal operational webpages.

The legal text and associated legal rules on a legal operational webpage may control and regulate the circumstances and extent to which webpages that are part of the website can be scraped or parsed (e.g., a website may not be parsed for the purpose of reselling its products, a website may not be parsed for the purpose of obtaining discount codes). In some embodiments, the computing device may be configured so that it does not identify and segment webpages, or generate website structures and taxonomies, for websites that prohibit these actions.

Figure 24:
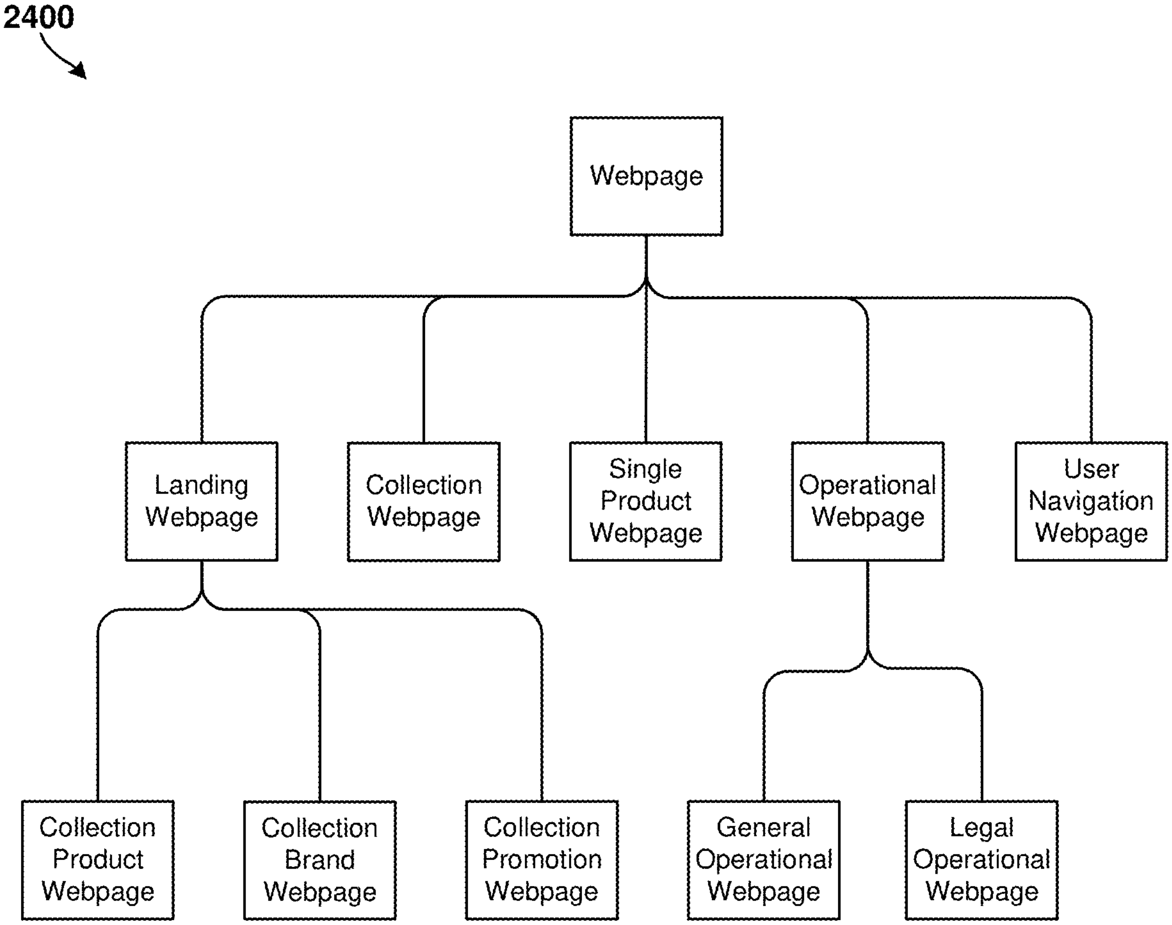
FIG. 24 is a component block diagram that illustrates the hierarchical structure of webpage types within an eCommerce website that could be analyzed in accordance with the various embodiments.

FIG. 24 illustrates the hierarchical structure of webpage types 2400 within an eCommerce website according to an exemplary embodiment. As previously described, any of the techniques described herein (e.g., heuristics, machine learning, natural language processing, named entity recognition, image recognition, etc.) may be used to identify and segment these types of webpages. Further, any of the optimization techniques described herein (e.g., only generating the portion of the DOM that relates to the initial viewport, only obtaining the web resources that are needed in order to generate the required portion of the DOM, etc.) may also be applied to the identification and segmentation of these types of webpages.

FIGS. 25A-25D illustrate a method 2500 of analyzing a website to identify and segment its sections in accordance with some embodiments. Method 2500 may incorporate the various method described in this application. Method 2500 may be performed by one or more processors in a computing device.

Figure 25A:
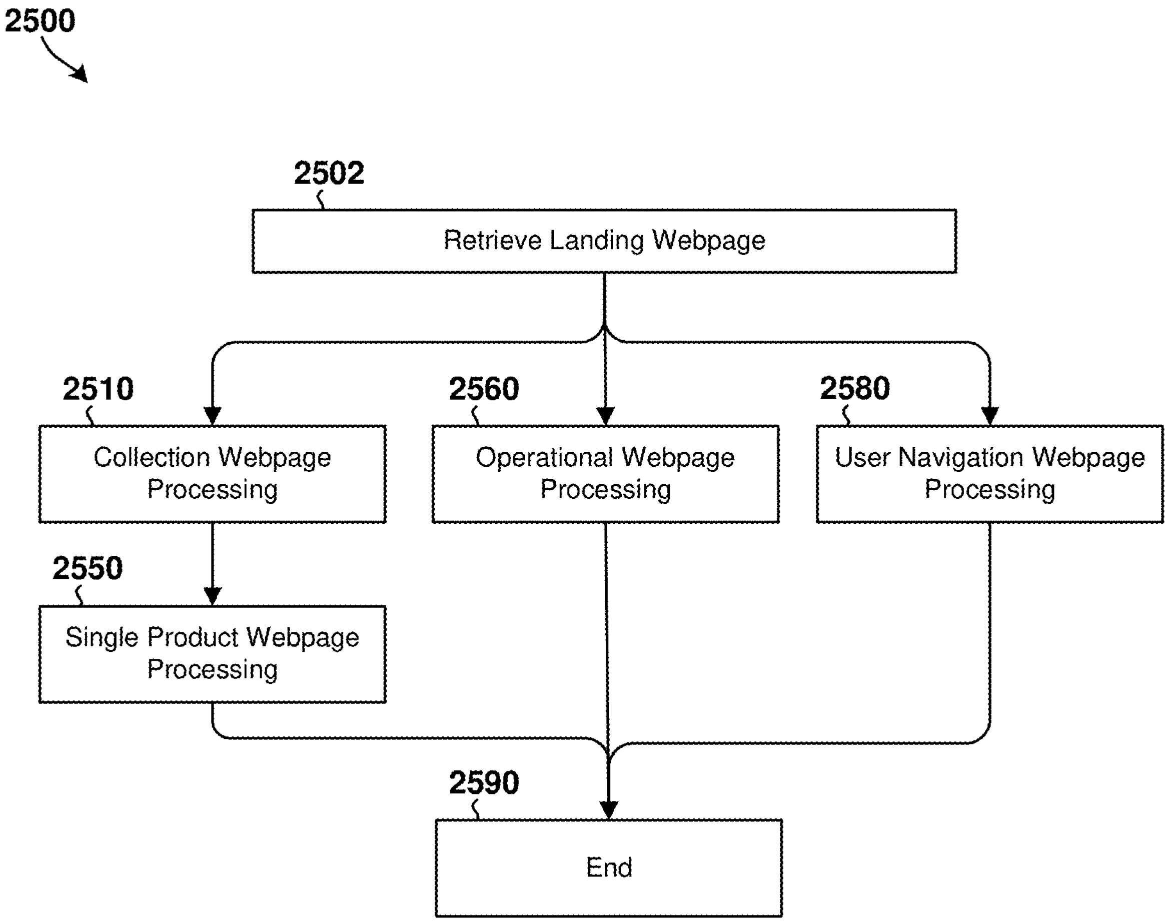
FIGS. 25A-25E are process flow diagrams that illustrate methods of analyzing a website to identify and segment its sections in accordance with some embodiments.
Figure 25B:
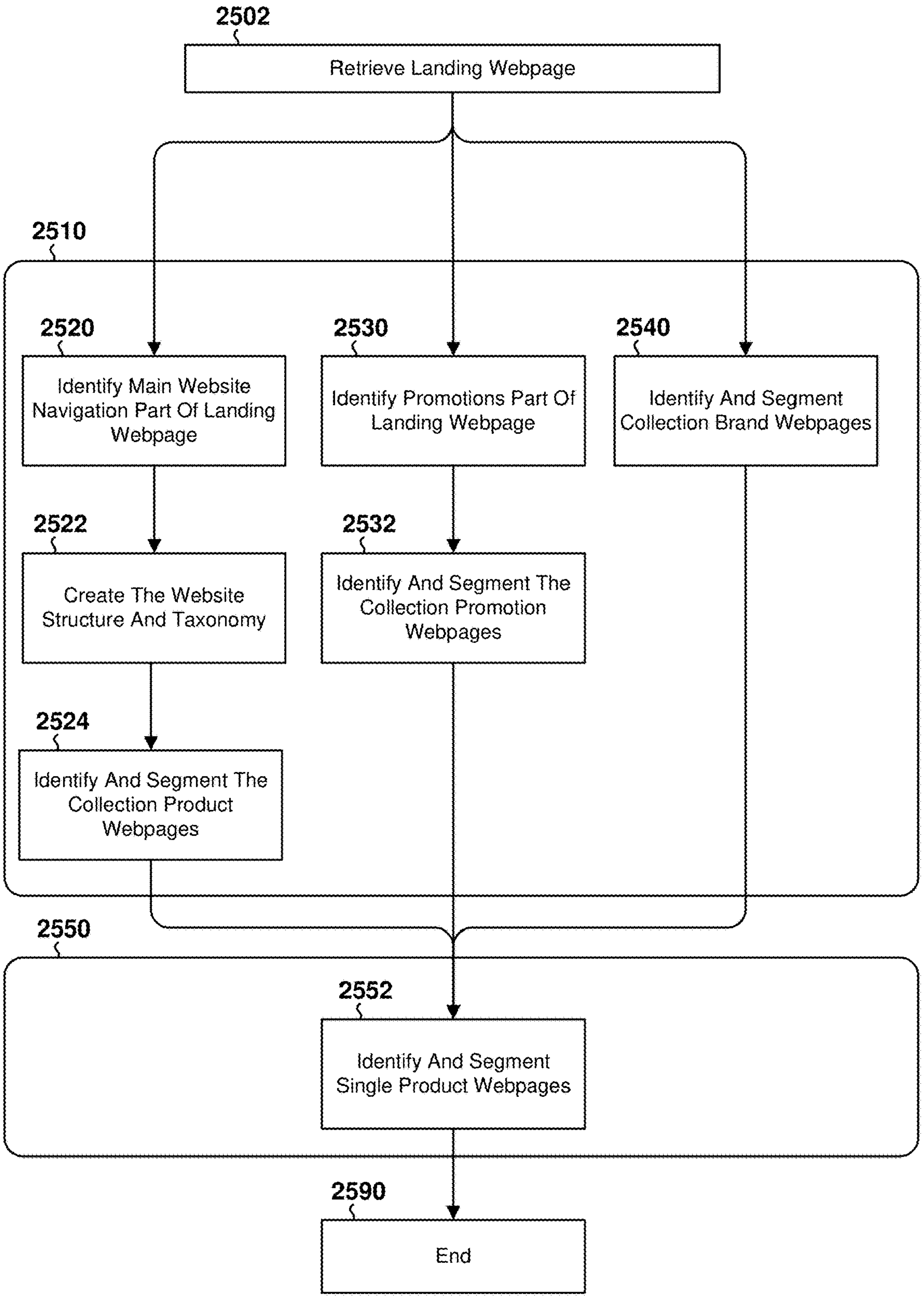
Figure 25C:
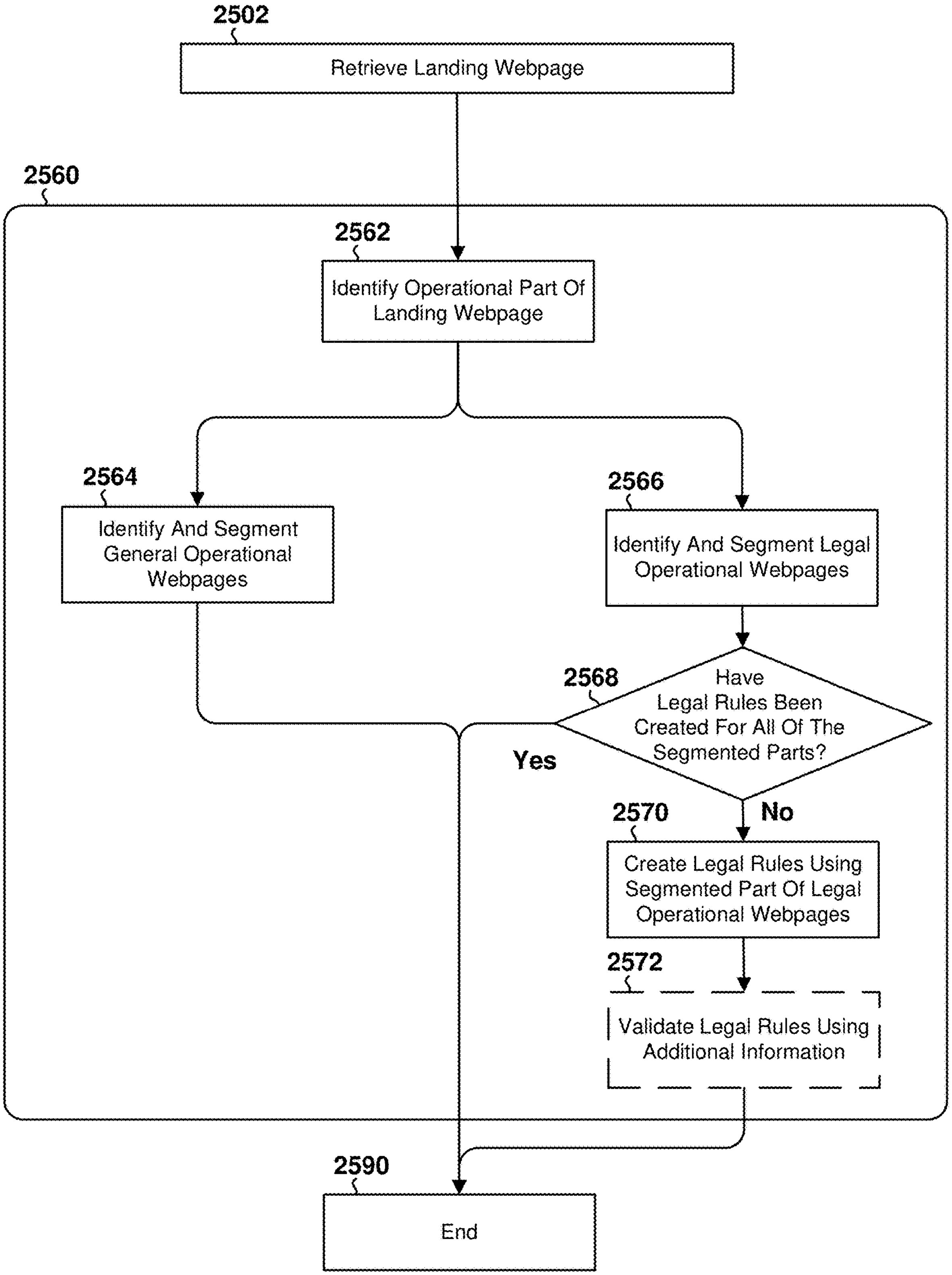
Figure 25D:
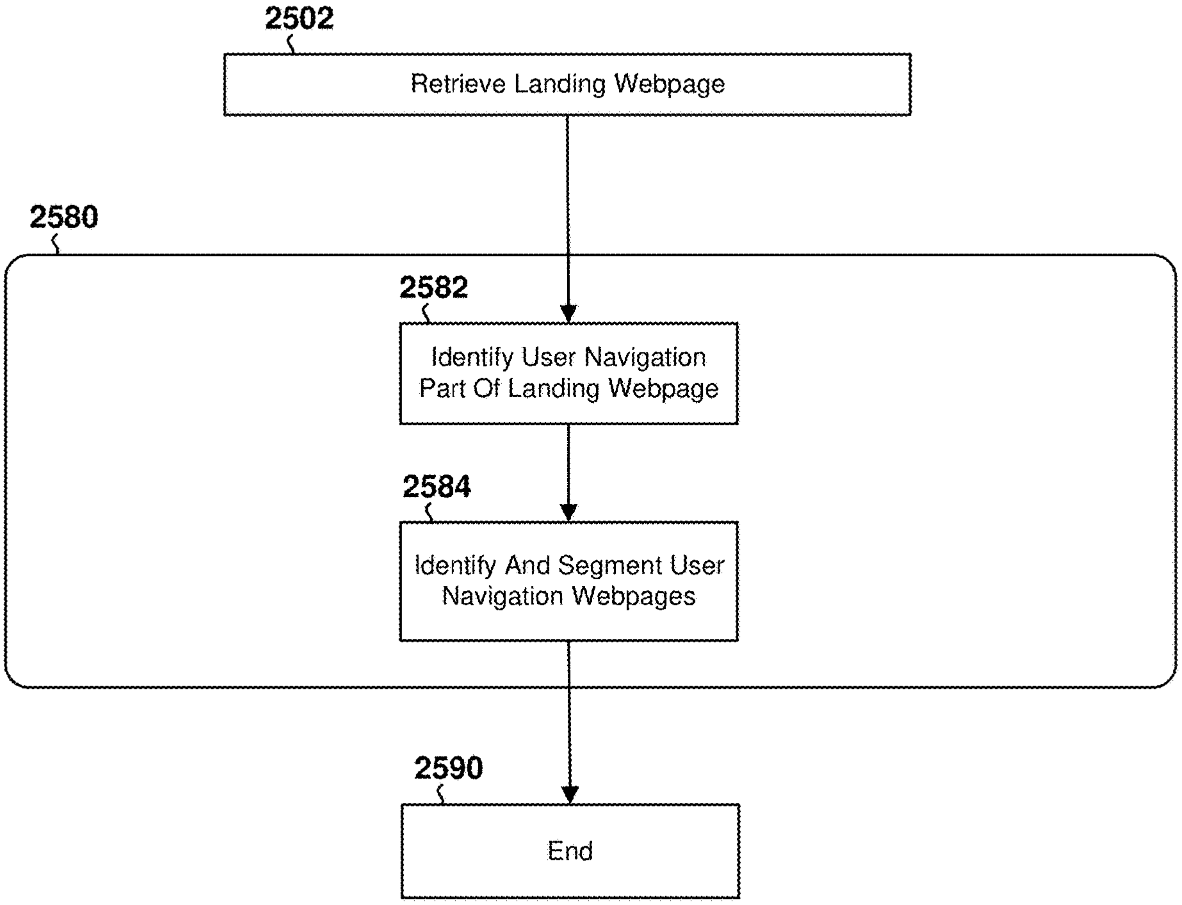

In FIG. 25A, the operational blocks 2510 (for collection webpages), 2560 (for operational webpages), and 2580 (for user navigation webpages) are shown to occur in parallel, but they could equally occur in series in an alternative embodiment. Operational block 2510 (for collection webpages) is shown to occur before operational block 2550 because this may be beneficial to operational block 2550 in various embodiments.

With reference to FIGS. 25A-25D, in block 2502, the computing device may retrieve the landing webpage for the website and generate its associated DOM. This operation may be optimized by using the techniques previously described herein.

Operational block 2510 relates to collection webpages. In block 2520, the computing device may identify the main website navigation part of the landing webpage. In block 2522, the computing device may create the website structure and taxonomy. The operations in blocks 2520 and 2522 may be performed as previously described herein (e.g., with reference to FIG. 22A). In block 2524, the computing device may identify and segment the collection product webpages.

In block 2530, the computing device may identify the promotions part of the landing webpage as previously described herein. In block 2532, the computing device may identify and segment the collection promotion webpages.

In block 2540, the computing device may identify and segment the collection brand webpages.

The identification and segmentation of collection webpages in blocks 2524, 2532, and 2540 may be performed as previously described herein (e.g., with reference to FIG. 10 and FIG. 13).

Operations in blocks 2520-2524, 2530-2532, and 2540 may occur in parallel or in series in the various embodiments.

Operational block 2550 relates to single product webpages. In block 2552, the computing device may identify and segment the webpages as previously described herein (e.g., with reference to FIG. 10 and FIG. 13).

Operational block 2560 relates to operational webpages. In block 2562, the computing device may identify the operational navigation part of the landing webpage. In block 2564, the computing device may identify and segment the general operational webpages as previously described herein. In block 2566, the computing device may identify and segment the legal operational webpages as previously described herein.

In determination block 2568, the computing device may determine whether rules have been created for all of the segmented parts of the legal operational webpages. In response to determining that rules have not been created for all of the segmented parts of the legal operational webpages (i.e., determination block 2568="No"), in block 2570 the computing device may create rules for a segmented part of a legal operational webpage that was not previously associated with any rules. In block 2572, the computing device may validate the created rules using additional information as previously described herein.

Operations in blocks 2564 and 2566-2572 may occur in parallel or in series in the various embodiments.

Operational block 2580 relates to user navigation webpages. In block 2582, the computing device may identify the user navigation part of the landing webpage. In block 2584, the computing device may identify and segment the user navigation webpages as previously described herein. The computing device may terminate, exit or end the method 2500 in block 2590.

In some embodiments, the computing device may also perform any or all of the responsive actions described in this application instead of or in response to ending the method 2500 in block 2590.

Figure 25E:
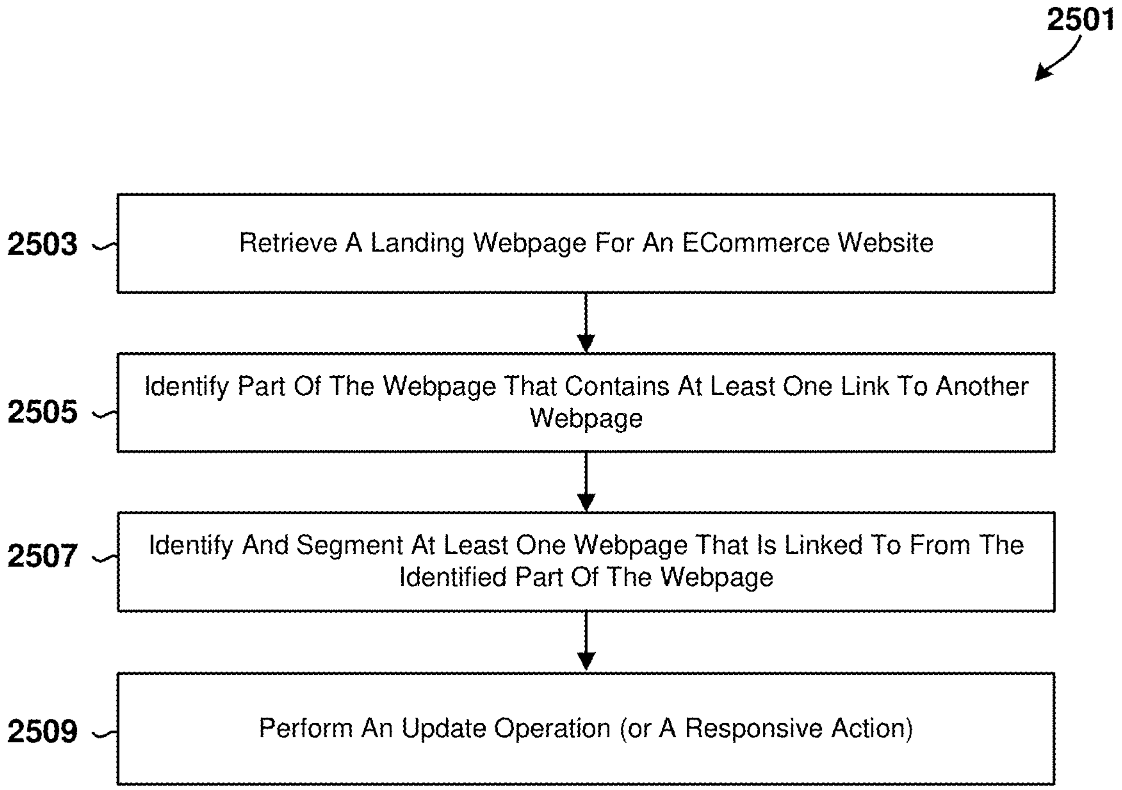

With reference to FIG. 25E, in block 2503, the computing device may retrieve a landing webpage for an eCommerce website. In block 2505, the computing device may identify part of the webpage that contains at least one link to another webpage. In block 2507, the computing device may identify and segment at least one webpage that is linked to from the identified part of the webpage. In block 2509, the computing device may perform an update operation (or a responsive action).

Figure 26A:
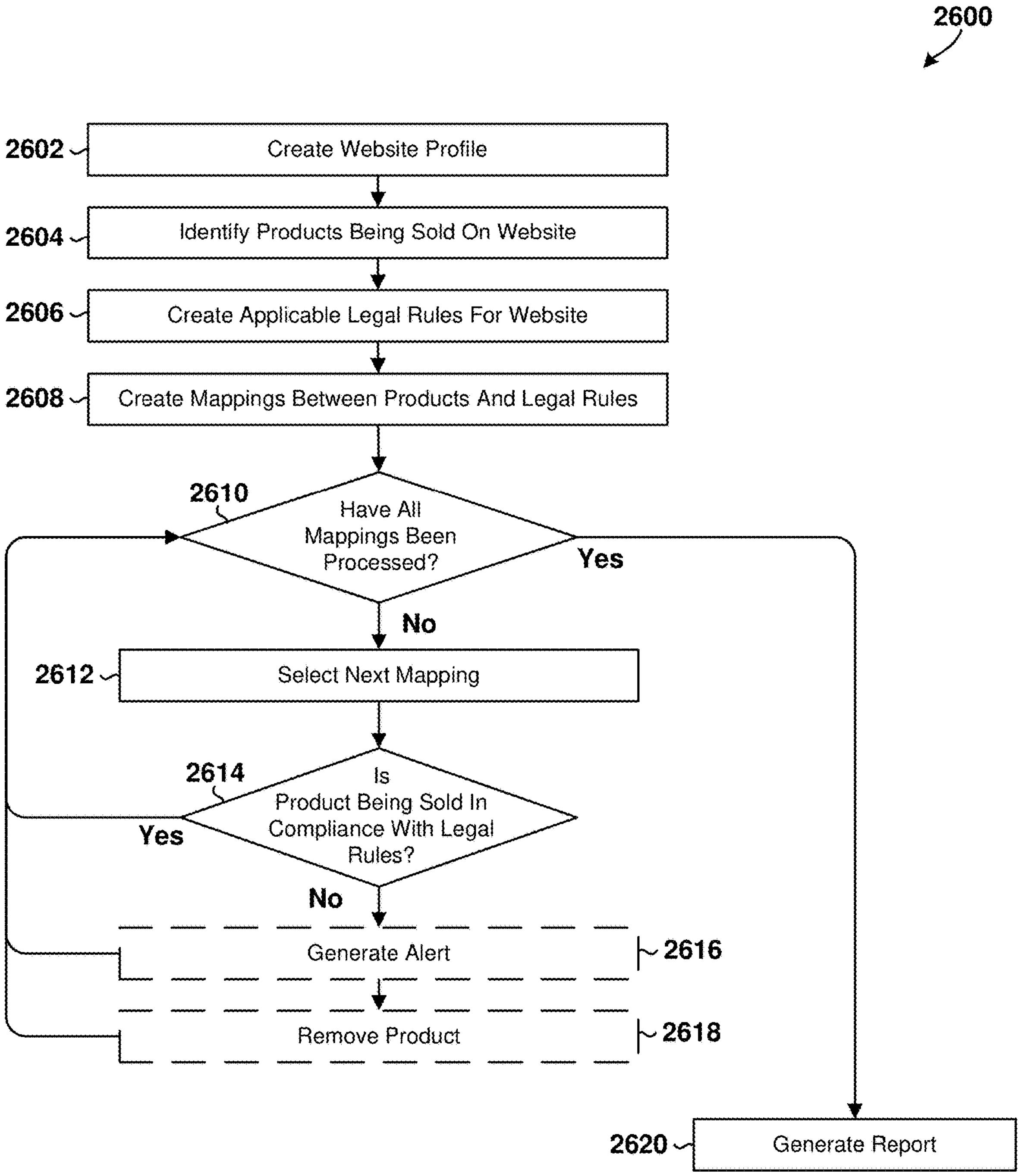
FIGS. 26A and 26B are process flow diagrams that illustrate methods of determining whether products sold by an eCommerce website are being sold in compliance with the applicable regulations and laws in accordance with some embodiments.
Figure 26B:
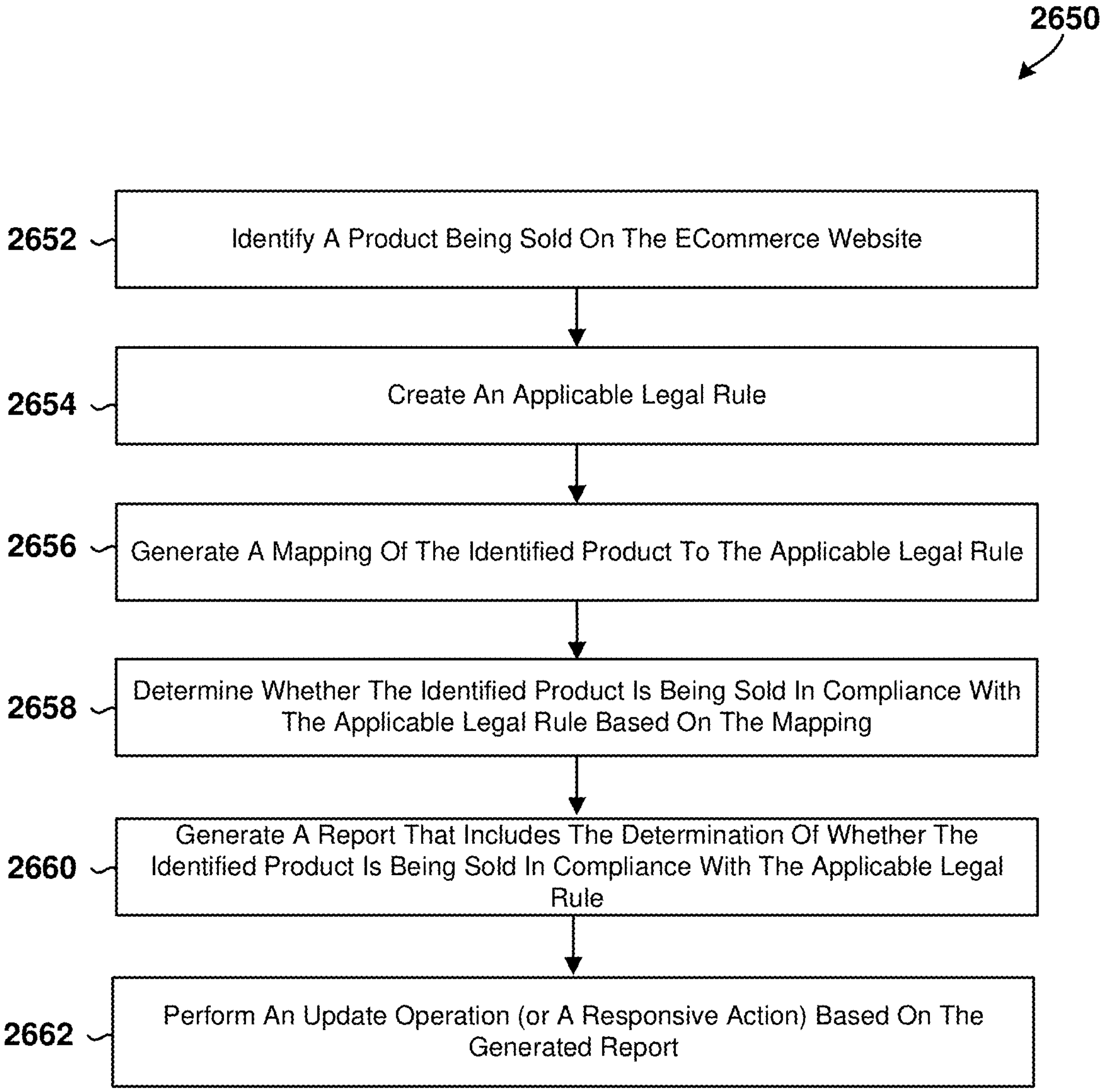

FIGS. 26A and 26B are process flow diagrams illustrating methods 2600, 2650 of ensuring that products are sold by an eCommerce website in compliance with the applicable regulations and laws in accordance with some embodiments. Methods 2600, 2650 may be performed by one or more processors in a computing device.

With reference to FIG. 26A, in block 2602, the computing device may create a profile for the website. This profile may include information relating to the website, such as its IP address, its location (e.g., the country where it is hosted) based upon performing a geolocation lookup using its IP address, the top level domain (TLD) being used by the website (e.g., .com, .de, .jp, etc.), the display languages used by the website (including default language and supported languages), the currencies used by the website (including default currency and supported currencies) (e.g., obtained while segmenting single product webpages, etc.), and the type of products sold on the website (e.g., food, clothes, medicines, etc.) based upon the website taxonomy.

In block 2604, the computing device may identify products being sold on the website. It is likely that each product may have a unique single product webpage and a unique product stock number. The products may be obtained by generating the website structure and taxonomy and by segmenting the collection product webpages and single product webpages as previously described herein.

In block 2606, the computing device may create applicable legal rules for the website. Some of these legal rules may apply to all webpages and products on the website, whereas others of these legal rules may apply to subsets of webpages and products on the website (e.g., the website may act as an eCommerce marketplace that includes one or more micro-sites that are specific to individual retailers, and these retailers may be subject to different legal rules, etc.). The legal rules may relate to the disposal of waste electrical and electronic equipment, the selling of products to people of specific ages, the transferring of products (e.g., tobacco, medicines, weapons) to specific jurisdictions, product safety information, and food nutritional information. The legal rules may be created by segmenting the legal operational webpages as previously described herein. They may also include legal rules based upon well-known international regulations that are applicable to all websites (e.g., US FTC promotions and pricing regulations, US FTC electronic commerce guidelines, EU eCommerce shipping and delivery regulations, safety notification regulation, OECD guidelines for eCommerce, and regulations relating to food nutrition, ingredients, and allergy labeling).

In block 2608, the computing device may create mappings between the products and the legal rules. The computing device may use these mappings to determine which legal rules are applicable to a specific product.

In determination block 2610, the computing device may determine whether all of the mappings between the products and the legal rules have been processed. In response to determining that not all of the mappings between the products and the legal rules have been processed (i.e., determination block 2610="No"), the computing device may select next mapping that has not been processed in block 2612.

In determination block 2614, the computing device may determine whether the product is being sold in compliance with the legal rules to which it is mapped (e.g., by determining if the product's applicable legal rules are included in one of the product fields within the product's single product webpage, etc.). For example, if a product is only allowed to be sold in specific jurisdictions, then this information should be included in one of the product fields (e.g., the detailed product information field, etc.) within the product's single product webpage. Further, an enhanced embodiment may try to retrieve the single product webpage using a web browser that is located in a jurisdiction that is not allowed, and subsequently compare the two versions of the single product webpage in order to determine if they are different (e.g., the version retrieved using a web browser that is located in a jurisdiction that is not allowed should not include a purchase control).

In response to determining that the product is not being sold in compliance with the legal rules to which it is mapped (i.e., determination block 2614="No"), the computing device may generate an alert in optional block 2616. This may be particularly useful to the website owner and to product and brand managers because they may need to take prompt action in order to remediate the non-compliance.

In an enhanced embodiment, the method may remove the product from the website (i.e., so that it is not possible to purchase it) in optional block 2618 (e.g., by using an API to access a product inventory and setting the product as "withdrawn" or "suspended").

In response to determining that all of the mappings between the products and the legal rules have been processed (i.e., determination block 2610="Yes"), the computing device may generate a report in block 2620. In some embodiments, the computing device may also perform any or all of the responsive actions described in this application instead of or in response to generating the report in block 2620.

The report generated in block 2620 may form a product compliancy graph, and it may include a product-by-product listing that shows if the product is being sold in compliance with the legal rules to which it is mapped. Alternatively, the report may group related products together (e.g., all wines may be grouped together as "Wine" based upon the website's taxonomy) and provide the compliancy information in relation to the groups of products. If a product is not being sold in compliance with the legal rules to which it is mapped, the report may include details of the specific legal rules that are not being complied with by the product.

With reference to FIG. 26B, in block 2652, the computing device may identify a product being sold on the eCommerce website. In block 2654, the computing device may create an applicable legal rule. In block 2656, the computing device may generate a mapping of the identified product to the applicable legal rule. In block 2658, the computing device may determine whether the identified product is being sold in compliance with the applicable legal rule based on the mapping. In block 2660, the computing device may generate a report that includes the determination of whether the identified product is being sold in compliance with the applicable legal rule. In block 2662, the computing device may perform an update operation (or a responsive action) based on the generated report.

In some embodiments, the computing device may be configured to perform analysis across two or more websites (e.g., product analysis across multiple eCommerce websites, etc.). This may require that the computing device determine the structure and taxonomy of each website (e.g., as previously described herein with reference to FIG. 22A, etc.), and its webpages to be identified and segmented (e.g., as previously described herein with reference to FIG. 10A, etc.).

The multi-website analysis may be performed at an aggregate level. For example, an investor or hedge fund manager may want to determine how a business compares to its competitors in terms of the number of products that it sells, and the variance in product prices for identical products.

As another example, a product manufacturer or a reseller (e.g., the operator of an eCommerce website) may want to obtain multi-website insights in relation to the products that are being promoted and/or newly emerging products. The newly emerging products may be variations of existing products, and the variations may be limited to details that are only identified in the product images (e.g., blue and yellow sarongs may be in fashion for the coming summer season, t-shirts with images or patterns of sunflowers may be popular at the moment).

The multi-website analysis may be used by the various embodiments as part of determining the structure and taxonomy of a website (e.g., as previously described herein with reference to FIG. 22A, etc.). The computing device may be configured to create a generic (or universal) website structure and taxonomy for two or more websites by combining their individual website structures and taxonomies. The resulting generic website structure and taxonomy may be used as a starting point when determining the website structure and taxonomy of a new website for the first time.

Figure 27A:
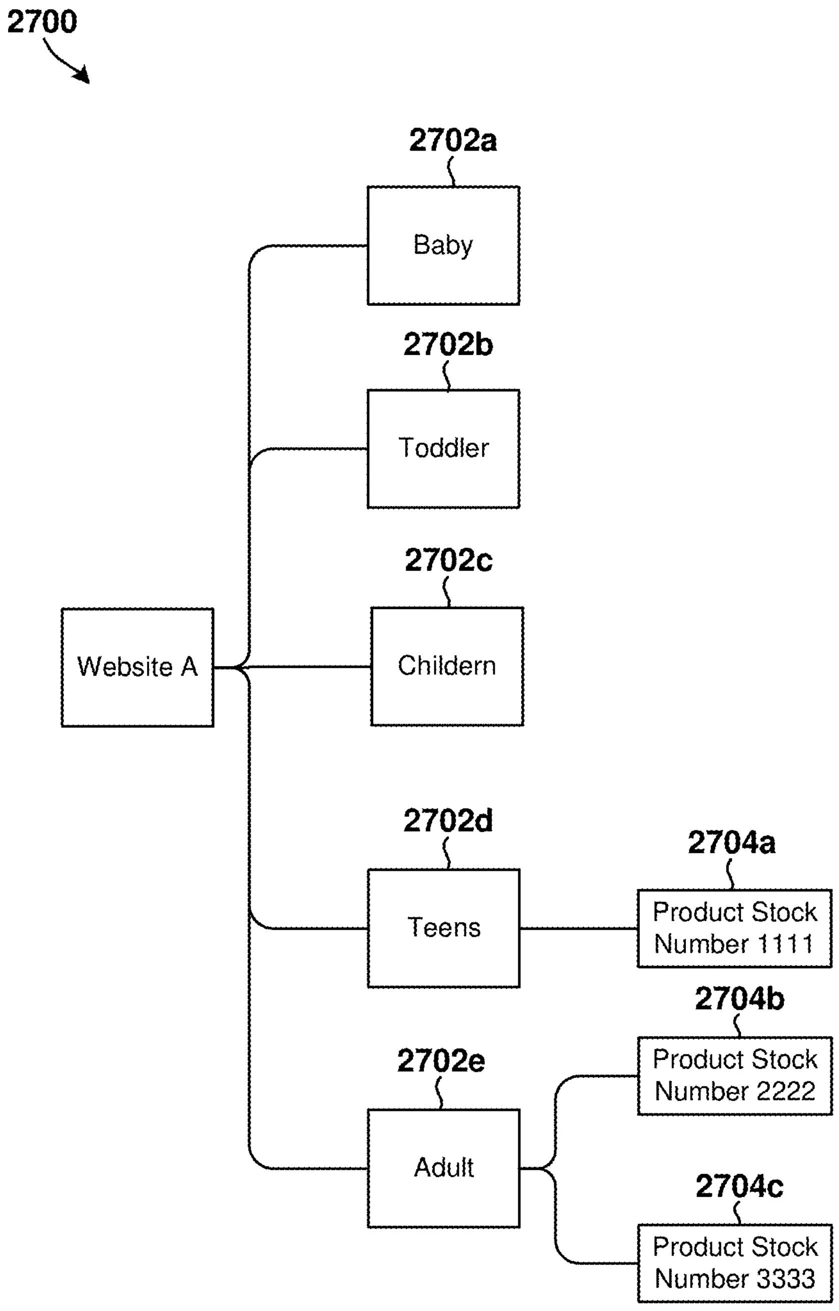
FIGS. 27A-27C are component diagrams that illustrate example data structures and taxonomies that could be generated and used by a computing device to evaluate how products are presented and sold on an eCommerce website in accordance with some embodiments.
Figure 27B:
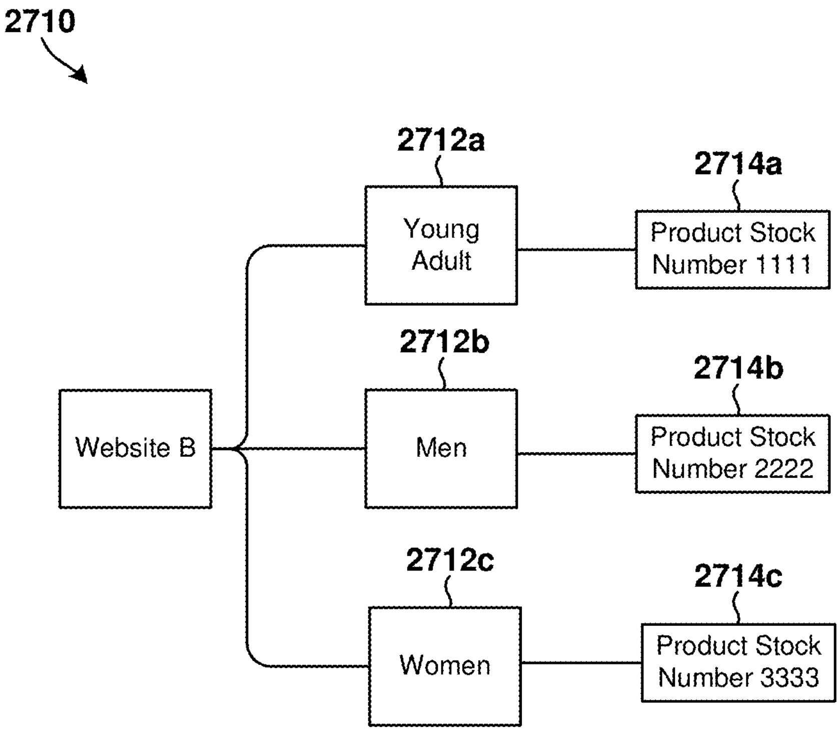

FIG. 27A illustrates a simplified website data structure and taxonomy 2700 that was generated as previously described herein for a fictitious website A that sells clothes. The clothes are structured into five categories 2702*a-e*, and some of the clothes products 2704*a-c* are shown (only the product stock numbers are shown for brevity). FIG. 27B illustrates a simplified website data structure and taxonomy 2710 that was subsequently generated as previously described herein for a fictitious website B that also sells clothes. The clothes are structured into three categories 2712*a-c*, and some of the clothes products 2714*a-c* are shown.

Figure 27C:
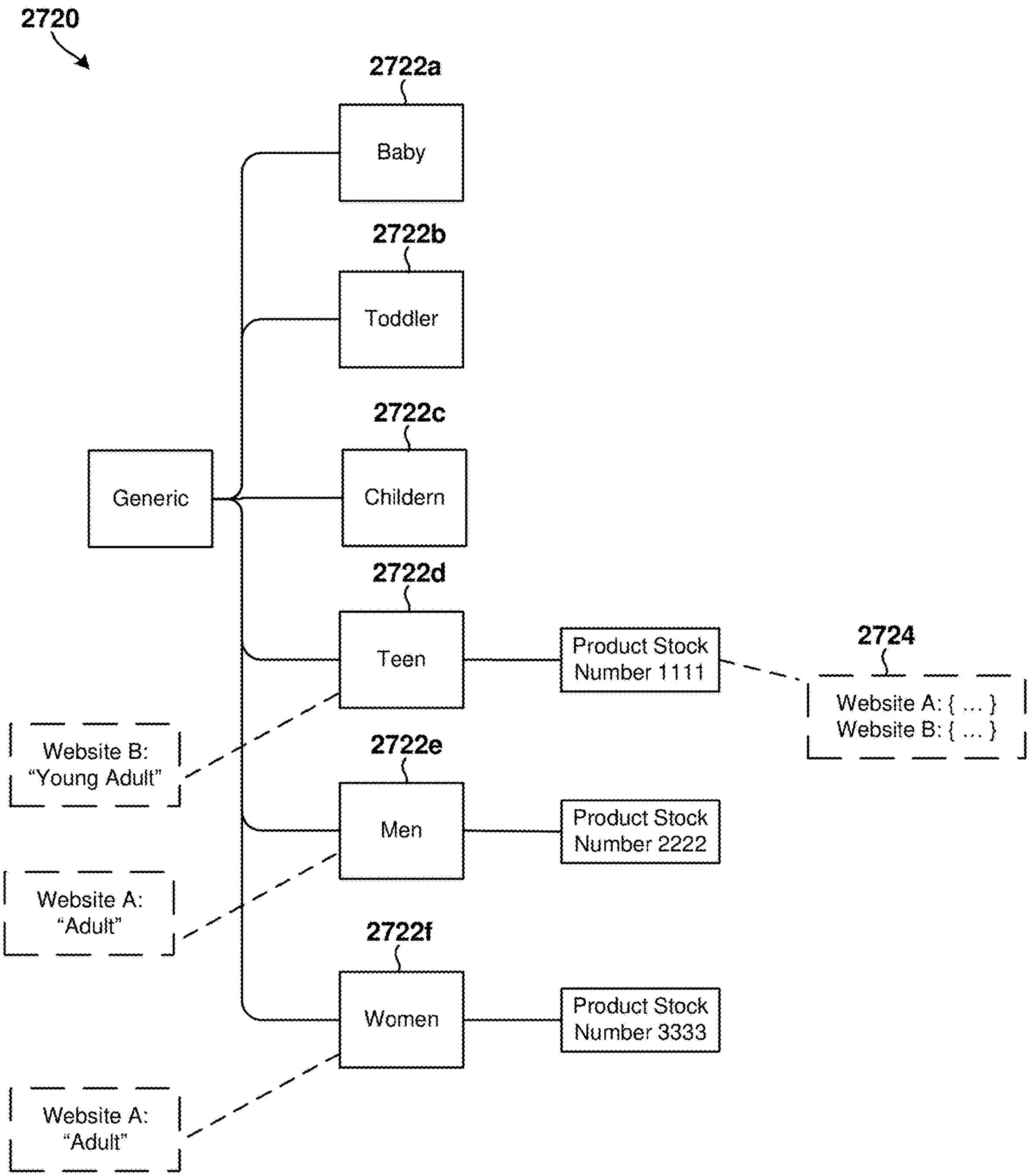

FIG. 27C illustrates a simplified generic website structure and taxonomy 2720 that has been created for websites that sell clothes by combining the website structures and taxonomies for websites A and B (i.e., by combining 2700 and 2710). The generic website structure and taxonomy contains six categories 2722*a-f*, and these are a combination of the categories 2702 from website A (e.g., "Baby," Toddler," "Children," "Teens," etc.) and categories 2712 from website B (e.g., "Men," Women," etc.). Further, the categories include metadata that relates the categories to synonyms and/or alternative categories, and the websites in which they are used (e.g., "Young Adult" is used as a synonym of "Teens" by website B, Website A uses the category "Adult" for both "Men" and Women," etc.). An embodiment may determine the synonyms and/or alternative categories by identifying common products (e.g., the product with product stock number 1111 is part of the "Teens" category on website A and part of the "Young Adult" category on website B, etc.). Similarly, the categories "Men" and "Women" on website B may be determined to be subcategories of "Adult" on website A due to including common products (e.g., products with the same product stock number, etc.).

In an embodiment, the metadata associated with each product 2724 may include a set of product fields for each website that sells the product (e.g., the product with the product stock number 1111 contains metadata with product fields for both website A and website B). Thus, once a product is located in the generic website structure and taxonomy it is easy to obtain multi-website information relating to the product (e.g., discrepancies in the product name, the lowest product price).

A new fictitious website C could subsequently be added to the generic website structure and taxonomy 2720.

FIGS. 28A-28D illustrate methods 2800, 2850 of adding a website to a generic website structure and taxonomy in accordance with some embodiments. Methods 2800, 2850 may be performed by one or more processors in a computing device.

Figure 28A:
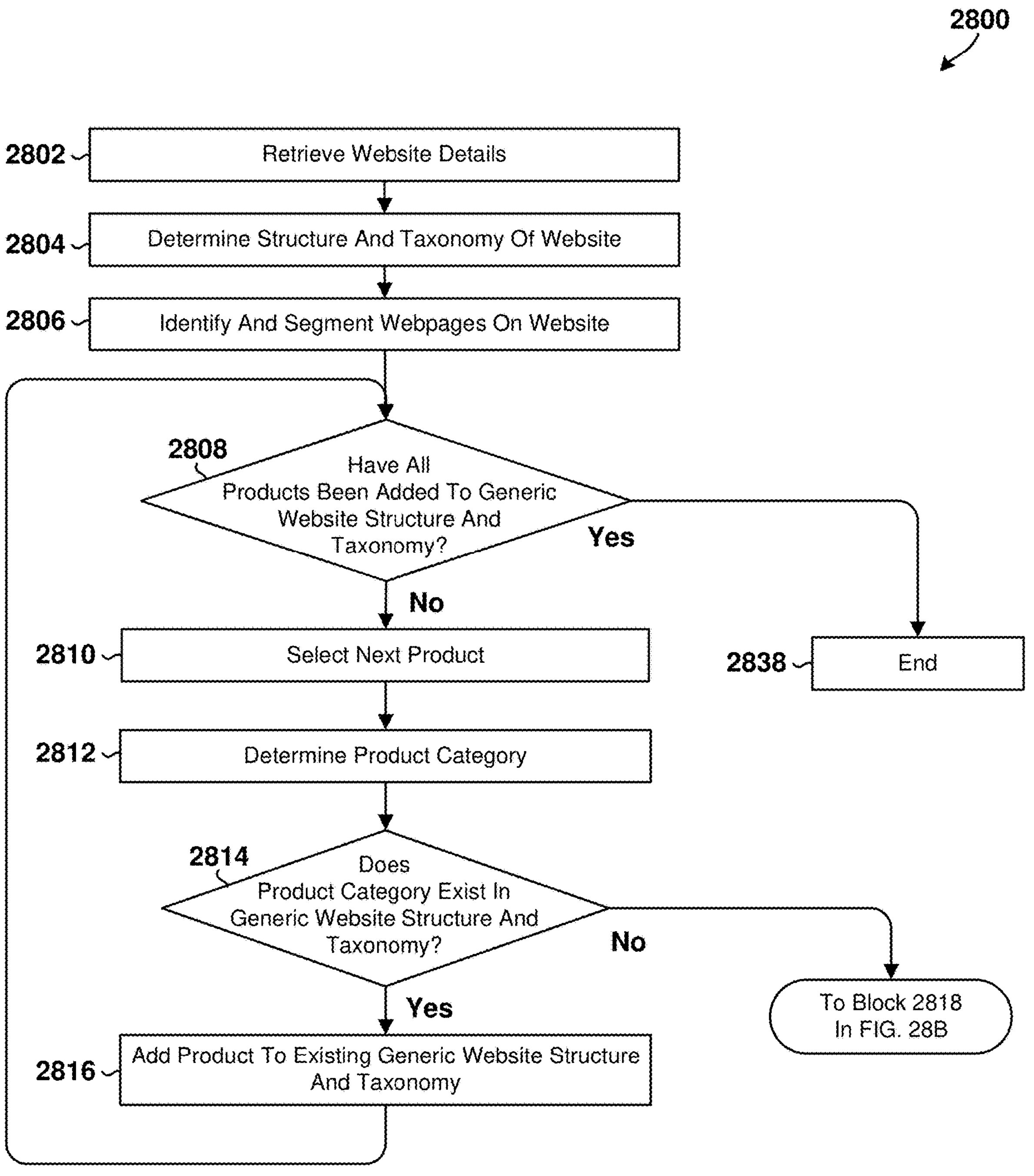
FIGS. 28A-28D are process flow diagrams that illustrate methods of adding a website to a generic website structure and taxonomy that could be generated and used by a computing device to perform product level multi-website analysis and evaluate how products are presented and sold on an eCommerce website in accordance with some embodiments.
Figure 28B:
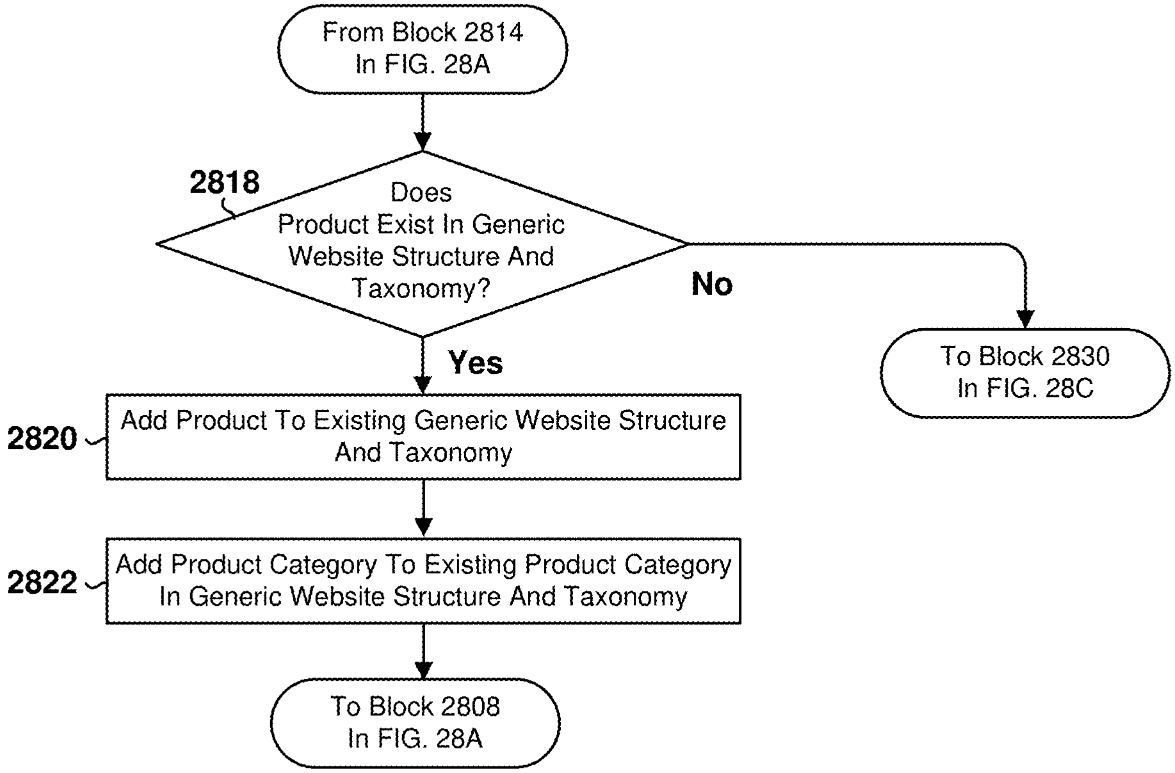
Figure 28C:
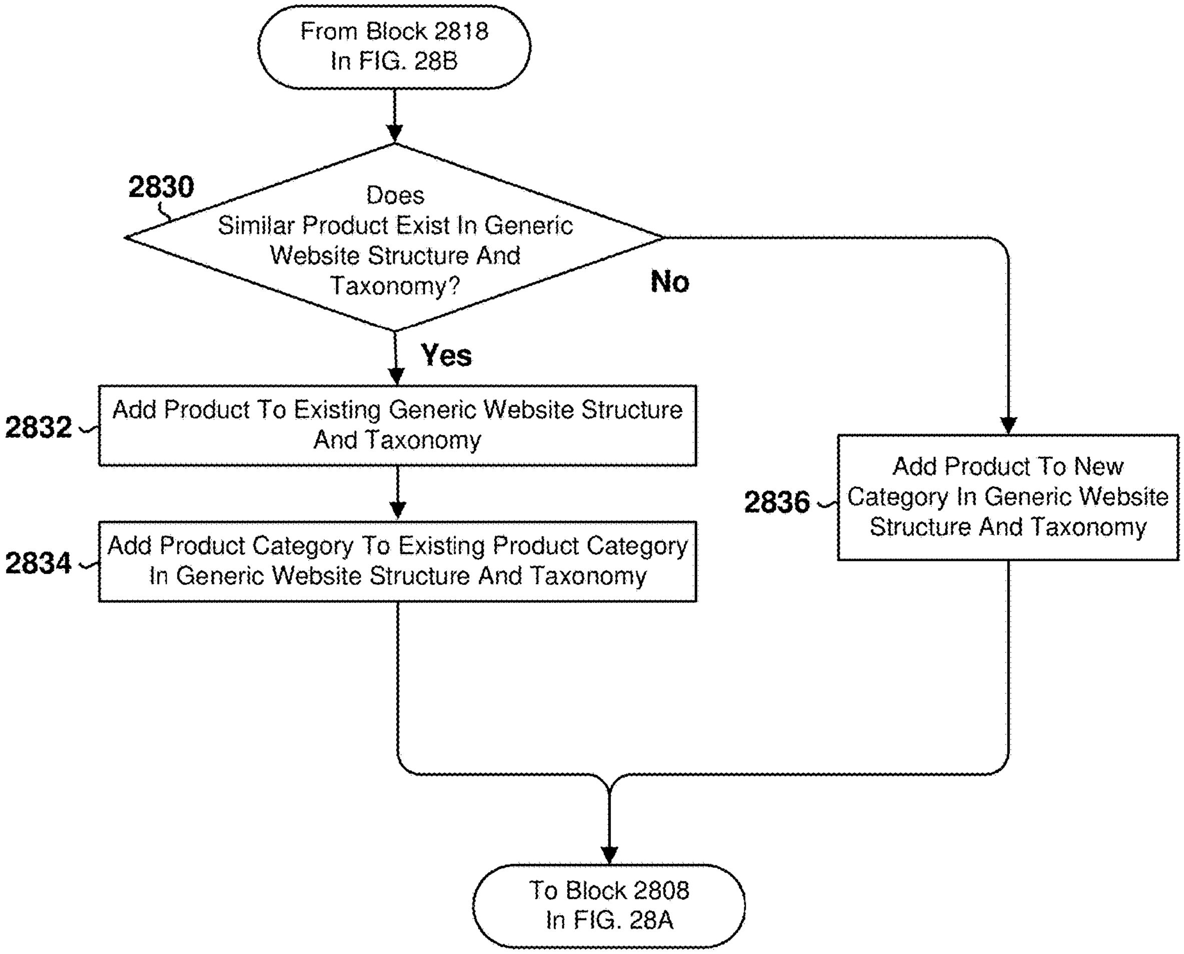

With reference to FIGS. 28A-28C, in block 2802, the computing device may receive the website details. In block 2804, the computing device may determine website structure and taxonomy (e.g., as previously described herein with reference to FIG. 22A). In block 2806, the computing device may identify and segment webpages on the website (e.g., as previously described herein with reference to FIG. 10).

In determination block 2808, the computing device may determine whether all of the products (e.g., from the single product webpages, etc.) have been added to the generic website structure and taxonomy. In response to determining that not all of the products have been added to the generic website structure and taxonomy (i.e., determination block 2808="No"), the computing device may select the next product in block 2810. In block 2812, the computing device may determine the product category of the product. The product category may be a single category (e.g., representing a node in the website structure) or a complex category (e.g., representing a hierarchy of nodes in the website structure).

In determination block 2814, the computing device may determine whether the product category exists in the generic website structure and taxonomy. This determination may include checking the synonyms and and/or alternative categories for each category. In response to determining that the product category exists in the generic website structure and taxonomy (i.e., determination block 2814="Yes"), the computing device may add the product to the existing product category in the generic website structure and taxonomy (e.g., all of the product fields are added to the metadata associated with the product) in block 2816.

In response to determining that the product category does not exist in the generic website structure and taxonomy (i.e., determination block 2814="No"), the computing device may determine whether the product exists in the generic website structure and taxonomy in determination block 2818 illustrated in FIG. 28B. This determination may be made by searching for one or more of the product fields (e.g., searching for an exact match of the product stock number, searching for a partial match on the product name and product description, etc.). In response to determining that the product exists in the generic website structure and taxonomy (i.e., determination block 2818="Yes"), the computing device may add the product to the existing product category in the generic website structure and taxonomy that already contains the product in block 2820 (as described in block 2816). In block 2822, the computing device may add the product category to the existing product category in the generic website structure and taxonomy (e.g., as a synonym and and/or alternative category).

In response to determining that the product does not exist in the generic website structure and taxonomy (i.e., determination block 2818="No"), the computing device may determine whether a similar product exists in the generic website structure and taxonomy in determination block 2830. This determination may be made by searching for products that have one or more similar product fields (e.g., searching for a partial match on the product name). In response to determining that a similar product exists in the generic website structure and taxonomy (i.e., determination block 2830="Yes"), the computing device may add the product to the existing product category in the generic website structure and taxonomy that already contains the similar product in block 2832 (as described in block 2816). In block 2834, the computing device may add the product category to the existing product category in the generic website structure and taxonomy (as described in block 2822).

In response to determining that a similar product does not exist in the generic website structure and taxonomy (i.e., determination block 2830="No"), the computing device may add the product (and all of its product fields) to a new product category in the generic website structure and taxonomy in block 2836.

In response to determining that all of the products have been added to the generic website structure and taxonomy (i.e., determination block 2808="Yes"), the computing device may terminate, exit or end the method in block 2838. In some embodiments, the computing device may also perform any or all of the responsive actions described in this application based on the generic website structure and taxonomy and/or in response ending the method 2800 in block 2838.

In an embodiment, the websites that are already represented in the generic website structure and taxonomy structure may have their website structures and taxonomies reevaluated at regular intervals, when the product fields associated with the websites pass a threshold of inaccuracy, or when the product fields associated with the websites pass a threshold amount of time.

The multi-website analysis may be performed at a product level using the generic website structure and taxonomy. For example, a product manufacturer may be interested in determining which eCommerce websites are selling its products, and the specifics of the various product fields. This determination could be useful for ensuring that the product fields are correct (e.g., if a product is being sold on five eCommerce websites, and only four of them are using identical product descriptions and product images, then the fifth eCommerce website may be using outdated or incorrect product descriptions and product images).

This multi-website analysis may also be useful to a product or brand manager that wants to detect if an eCommerce website is selling imitation or counterfeit versions of its products (e.g., if the product name and product description used on an eCommerce website are consistent with the real product name and product description, but the product price on the eCommerce website is significantly lower than the real product price, then the product being sold on the eCommerce website is probably an imitation or counterfeit version of the product).

This multi-website analysis may also be useful to a product manufacturer for ensuring that a product is not being sold in a manner that breaches export controls or regulations (e.g., if a product is being sold on an eCommerce website located in a jurisdiction that is subject to export controls or regulations, then it is likely that a seller or reseller in another country is illegally redistributing/exporting the product).

This multi-website analysis may also be useful to website owners (e.g., eCommerce website owners) for comparing their product ranges, product categorization, and product pricing. These comparisons may be used for business intelligence or competitive purposes (e.g., for determining the lowest product prices used by competitors in a specific geographic region), or they may be used in order to perform quality management (e.g., by ensuring that the product fields associated with their products are consistent with the same product fields for the same products being sold on their competitors' eCommerce websites).

The output of the multi-website analysis may be a report that is intended for human consumption. Alternatively, the report may be machine readable and it may be automatically acted upon (e.g., if the report to a website owner indicates that a product price is less than a threshold percentage of the average product price across multiple competitors' websites, then sales of the product may immediately be frozen because it likely that the product price is incorrect, or else that the product is in fact a counterfeit product).

In an enhanced embodiment, a user may be able to request alerts (e.g., email alerts, chat messages in an alerts channel) for specific outcomes of the multi-website analysis (e.g., as previously described). For example, a website owner may request to be sent an alert when a competitor offers a promotional or discounted product price for a market leading product. The website owner may then automatically adjust the pricing on its website in order to offer a matching or improved offer for the same market leading product.

Figure 28D:
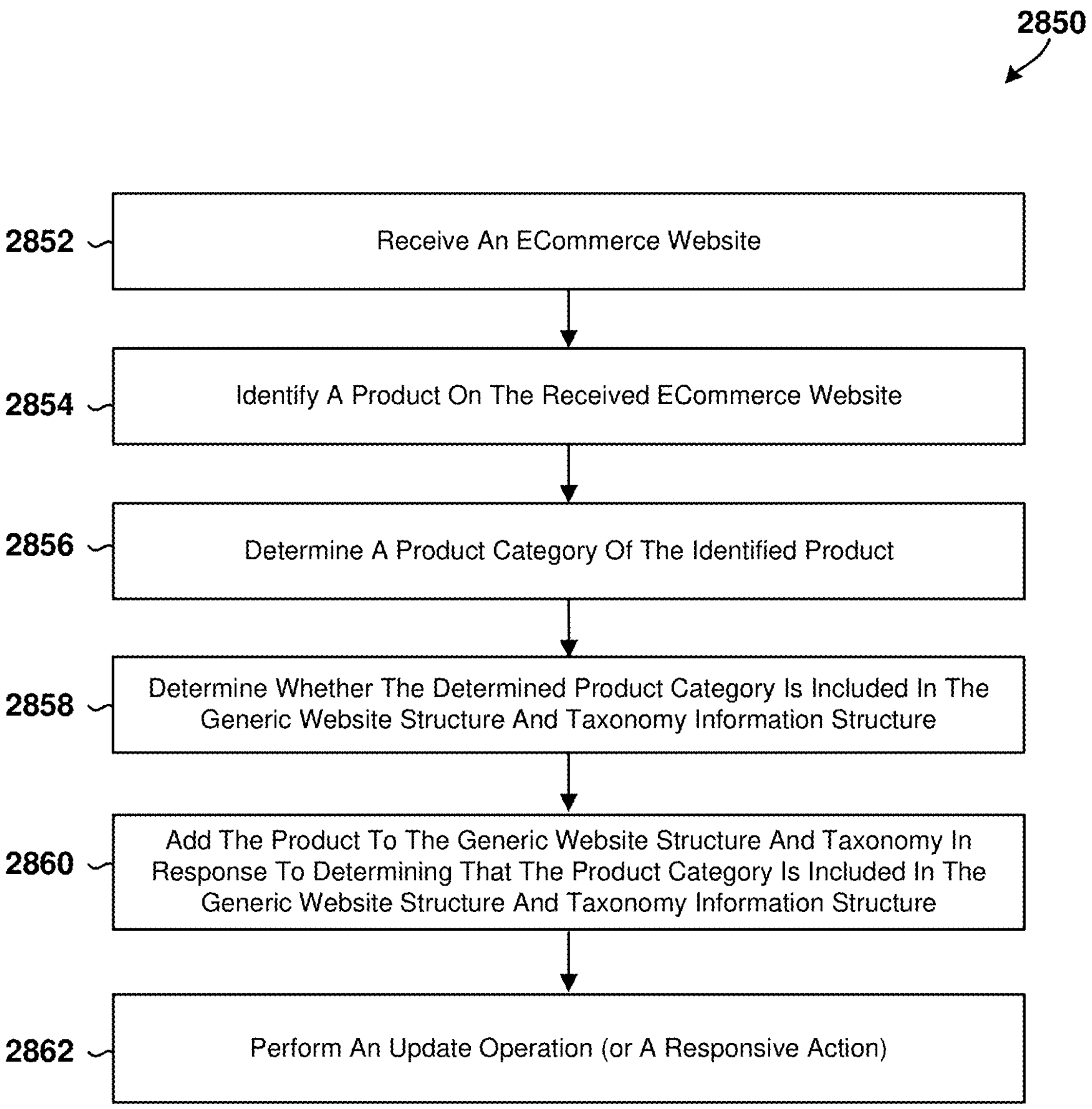

With reference to method 2850 in FIG. 28D, in block 2852, the computing device may receive an eCommerce website. In block 2854, the computing device may identify a product on the received eCommerce website. In block 2856, the computing device may determine a product category of the identified product. In block 2858, the computing device may determine whether the determined product category is included in the generic website structure and taxonomy information structure. In block 2860, the computing device may add the product to the generic website structure and taxonomy in response to determining that the product category is included in the generic website structure and taxonomy information structure. In block 2862, the computing device may perform an update operation (or a responsive action).

Figure 29A:
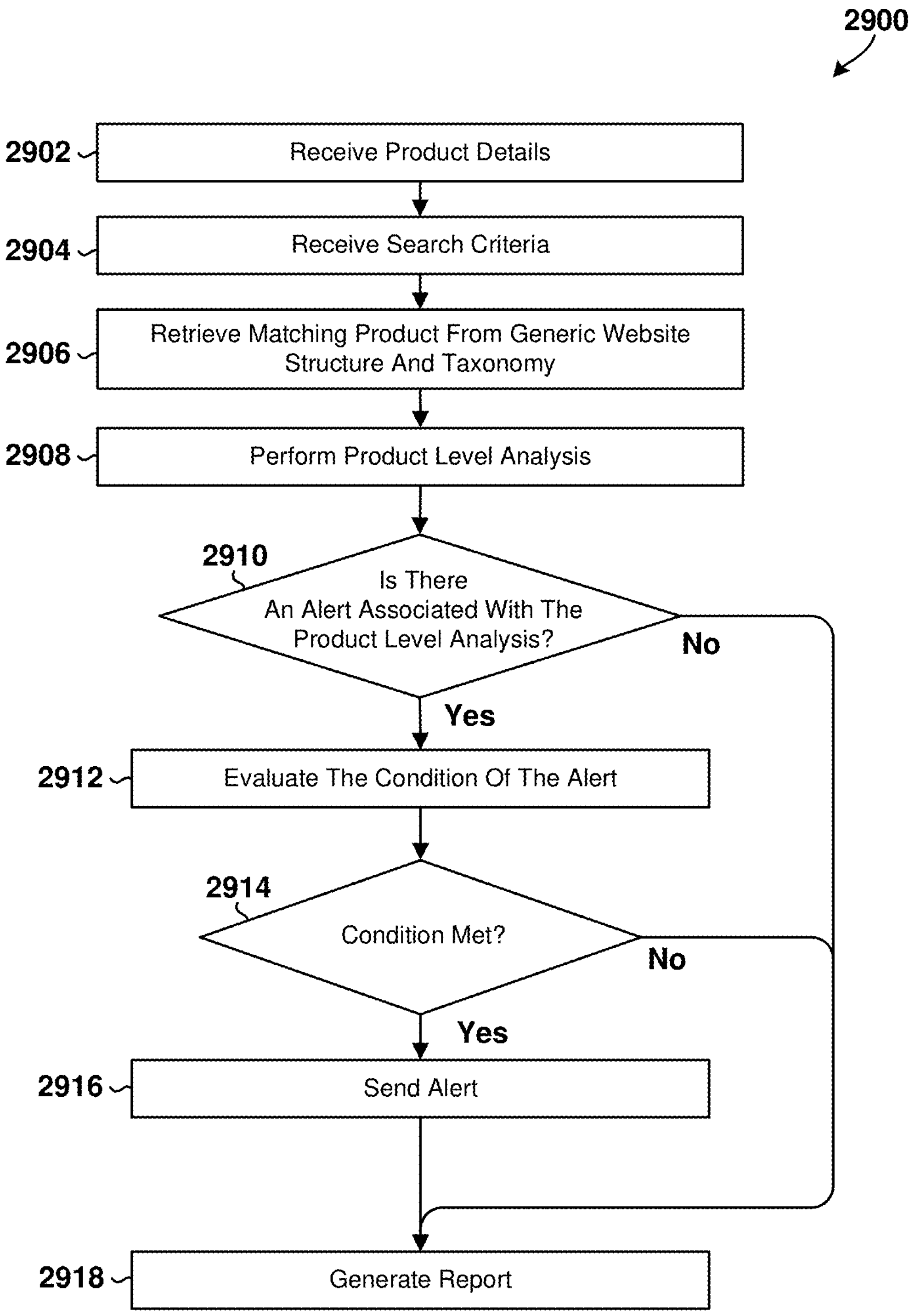
FIGS. 29A and 29B are process flow diagrams that illustrate methods of performing a product level multi-website analysis using a generic website structure and taxonomy in accordance with some embodiments.
Figure 29B:
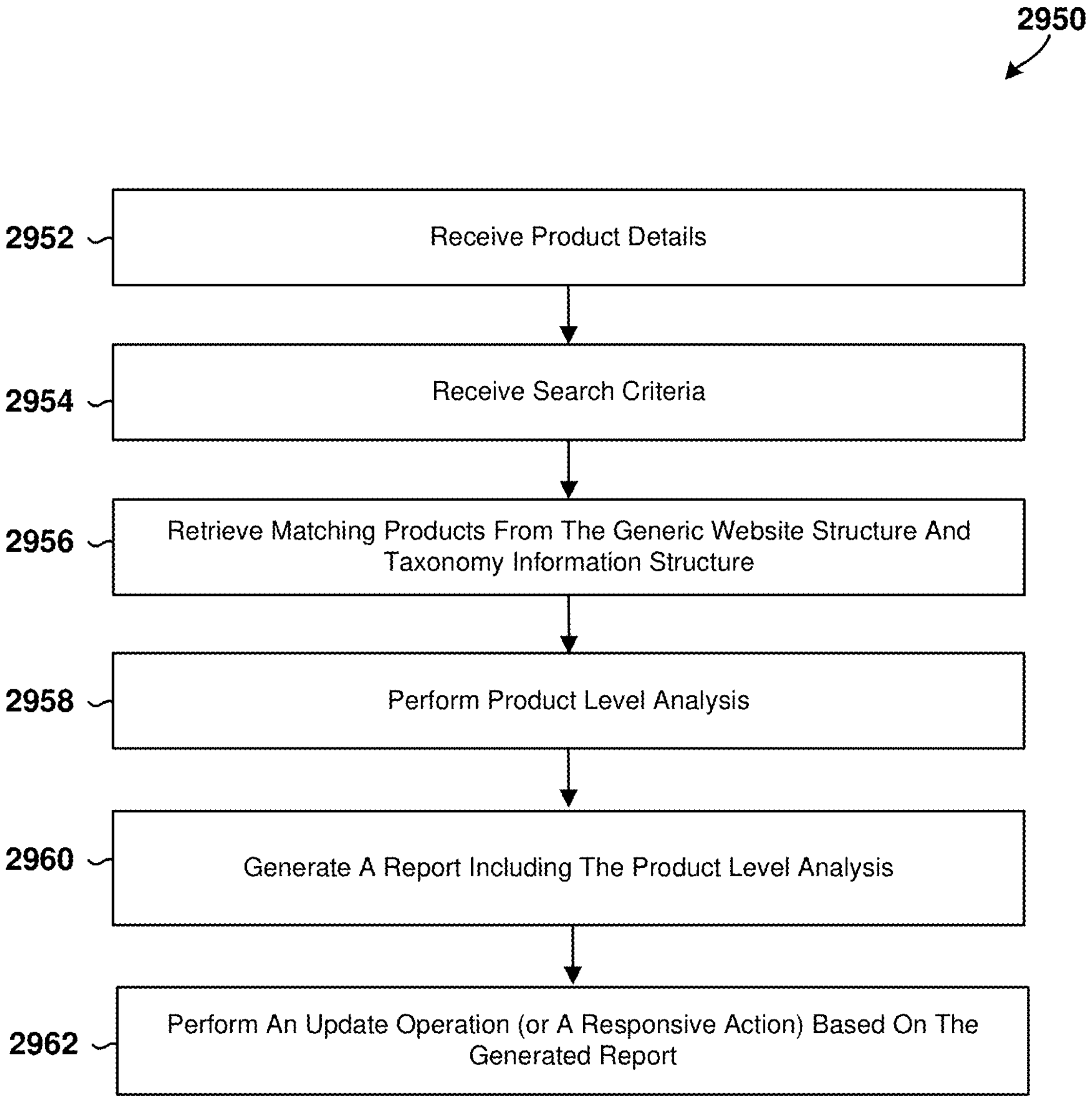

FIGS. 29A and 29B are process flow diagrams illustrating methods 2900, 2950 of performing a product level multi-website analysis using the generic website structure and taxonomy. Methods 2900, 2950 may be performed by one or more processors in a computing device.

With reference to FIG. 29A, in block 2902, the computing device may receive product details (e.g., using a graphical user interface, using an API). The product may be precisely identified using one or more product fields (e.g., using a product stock number, using a main product image), or it may be loosely identified in order to capture similar and related products (e.g., the product name must include a keyword, the product manufacturer is specified).

In block 2904, the computing device may receive the search criteria (e.g., using a graphical user interface, using an API). These are used to limit or filter the search results. For example, an eCommerce website owner may only be interested in comparing its products with competitors operating in the same market. Further, the search criteria may specify the type of analysis that is to be performed on the products (e.g., a product manufacturer may be interested in determining if the product descriptions are consistent, an eCommerce website owner may only be interested in a minimum product price, an average product price, and a maximum product price).

In block 2906, the computing device may retrieve from the generic website structure and taxonomy the products (including their product fields) that both match the product details received in block 2902 and satisfy the search criteria received in block 2904. In the embodiment illustrated in FIG. 27C, the product details may be retrieved from the metadata associated with the products in the generic website structure and taxonomy hierarchy.

In block 2908, the computing device may perform product level analysis (e.g., that was specified in block 2904) on the products retrieved in block 2906.

In determination block 2910, the computing device may determine whether an alert is specified for the product level analysis. In response to determining that an alert has been specified for the product level analysis (i.e., determination block 2910="Yes"), the computing device may evaluate one or more conditions associated with the alert in block 2912.

In determination block 2914, the computing device may determine whether the conditions associated with the alert have been met (i.e., they are true/positive, etc.). In response to determining that the conditions associated with the alert have been met (i.e., determination block 2914="Yes"), the computing device may send an alert in block 2916.

In response to determining that an alert was not specified for the product level analysis (i.e., determination block 2910="No"), or in response to determining that that the conditions associated with the alert were not met (i.e., determination block 2914="No"), then no further action is taken with the product level analysis. In block 2918, the computing device may generate a report that contains the product level analysis.

In some embodiments, the computing device may also perform any or all of the responsive actions described in this application instead of, or in response to, generating the report in block 2918.

With reference to FIG. 29B, in block 2952, the computing device may receive product details. In block 2954, the computing device may receive search criteria. In block 2956, the computing device may retrieve matching products from the generic website structure and taxonomy information structure. In block 2958, the computing device may perform product level analysis. In block 2960, the computing device may generate a report including the product level analysis. In block 2962, the computing device may perform an update operation (or a responsive action) based on the generated report.

Figure 30:
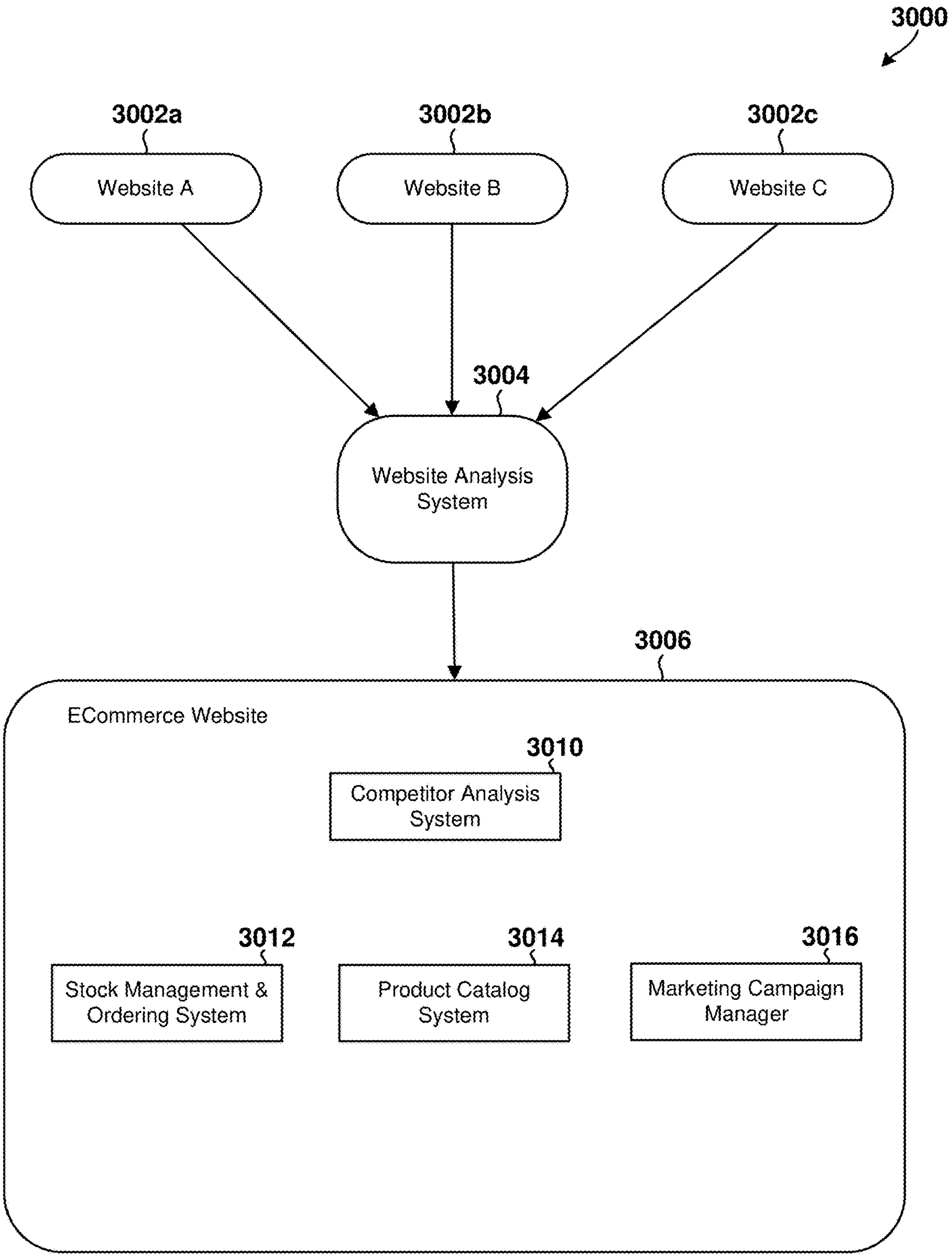
FIG. 30 is a component block diagram that illustrates the components and communications in an example system that includes an eCommerce Website that could be configured to perform or implement responsive actions based on the reports, alerts, etc. generated by the various embodiments.

FIG. 30 illustrates a system 3000 suitable for implementing the various embodiments. In the example illustrated in FIG. 30, the system 3000 includes a plurality of websites 3002*a*-3002*c*, a website analysis system 3004, and an eCommerce Website 3006. The eCommerce Website 3006 includes a competitor analysis system 3010, a stock management and ordering system 3012, a product catalog system 3014, and a marketing campaign manager 3016.

In some embodiments, all or portions of the website analysis system 3004 may be included in the eCommerce Website 3006. In some embodiments, all or portions of the website analysis system 3004 may be included in a computing device that includes a web browser 350 and/or in a server computing device that includes a web server 352.

In various embodiments, the website analysis system 3004 may be configured to perform any or all of the operations or methods discussed in this application, such as methods 1000, 1200, 1300, 1700, 2200, 2800, 2900, etc.

For example, the eCommerce Website 3006 and/or website analysis system 3004 may be configured to use any or all of the alerts, reports, DOMs, taxonomies, comparison results, etc. generated as part of methods 1000, 1200, 1300, 1700, 2200, 2800, and/or 2900 to make adjustments to its stock management system (e.g., inventory levels and order quantities, etc.), adjust the categorization of products on its website, adjust the pricing (e.g., promotions, etc.) on its website, and/or to perform any or all of the responsive actions discussed in this application.

In some embodiments, the eCommerce Website 3006 and/or website analysis system 3004 may be configured to determine whether to perform a responsive action and/or the type of responsive action that should be performed based on an alert, report, DOM, taxonomy, etc. generated as part of methods 1000, 1200, 1300, 1700, 2200, 2800, 2900, etc.

For example, the competitor analysis system 3010 of the eCommerce Website 3006 may be configured to analyze information generated by the website analysis system 3004 to determine whether a competitor is selling an identical product for a lower price, whether a competitor is selling an identical product for a significantly higher price, whether a competitor is selling an identical product under a different section of a website, whether there is a high probability of an increase in sales, etc.

The product catalog system 3014 may work in conjunction with the website analysis system 3004 to automatically adjust or update the price of the product (e.g., reduce it, etc.) in response to determining (e.g., based on an alert, report, etc.) that a competitor is selling an identical product for a lower price (within a range).

The eCommerce Website 3006 may cause the product catalog system 3014 and/or the website analysis system 3004 to perform various operations to automatically suspend sales of a product (e.g., mark it as unavailable, etc.) so that it will not be available to be purchased on the website in response to determining that a competitor is selling an identical product for a significantly higher price.

The eCommerce Website 3006 may cause the marketing campaign manager 3016 and/or website analysis system 3004 to perform various operations to automatically trigger promotions for a product (e.g., by adding it to a promotions webpage, including it in an email mailshot, etc.) in response to determining that a competitor is selling an identical product for a lower price (within a range).

The eCommerce Website 3006 may cause the product catalog system 3014 and/or website analysis system 3004 to perform various operations to offer a product under similar section by (e.g., ice-creams should be listed on a "Desserts" collection product webpage rather than a "Frozen Food" collection product webpage, etc.) in response to determining that a competitor is selling an identical product under a different section of a website.

The eCommerce Website 3006 may cause the stock management and ordering system 3012 and/or website analysis system 3004 to perform various operations to automatically purchase more products in response to determining that there is a high probability of an increase in sales.

Figure 31:
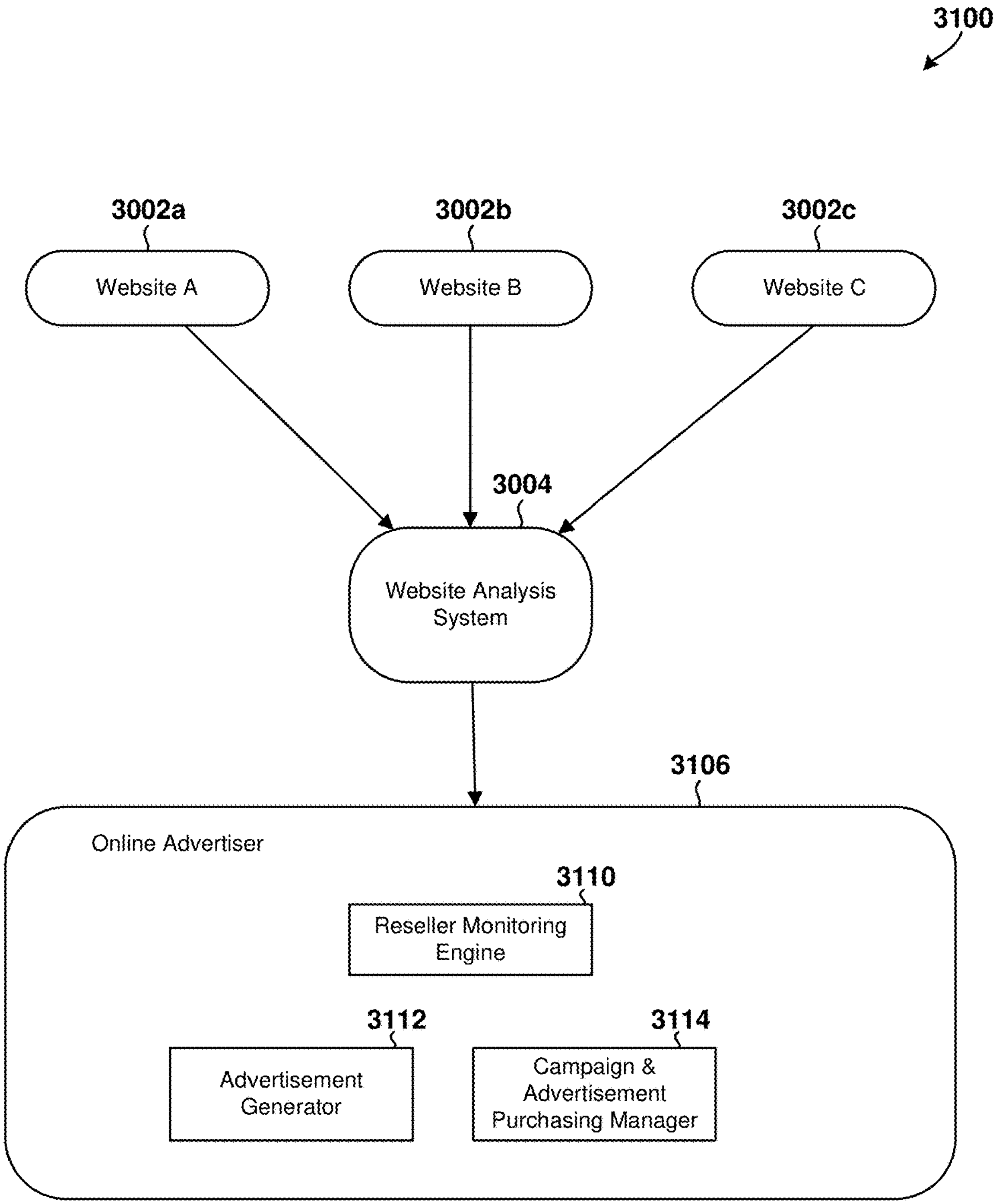
FIG. 31 is a component block diagram that illustrates the components and communications in an example system that includes a third-party system (e.g., online advertiser, etc.) that could be configured to perform or implement responsive actions based on the reports, alerts, etc. generated by the various embodiments.

FIG. 31 illustrates a system 3100 suitable for implementing the various embodiments. In the example illustrated in FIG. 31, the system 3100 includes a plurality of websites 3002*a*-3002*c*, the website analysis system 3004, and an online advertiser 3106 that includes a reseller monitoring engine 3110, advertisement generator 3112, and a campaign and advertisement purchasing manager 3114.

The online advertiser 3106 may be a digital advertiser acting on behalf of a manufacturer, distributor, reseller, retailer, brand manager, etc. The online advertiser 3106 may work in conjunction with the website analysis system 3004 to automatically increase or decrease a product promotion based on its availability and promotion in a geographic region (there is no point in advertising it if it is not in stock anywhere), automatically increase/decrease marketing (e.g., Google Adwords), target adds to direct viewer to reseller that viewer has recently visited, and/or perform other responsive actions.

For example, the online advertiser 3106 may be configured to generate new advertisements or promotions (e.g., containing updated pricing or promotion details, etc.) and push these to potential buyers (e.g., mailshot to existing customers, advertisement placement across affiliate networks, etc.) in response to receiving information (e.g., alert, report, DOM, taxonomy, etc.) indicating that a competing product is being promoted or discounted.

The online advertiser 3106 may be configured to cause the campaign and advertisement purchasing manager 3114 to pause an advertisement campaign or promotion (e.g., Google Adwords, etc.) in response to determining that a product that it is responsible for promoting is currently out of stock on the relevant webpages (e.g., single retailer, multiple retailers for a manufacture). In some embodiments, the campaign and advertisement purchasing manager 3114 may pause an advertisement campaign or promotion on a regional basis.

Figure 32:
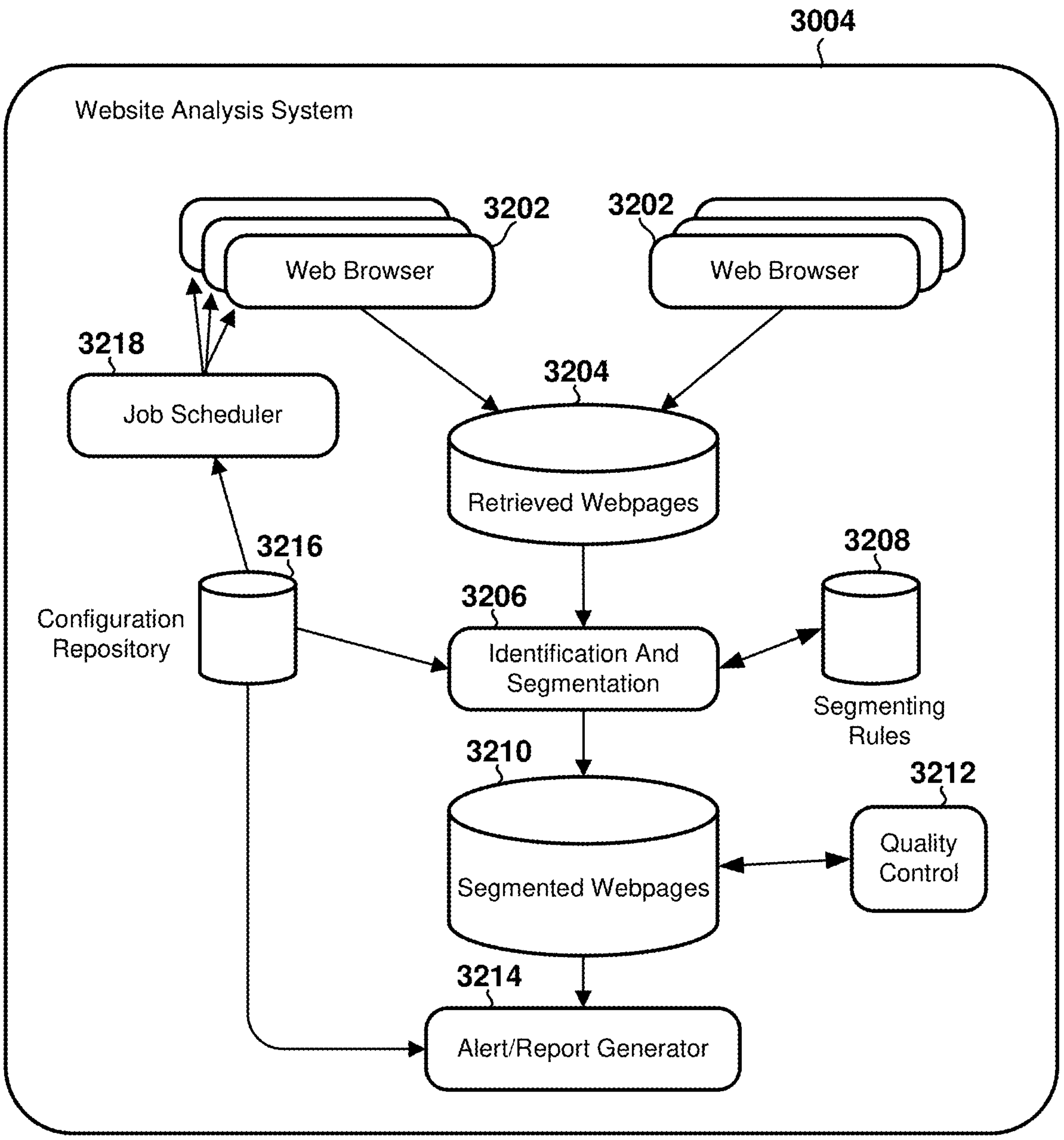
FIG. 32 is component block diagram that illustrates components and communications in an example website analysis system that could be configured in accordance with various embodiments.

FIG. 32 illustrates a website analysis system 3004 suitable for implementing some embodiments. In the example illustrated in FIG. 32, the website analysis system 3004 includes web browser components 3202, a retrieved webpages component 3204, an identification and segmentation component 3206, a segmenting rules component 3208, a segmented webpages component 3210, a quality control component 3212, an alert/report generator component 3214, a configuration repository component 3216, and a job scheduler component 3218.

A user may interact with the configuration repository component 3216 in order to specify which websites are of interest (or which type of webpages, which fields, etc.). A user may also configure the reports and alerts that it wants to receive. This may cause the configuration repository component 3216 to update the job scheduler component 3218, the identification and segmentation component 3206 and/or the alert/report generator component 3214.

The job scheduler component 3218 may cause a web browser component 3202 to retrieve a webpage. The website analysis system 3004 may store the retrieved webpage in the retrieved webpages component 3204, which may incorporate a cache that may store some resources for longer than other resources (as described previously). The identification and segmentation component 3206 may retrieve, identify, and segment the stored webpages, obtain previous segmenting rules from the segmenting rules component 3208, add new rules to the segmenting rules component 3208, and/or store the segmenting results in the segmented webpages component 3210.

The alert/report generator component 3214 may perform searches on the segmenting results in the segmented webpages component 3210 based on the received configuration, generate reports and/or alerts (if thresholds are met, etc.), and sends the reports/alert to the component within the computing device and/or to third party devices or systems.

The quality control component 3212 may also performs searches on the segmenting results in the segmented webpages component 3210 in order to monitor the quality of the information in the datastore. If there is a discrepancy, the quality control component 3212 may trigger a new retrieval by a web browser component 3202 and/or a new identification and segmentation by the identification and segmentation component 3206.

In some embodiments, any or all of the web browser components 3202 may be distributed across multiple data centers in different territories.

Some embodiments may include methods of generating an updated webpage, including receiving by a processor in a computing device user input that includes a plurality of web addresses, determining by the processor whether product information has previously been extracted from a product webpage from a web address in the plurality of web addresses included in the received user input, retrieving by the processor the product webpage from the web address in response to determining that product information has not previously been extracted from the product webpage from the web address in the plurality of web addresses included in the received user input, generating by the processor a structural model of the retrieved product webpage (the generated structural model including nodes that represent the product fields), determining by the processor whether the generated structural model matches a stored structural model of another webpage retrieved from the web address, extracting by the processor product information from the generated structural model based on a previously stored mapping of nodes in the stored structural model to the product fields in response to determining that the generated structural model matches the stored structural model of another webpage retrieved from the web address, generating by the processor a mapping of nodes in the generated structural model to the product fields—and extracting the product information from the generated structural model based on the generated mapping—in response to determining that the generated structural model does not match the stored structural model of another webpage retrieved from the web address, generating an updated webpage based on the extracted product information, and sending the updated webpage to a second computing device for display on an electronic display of the second computing device.

In some embodiments, generating the mapping of nodes in the generated structural model to the product fields may include generating mappings from locations in the generated structural model to the product fields. In some embodiments, generating the mapping of nodes in the generated structural model to the product fields may include determining one or more characteristics associated with a product field, and determining whether a portion of the generated structural model includes the determined one or more characteristics. In some embodiments, determining whether a portion of the generated structural model includes the determined one or more characteristics may include determining a threshold value for the product field, determining a weighted contribution value for each of the determined one or more characteristics, determining a total contribution value based on a sum of all the determined weighted contribution values, determining whether the determined total contribution value meets or exceeds the determined threshold value, and determining that the portion of the generated structural model includes the determined one or more characteristics in response to determining that the determined total contribution value meets or exceeds the threshold value.

In some embodiments, generating the mapping of nodes in the generated structural model to the product fields may include using machine learning to generate the mapping of nodes in the generated structural model to the product fields, which may include training a machine learning component using a plurality of structural models and using the trained machine learning component to perform inference on the generated structural model. In some embodiments, generating the structural model of the retrieved product webpage may include generating a structural model for only the initial viewport of the retrieved product webpage. In some embodiments, the method may include associating a condition with the product information on the retrieved product webpage based on user input, and comparing the extracted product information with the associated condition to determine whether the extracted product information meets the associated condition. In some embodiments, generating the updated webpage based on the extracted product information and sending the updated webpage to the second computing device for display on the electronic display of the second computing device may include generating the updated webpage based on the extracted product information and sending the updated webpage to the second computing device for display on the electronic display of the second computing device in response to determining that the extracted product information meets the associated condition.

Some embodiments may include methods of segmenting and extracting product information from product webpages on an eCommerce website, including receiving, by a processor in a computing device, an address of a product webpage, retrieving, by the processor, the product webpage from the received address, generating, by the processor, a structural model of the retrieved product webpage, determining, by the processor, whether a similar product webpage from the received address has previously been segmented, using, by the processor, the generated structural model to segment the retrieved product webpage and generate a segmenting result in response to determining that a similar product webpage from the same address has not been segmented, extracting, by the processor, product information from the generated structural model based on the generated segmenting result, and performing, by the processor, an update operation (or a responsive action) based on the extracted product information.

In some embodiments, the method may include retrieving a plurality of web resources referenced by the retrieved product webpage, in which generating the structural model of the retrieved product webpage may include generating the structural model of the retrieved product webpage based on the retrieved product webpage and the retrieved plurality of web resources.

In some embodiments, using the generated structural model to segment the retrieved product webpage may include generating mappings from locations in the generated structural model to product fields. In some embodiments, generating the mappings from the locations in the generated structural model to the product fields may include determining whether there are a plurality of mappings from a single location in the generated structural model to a single product field, and determining the mapping in the plurality of mappings that is the most efficient (e.g., most computationally efficient in terms of number of CPU cycles required, latency, memory usage, etc.) mapping.

In some embodiments, generating the mappings from the locations in the generated structural model to the product fields may include determining one or more characteristics associated with a product field, and determining whether a portion of the generated structural model satisfies the one or more characteristics associated with the product field. In some embodiments, determining the one or more characteristics associated with the product field may include determining whether the product field is included in a repeating structure of the generated structural model, determining whether a location of the product field in the generated structural model is in close proximity to another product field, determining whether the product field will be rendered near the top of the product webpage, determining whether the product field may include a number adjacent to a currency symbol within the same portion of the generated structural model, determining whether the product field may include a key-value pair, determining whether the product field may include a synonym for purchasing, and determining whether the product field may include star images.

In some embodiments, determining whether a portion of the generated structural model satisfies the one or more characteristics associated with the product field may include determining a threshold for the product field, determining a weighted contribution value for each of the one or more characteristics associated with the product field, determining a total contribution value for all of the one or more characteristics associated with the product field, determining whether the determined total contribution value meets or exceeds the threshold for the product field, and determining that the portion of the generated structural model satisfies a characteristic associated with the product field in response to determining that the determined total contribution value meets or exceeds the threshold for the product field. In some embodiments, determining one or more characteristics associated with a product field may include determining a characteristic that indicates that a product name field will include the largest font size of the product webpage, and determining whether a portion of the generated structural model satisfies the one or more characteristics associated with the product field may include determining the portion of the generated structural model that may include text associated with the largest font size.

In some embodiments, determining one or more characteristics associated with the product field may include determining a characteristic that indicates that a product name field will use the loudest voice when the product webpage is presented in an audio format, and determining whether a portion of the generated structural model satisfies the one or more characteristics associated with the product field may include determining the portion of the generated structural model that may include text associated with the loudest voice. In some embodiments, determining one or more characteristics associated with the product field may include determining a characteristic that indicates that a product name field will use the largest font size when presented in a virtual reality environment, and determining whether a portion of the generated structural model satisfies the one or more characteristics associated with the product field may include determining the portion of the generated structural model that may include text that will be presented using the largest font size when presented in a virtual reality environment. In some embodiments, generating the mappings from the locations in the generated structural model to the product fields may include using machine learning to generate the mappings from the locations in the generated structural model to the product fields.

In some embodiments, using machine learning to generate the mappings from the locations in the generated structural model to the product fields may further include training a machine learning component using a plurality of structural models, and using the trained machine learning component to perform inference on the generated structural model. In some embodiments, using machine learning to generate the mappings from the locations in the generated structural model to the product fields may further include using a plurality of generated structural models to generate a plurality of images representing a plurality of webpages, training an image processing machine learning component using the plurality of images, using the trained image processing machine learning component and the generated structural model to generate an image representing the webpage, and performing inference on the generated image. In some embodiments, using machine learning to generate the mappings from the locations in the generated structural model to the product fields may further include using a first machine learning component to perform inference on the generated structural model, and using a second machine learning component to perform inference on an image representing the webpage.

In some embodiments, generating the structural model of the retrieved product webpage may include generating the structural model for only the initial viewport of the webpage. In some embodiments, the method may include associating a condition with the product information on the product webpage based on user input, comparing the extracted product information with the associated condition to determine whether the extracted product information meets the associated condition, and generating an alert in response to determining that the extracted product information meets the associated condition. In some embodiments, the method may include identifying a subset of the product information that is of interest to a user based on user input, storing the identified subset of the product information in memory, retrieving the product webpage at a later time, generating a new structural model for the product webpage, extracting additional product information from the new structural model using previously stored segmenting information, comparing the stored subset of product information with a similar subset of the extracted product information to determine whether there are differences between the stored subset of product information and the similar subset of the extracted product information, and generating an alert in response to determining there are differences between the stored subset of product information the similar subset of the extracted product information.

The various embodiments may also include methods of extracting information from a segmented webpage, including requesting and receiving, by a processor in a computing device, a web resource from a web server, parsing, by the processor, the received web resource to identify additional referenced web resources, requesting and receiving, by the processor, the identified additional referenced web resources from the web server or from another web server, generating, by the processor, a structural model for the received web resource based on the received identified additional referenced web resources (in which the generated structural model includes metadata that associates each node in the generated structural model with at least one the received identified additional referenced web resources or the received web resource), and storing, by the processor, the generated structural model in memory.

In some embodiments, the method may include determining product fields in the received web resource that are included in an initial viewport of the received web resource and classified as product fields of interest, in which parsing the received web resource to identify additional referenced web resources may include parsing the received web resource to only identify additional referenced web resources related to the determined product fields (i.e., product fields in the received web resource that are included in an initial viewport of the received web resource and classified as product fields of interest).

In some embodiments, the method may include determining product fields in the received web resource that are included in an initial viewport of the received web resource, and classified as product fields of interest, in which requesting and receiving the identified additional referenced web resources from the web server or from another web server may include requesting and receiving only the identified additional referenced web resources related to the determined product fields.

In some embodiments, the method may include requesting and receiving the web resource from the web server or from another web server, determining whether the stored structural model was previously stored for the received web resource in response to receiving the web resource from the web server or from another web server, identifying the additional referenced web resources used to generate the stored structural model based on the metadata included in the stored structural model in response to determining that the structural model was previously stored for the received web resource, requesting and receiving the additional referenced web resources used to generate the stored structural model from the web server or from another web server, and generating a new structural model for the web resource based on the received additional referenced web resources. In some embodiments, requesting and receiving the web resource from the web server may include requesting and receiving an HTML webpage from the web server.

In some embodiments, requesting and receiving the web resource from the web server may include generating a request message that may include web browser information and device identity information, and receiving the web resource that has a smaller initial viewport in response to sending the generated request message to the web server. In some embodiments, requesting and receiving the identified additional referenced web resources from the web server or from another web server may include determining whether one or more of the identified additional referenced web resources are static resources, querying a local memory in response to determining that one or more of the identified additional referenced web resources are static resources, and retrieving at least one of the identified additional referenced web resources from the local storage based on a result of the query.

In some embodiments, generating the structural model for the received web resource based on the received identified additional referenced web resources may include generating the structural model for only the initial viewport of the webpage. In some embodiments, generating the structural model for the received web resource based on the received identified additional referenced web resources may include generating the structural model for only previously segmented product fields. In some embodiments, generating the structural model for the received web resource based on the received identified additional referenced web resources may further include generating the structural model to include metadata that indicates whether a portion of the structural model originated from two or more web resources. In some embodiments, generating the structural model for the received web resource based on the received identified additional referenced web resources may further include generating the structural model to include a mapping from a product field to a web resource including the product field.

The various embodiments may further include methods of analyzing a website, including retrieving, by a processor in a computing device, a first webpage, segmenting, by the processor, the retrieved first webpage to extract a plurality of first product fields, retrieving, by the processor, a second webpage, segmenting, by the processor, the retrieved second webpage to extract a plurality of second product fields, selecting, by the processor, a first product field from the extracted plurality of first product fields, selecting, by the processor, a second product field from the extracted plurality of second product fields, comparing, by the processor, the first product field to the second product field to determine whether the first and second product fields are equivalent, determining, by the processor, that the first product field is consistent with the second product field in response to determining that the first and second product fields are equivalent, and generating, by the processor, an alert in response to determining that the first and second product fields are not equivalent.

In some embodiments, retrieving the first webpage may include retrieving the first webpage using a web browser, and retrieving the second webpage may include retrieving the second webpage using a different web browser. In some embodiments, at least one of the web browsers is an audio device. In some embodiments, retrieving the first webpage may include retrieving the first webpage using a web browser associated with an Internet protocol (IP) address, and retrieving the second webpage may include retrieving the second webpage using a web browser associated with a different IP address. In some embodiments, retrieving the first webpage may include retrieving the first webpage from web server, and retrieving the second webpage may include retrieving the second webpage from a different web server. In some embodiments, the first and second webpages from different web servers include the same product stock numbers.

In some embodiments, retrieving the second webpage may include retrieving a webpage that was generated using a generative adversarial network. In some embodiments, comparing the first product field to the second product field to determine whether the first and second product fields are equivalent may include generating a semantic description for at least one of the first product field and the second product field, and using the semantic description to compare the first product field to the second product field. In some embodiments, comparing the first product field to the second product field to determine whether the first and second product fields are equivalent may include determining that at least one of the first product field and the second product field is an image, identifying an object in the image using machine learning, and using the identified object to compare the first product field to the second product field. In some embodiments, comparing the first product field to the second product field to determine whether the first and second product fields are equivalent may include determining that at least one of the first product field and the second product field is an image that may include text, extracting the text from the image, and using the extracted text to compare the first product field to the second product field.

In some embodiments, comparing the first product field to the second product field to determine whether the first and second product fields are equivalent may include comparing a semantic description of a product name and a product summary to a semantic description of a main product image. In some embodiments, comparing the first product field to the second product field to determine whether the first and second product fields are equivalent may include determining a commonality between the first product field and the second product field, determining whether the commonality exceeds a threshold value, and determine that the first and second product fields are equivalent in response to determining that the commonality exceeds the threshold value. In some embodiments, the method may further include rendering the alert on an electronic display of the computing device, receiving user input identifying the alert as a false alert, and storing information relating to the alert in response to determining that the user identified the alert as a false alert.

In some embodiments, the method may further include determining whether the segmenting of the retrieved first and second webpage is incorrect, retrieving the first or second webpage in response to determining that the segmenting of the retrieved first or second webpage is incorrect, generating a structural model for the retrieved first or second webpage, using the generated structural model to generate new segmenting for the retrieved first or second webpage, and extracting a new plurality of product fields based on the new segmenting. In some embodiments, using the generated structural model to generate new segmenting for the retrieved first or second webpage including starting the segmenting of the structural model at the location closest to an incorrect product field. In some embodiments, the method may further include determining whether the segmenting of the retrieved first and second webpage is incorrect, determining that the segmenting contains an alternative mapping, generating updated segmenting using the alternative mapping, and extracting the first and second product fields using the updated segmenting.

The various embodiments may further include methods of generating a website structure and taxonomy for an eCommerce website, including retrieving, by a processor in a computing device, a landing webpage for an eCommerce website, identifying, by the processor, a main website navigation menu in the retrieved landing webpage, extracting, by the processor, a menu item from the identified main website navigation menu, adding, by the processor, the extracted menu item to a data structure, determining whether the extracted menu item identifies a further list of menu items, processing, by the processor, the further list of menu items in response to determining that the menu item identifies the further list of menu items, updating, by the processor, the data structure to include a link to a webpage identified by the extracted menu item in response to determining that the menu item does not identify the further list of menu items, and storing, by the processor, the updated data structure in memory.

In some embodiments, retrieving the landing webpage for the eCommerce website may further include creating an empty data structure that is equipped to store hierarchical relationships. In some embodiments, retrieving the landing webpage for the eCommerce website may further include receiving a webpage from a web server, determining whether the received webpage may include a popup window relating to cookies, and determining that the received webpage is a landing webpage type in response to determining that the received webpage may include the popup window relating to cookies. In some embodiments, identifying a main website navigation menu in the retrieved landing webpage may include identifying scripting language events the act upon a structural model of the retrieved landing webpage. In some embodiments, extracting a menu item from the identified main website navigation menu may further include determining whether the extracted menu item is relevant to the structure of the website. In some embodiments, determining whether the extracted menu item is relevant to the structure of the website may include determining whether the extracted menu item is relevant to the structure of the website based on user preference information. In some embodiments, adding the extracted menu item to the data structure may include normalising the menu item before adding it to the data structure.

In some embodiments, the method may include using normalization rules to create taxonomies for all websites, in which normalising the menu item before adding it to the data structure may include normalising the menu item using the normalization rules used to create the taxonomies for all websites. In some embodiments, adding the extracted menu item to the data structure may include may further include adding metadata relating to the normalisation of the menu item to the data structure. In some embodiments, processing the further list of menu items in response to determining that the menu item identifies the further list of menu items may include recursively processing the further list of menu items. In some embodiments, storing the updated data structure in memory may further include storing metadata relating to the generation of the data structure in memory.

In some embodiments, the method may include comparing the data structure to a second data structure that was previously generated for a landing page of the eCommerce website to generate a comparison result, and determining whether menu items were removed from the data structure, added to the data structure, or relocated in the data structure based on the comparison result. In some embodiments, the method may include receiving user input specifying criteria for receiving alerts relating to changes to the menu items, and generating an alert in response to detecting changes to the menu items that meet the specified criteria. In some embodiments, the method may include determining that the menu item does not identify the further list of menu items and updating the data structure to include the link to the webpage identified by the extracted menu item, comparing a path in the link in the updated data structure to a path of a menu item included in the updated data structure to generate a comparison result, and determining whether to generate a quality management alert based on the comparison result.

In some embodiments, the method may include using the updated data structure identify a characteristic for a product field of the landing webpage, and using the identified characteristic to identify a webpage type of the webpage identified by the extracted menu or to segment the webpage identified by the extracted menu. In some embodiments, the method may include determining that the menu item does not identify the further list of menu items and updating the data structure to include the link to a webpage identified by the extracted menu item, in which the link to the webpage identified by the extracted menu item is a link to a collection product webpage, segmenting the collection product webpage, detecting a selection component in the segmented collection product webpage, and updating the data structure based on selection features of the detected selection component.

The various embodiments may further include methods of identifying and segmenting the sections of an eCommerce website, including retrieving, by a processor in a computing device, a landing webpage for an eCommerce website, identifying, by the processor, part of the webpage that contains at least one link to another webpage, and identifying and segmenting, by the processor, at least one webpage that is linked to from the identified part of the webpage.

In some embodiments, identifying part of the webpage that contains at least one link to another webpage may include identifying the main website navigation menu, and generating a website structure and taxonomy, and identifying and segmenting at least one webpage that is linked to from the identified part of the webpage may include identifying and segmenting at least one collection product webpage that is linked to from a menu item in the main website navigation menu.

In some embodiments, identifying part of the webpage that contains at least one link to another webpage may include identifying a promotions part of the webpage, and identifying and segmenting at least one webpage that is linked to from the identified part of the webpage may include identifying and segmenting at least one collection promotion webpage. In some embodiments, identifying a promotions part of the webpage may include determining a threshold for the promotions part of the webpage, determining at least one characteristic associated with the promotions part of the webpage, calculating a weighted contribution for each characteristic that is satisfied, calculating the total contribution for all characteristics that are satisfied, and determining if the total contribution is equal to, or greater than, the threshold for the promotions part of the webpage.

In some embodiments, determining at least one characteristic associated with the promotions part of the webpage may include determining that a characteristic relates to a grid layout in the initial viewport. In some embodiments, determining that a characteristic relates to a grid layout in the initial viewport may include using image recognition on the rendered webpage. In some embodiments, identifying part of the webpage that contains at least one link to another webpage may include identifying an operational part of the webpage, and identifying and segmenting at least one webpage that is linked to from the identified part of the webpage may include identifying and segmenting at least one operational webpage. In some embodiments, identifying an operational part of the webpage may include determining that at least one of the following characteristics are associated with the operational part of the webpage contains keywords, located near the bottom of the webpage, and present on all webpages on the website.

In some embodiments, determining that the operational part of the webpage contains keywords may include using natural language processing and named entity recognition techniques. In some embodiments, identifying and segmenting at least one operational webpage may include identifying and segmenting at least one legal operational webpage. In some embodiments, identifying and segmenting at least one legal operational webpage may include creating semantic rules that are representative of the legal text in at least one segmented part of the legal operational webpage. In some embodiments, identifying part of the webpage that contains at least one link to another webpage may include identifying a user navigation part of the webpage, and identifying and segmenting at least one webpage that is linked to from the identified part of the webpage may include identifying and segmenting at least one user navigation webpage.

In some embodiments, identifying and segmenting at least one webpage that is linked to from the identified part of the webpage may include identifying and segmenting at least one collection brand webpage. In some embodiments, the method may further include identifying a second part of the webpage that contains at least one link to another webpage, and identifying and segmenting at least one webpage that is linked to from the identified second part of the webpage. In some embodiments, the identifying of the first and second parts of the webpage is performed in parallel.

The various embodiments may further include methods of ensuring compliance of products sold by an eCommerce website, including identifying, by a processor in a computing device, a product being sold on the eCommerce website, creating an applicable legal rule, generating, by the processor, a mapping of the identified product to the applicable legal rule, determining, by the processor, whether the identified product is being sold in compliance with the applicable legal rule based on the mapping, and generating, by the processor, a report that may include the determination of whether the identified product is being sold in compliance with the applicable legal rule.

In some embodiments, identifying the product being sold on the eCommerce website may include identifying and segmenting a single product webpage that is linked to from a menu item in a main website navigation menu of a webpage of the eCommerce website. In some embodiments, creating the applicable legal rule may include creating a profile for the eCommerce website that may include information about the eCommerce website. In some embodiments, creating the profile for the eCommerce website that may include the information about the eCommerce website may include determining a country in which the eCommerce website is hosted. In some embodiments, creating the applicable legal rule may include identifying and segmenting a legal operational webpage. In some embodiments, creating the applicable legal rule may include creating a legal rule relating to at least one of disposal of waste electrical and electronic equipment, selling of products to people of specific ages, or transferring of products to specific jurisdictions.

In some embodiments, determining whether the identified product is being sold in compliance with the applicable legal rule based on the mapping further may include determining whether the applicable legal rule is included in a product field of single product webpage of the identified product. In some embodiments, the method may further include generating an alert in response to determining that the identified product is not being sold in compliance with the applicable legal rule. In some embodiments, determining whether the identified product is being sold in compliance with the applicable legal rule based on the mapping may include removing the identified product from the eCommerce website in response to determining that the identified product is not being sold in compliance with the applicable legal rule. In some embodiments, generating the report including the determination of whether each product is being sold in compliance with its applicable legal rules may include grouping a plurality of related products into a plurality of groups, and generating a report including the determination of whether products in each group of the plurality of groups is being sold in compliance with its applicable legal rule.

The various embodiments may also include methods of adding an eCommerce website identity to a generic website structure and taxonomy information structure, including receiving, by a processor in a computing device, an eCommerce website, identifying, by the processor, a product on the received eCommerce website, determining, by the processor, a product category of the identified product, determining, by the processor, whether the determined product category is included in the generic website structure and taxonomy information structure, and adding, by the processor, the product to the generic website structure and taxonomy in response to determining that the product category is included in the generic website structure and taxonomy information structure.

In some embodiments, the method may include determining whether the identified product is included in the generic website structure and taxonomy information structure in response to determining that the determined product category is not included in the generic website structure and taxonomy information structure, adding the identified product to the generic website structure and taxonomy information structure in response to determining that the product is included in the generic website structure and taxonomy information structure, and adding the determined product category to an existing product category in the generic website structure and taxonomy information structure. In some embodiments, determining whether the identified product is included in the generic website structure and taxonomy information structure may include determining whether a value associated with the identified product exceeds a threshold of matching product fields.

In some embodiments, adding the determined product category to an existing product category in the generic website structure and taxonomy information structure may include adding the determined product category to the existing product category as a synonym. In some embodiments, the method may include determining whether a similar product is included in the generic website structure and taxonomy information structure in response to determining the identified product is not included in the generic website structure and taxonomy information structure, and adding the identified product to the generic website structure and taxonomy information structure in response to determining that a similar product is included in the generic website structure and taxonomy information structure.

In some embodiments, the method may include adding the product to a new product category in the generic website structure and taxonomy information structure in response to determining that a similar product is not included in the generic website structure and taxonomy information structure. In some embodiments, identifying the product on the received eCommerce website may include determining a structure and taxonomy of the eCommerce website, and identifying and segmenting a product webpage on the eCommerce website. In some embodiments, determining whether the determined product category is included in the generic website structure and taxonomy information structure may include determining whether the determined product category is included as a synonym of a product category in the generic website structure and taxonomy information structure.

In some embodiments, adding the product to the generic website structure and taxonomy may include adding a product field associated with the product to the generic website structure and taxonomy information structure. In some embodiments, the method may include determining whether the eCommerce website details included in the generic website structure and taxonomy information structure are older than a threshold amount of time, in which receiving the eCommerce website may include receiving eCommerce website details in response to determining that the eCommerce website details included in the generic website structure and taxonomy information structure are older than the threshold amount of time.

The various embodiments may further include methods of performing product level multi-website analysis using a generic website structure and taxonomy information structure, including receiving, by a processor in a computing device, product details, receiving, by the processor, search criteria, retrieving, by the processor, matching products from the generic website structure and taxonomy information structure, performing, by the processor, product level analysis, and generating, by the processor, a report including the product level analysis.

In some embodiments, receiving the product details may include receiving a product image. In some embodiments, receiving the product details may include receiving a partial value for a product field. In some embodiments, receiving the search criteria may include receiving an identity of an eCommerce website competitor that is operating in the same market. In some embodiments, performing the product level analysis may include determining a minimum product price and a maximum product price. In some embodiments, performing the product level analysis may include performing quality assurance by determining whether product fields associated with the product are consistent with the corresponding product fields of the same product on another webpage. In some embodiments, performing the assurance by determining whether product fields associated with the product are consistent with the corresponding product fields of the same product on another webpage may include determining whether differences between the product fields and the corresponding product fields exceeds a threshold.

In some embodiments, performing the product level analysis may include determining whether an eCommerce website is selling imitation or counterfeit versions of a product by determining whether a product name field on the eCommerce website is consistent with a real product name, and determining whether a product description field on the eCommerce website is consistent with a real product description, and determining whether a product price field on the eCommerce website is significantly lower than a real product price. In some embodiments, generating the report including the product level analysis may include determining whether there is an alert associated with the product level analysis, evaluating a condition of the alert in response to determining that there is an alert associated with the product level analysis, and sending an alert in response to evaluating the condition of the alert.

In some embodiments, evaluating the condition of the alert may include determining whether the product price associated with the received product details is less than a threshold percentage of the average product price across multiple competitors' eCommerce websites. In some embodiments, sending the alert in response to evaluating the condition of the alert may include sending a machine readable alert that causes the eCommerce website to perform a responsive action in response to evaluating the condition of the alert.

Further embodiments may include a computing device that includes a processor configured with processor-executable instructions to perform various operations corresponding to any or all of methods discussed above. Further embodiments may include a computing device that includes various means for performing functions corresponding to any or all of the method operations discussed above. Further embodiments may include a non-transitory processor-readable storage medium having stored thereon processor-executable instructions configured to cause a processor to perform various operations corresponding to any or all of the method operations discussed above.

Figure 33:
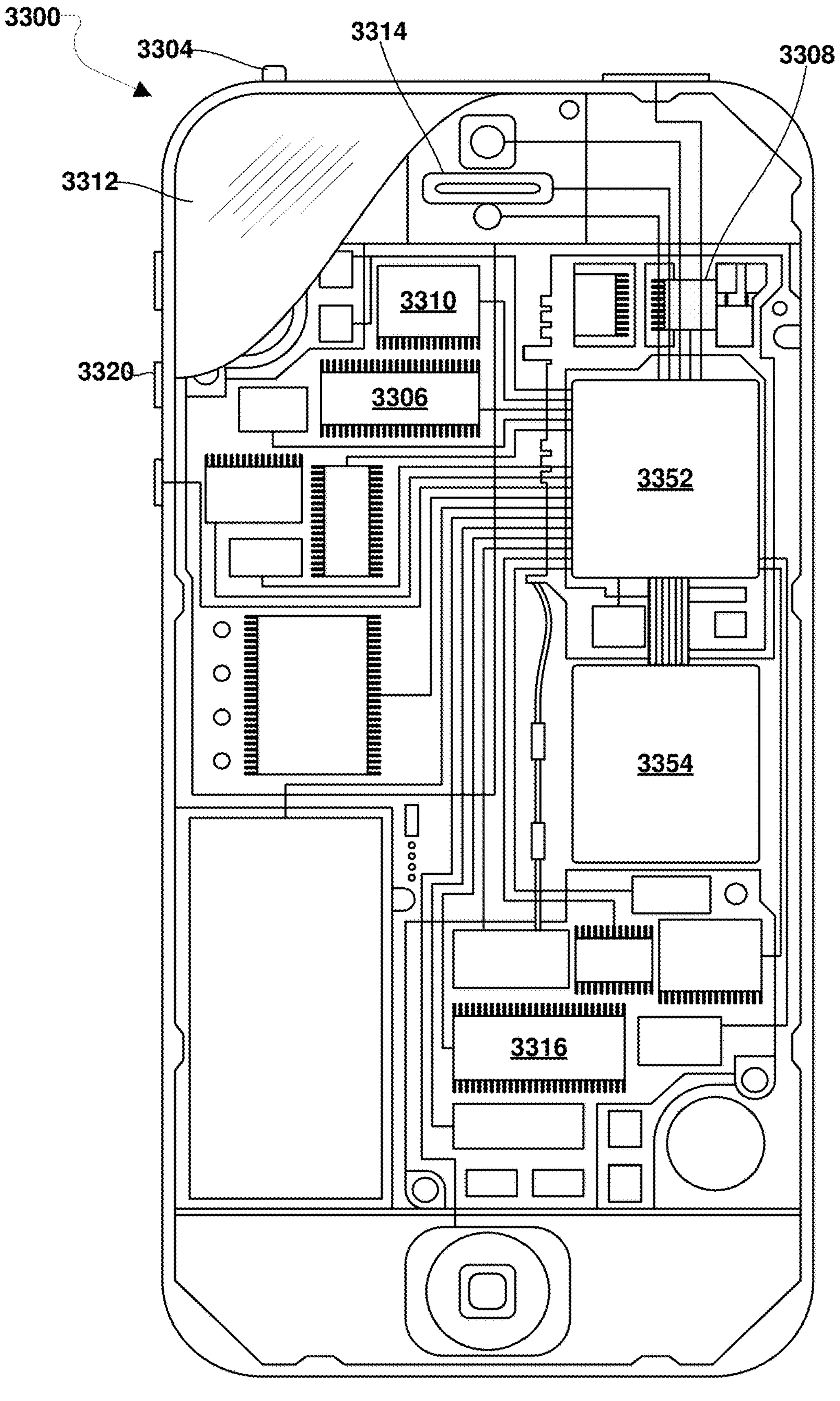
FIG. 33 is a component block diagram illustrating a computing device for implementing various embodiments.

The various embodiments may be implemented on a variety of computing devices, an example of which is illustrated in FIG. 33 in the form of a smartphone. A smartphone 3300 may include a first system on chip 3352 (e.g., a SOC-CPU) coupled to a system on chip 3354 (e.g., a 5G capable SOC). The first and second SOCs 3352, 3354 may include processors (e.g., application processor, modem processor, graphics processor, etc.), and may be coupled to internal memory 3306, a display 3312, and to a speaker 3314. Additionally, the smartphone 3300 may include an antenna 3304 for sending and receiving electromagnetic radiation that may be connected to a wireless data link and/or cellular telephone transceiver 3308 coupled to one or more processors in the first and/or second SOCs 3352, 3354. Smartphones 3300 typically also include menu selection buttons or rocker switches 3320 for receiving user inputs.

A typical smartphone 3300 also includes a sound encoding/decoding (CODEC) circuit 3310, which digitizes sound received from a microphone into data packets suitable for wireless transmission and decodes received sound data packets to generate analog signals that are provided to the speaker to generate sound. Also, one or more of the processors in the first and second SOCs 3352, 3354, transceiver 3308 and CODEC circuit 3310 may include a digital signal processor (DSP) circuit (not shown separately).

Figure 34:
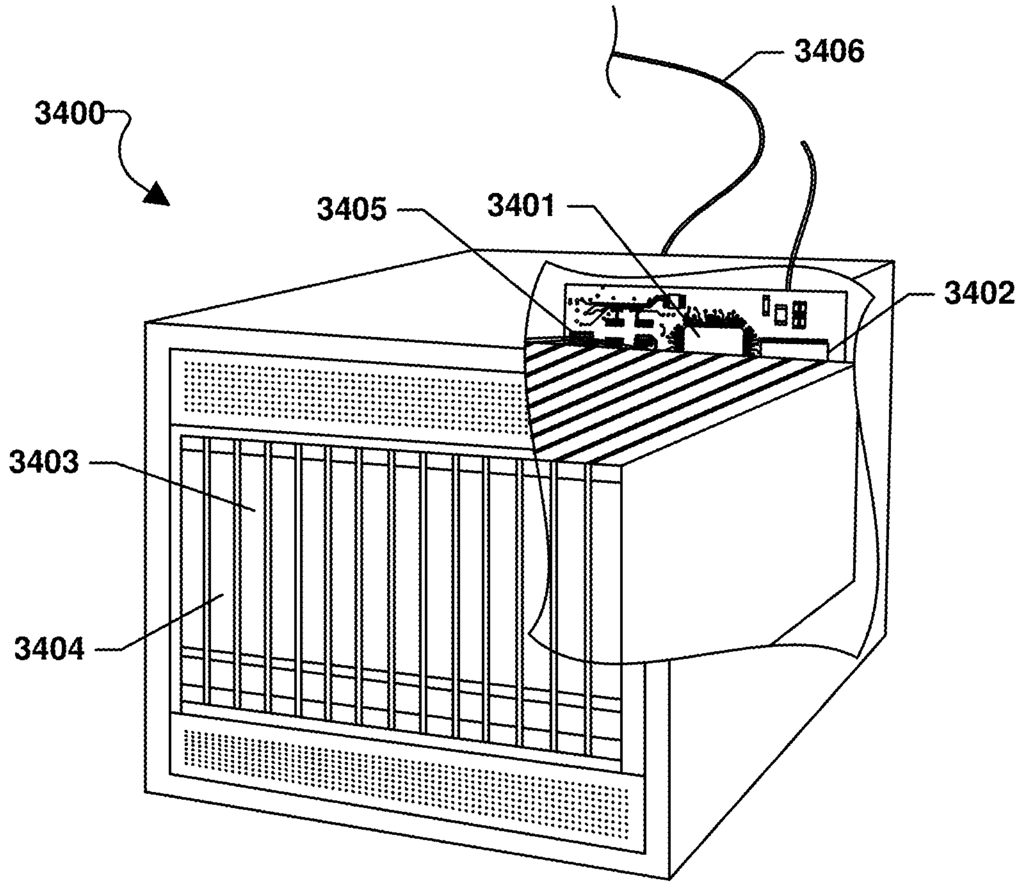
FIG. 34 is a component diagram of server suitable for use with the various embodiments.

Some embodiments may be implemented on any of a variety of commercially available server devices, such as the server 3400 illustrated in FIG. 34. Such a server 3400 typically includes a processor 3401 coupled to volatile memory 3402 and a large capacity nonvolatile memory, such as a disk drive 3403. The server 3400 may also include a floppy disc drive, compact disc (CD) or DVD disc drive 3404 coupled to the processor 3401. The server 3400 may also include network access ports 3405 coupled to the processor 3401 for establishing data connections with a network 3406, such as a local area network coupled to other operator network computers and servers.

The processor 3301, 3401 may be any programmable microprocessor, microcomputer or multiple processor chip or chips that can be configured by software instructions (applications) to perform a variety of functions, including the functions of the various embodiments described below. Multiple processors 3301, 3401 may be provided, such as one processor dedicated to wireless communication functions and one processor dedicated to running other applications. Typically, software applications may be stored in the internal memory before they are accessed and loaded into the processor 3301, 3401. The processor 3301, 3401 may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 500, 1000, 1050, 1200, 1300, 1400, 1500, 1700, 1740, 1760, 1900, 1950, 2200, 2250, 2500, 2501, 2600, 2650, 2800, 2850, 2900, and 2950 may be substituted for or combined with one or more operations of any of methods 300, 500, 1000, 1050, 1200, 1300, 1400, 1500, 1700, 1740, 1760, 1900, 1950, 2200, 2250, 2500, 2501, 2600, 2650, 2800, 2850, 2900, and 2950.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method performed by a processor in a computing device to update product webpages, comprising: receiving an address of a product webpage; retrieving the product webpage from the received address; generating a structural model of the retrieved product webpage; determining whether a similar product webpage from the received address has previously been segmented; using the generated structural model to segment the retrieved product webpage and generate a segmenting result in response to determining that a similar product webpage from the same address has not been segmented; extracting product information from the generated structural model based on the generated segmenting result; and performing an update operation based on the extracted product information.

2. The method of claim 1, further comprising identifying one or more anchor points within the structural model of the retrieved product webpage, wherein each anchor point comprises a visually or structurally significant element associated with a product field.

3. The method of claim 2, wherein identifying the one or more anchor points comprises determining visual characteristics of elements in the structural model, the visual characteristics including font size, font color, font intensity, or spatial prominence.

4. The method of claim 2, wherein identifying the one or more anchor points further comprises determining spatial relationships between elements in the structural model based on proximity.

5. The method of claim 1, further comprising generating a visual rendering of the retrieved product webpage, wherein using the generated structural model to segment the webpage further comprises analyzing the visual rendering for identifying data-points.

6. The method of claim 1, further comprising inferring an association between one or more portions of the structural model and one or more product fields based on the relative location of the portions to other elements in the structural model, wherein the association is inferred by:

identifying proximity between the portions and other elements representing known product fields;

analyzing the structural static or dynamic relationship between the portion or portions and surrounding elements, including parent-child or sibling relationships within the structural model; and prioritizing elements located in predefined regions of the product webpage.

7. The method of claim 1, further comprising receiving user input to refine or validate mappings between elements in the structural model and corresponding product fields.

8. The method of claim 1, further comprising:

determining relationships between elements, including associations between a main object comprising an image or a primary textual element and adjacent metadata; and identifying one or more anchor points within the structural model of the retrieved product webpage based on the determined relationships.

9. The method of claim 1, further comprising determining computational actions associated with elements of the structural model, wherein each computational action comprises a user or system interaction event that modifies a related element of the retrieved product webpage.

10. The method of claim 9, wherein determining computational actions further comprises identifying click events, hover events, scroll events, or timer events associated with product or related fields in the structural model.

11. The method of claim 1, further comprising inferring an origin of a field or data point of interest in the structural model based on a result of analyzing data sources used to render the retrieved product webpage.

12. The method of claim 11, wherein analyzing data sources comprises evaluating dynamic content loaded via JavaScript, JSON, or XML files associated with the retrieved product webpage.

13. The method of claim 1, further comprising determining a sequence for retrieving data sources to extract product or relevant data point information, wherein the sequence approximates the intended data loading process of the webpage.

14. The method of claim 1, further comprising validating the stability of the extracted product information by generating multiple requests to the address of the product webpage using different client identifiers or proxy locations.

15. The method of claim 14, wherein validating the stability of the extracted product information further comprises determining whether the product information remains consistent across the generated requests.

16. The method of claim 1, wherein using the generated structural model to segment the retrieved product webpage comprises using machine learning to generate mappings from locations in the generated structural model to product fields.

17. The method of claim 16, wherein using machine learning to generate mappings further comprises training a machine learning model using a plurality of structural models and corresponding product fields.

18. The method of claim 17, wherein training the machine learning model further comprises:

generating a plurality of codified representations of structural models, wherein:

each representation includes parameters of structural elements, the parameters including at least one or more of an element type, coordinates on a webpage canvas, dimensions, or visual layering attributes; and using the codified representations to train the machine learning model to identify mappings between structural elements and corresponding product fields.

19. The method of claim 16, wherein using machine learning to generate mappings further comprises:

training a first machine learning model to analyze the structural model; and training a second machine learning model to analyze at least one of the proposed structural layout or visual rendering of the retrieved product webpage.

20. The method of claim 1, further comprising determining computational actions associated with elements of the structural model, wherein:

each computational action comprises an interaction event initiated by a user or an automated system process;

the interaction event modifies an associated element of the retrieved product webpage; and the automated system process includes content insertion by backend systems or element modification triggered by system timers.

21. The method of claim 20, wherein:

determining computational actions further comprises identifying interaction events associated with product fields in the structural model; and the interaction events include click events, hover events, scroll events, or timer events configured to modify associated webpage elements.

22. The method of claim 1, further comprising replaying the retrieval of the product webpage by reconstructing a sequence of data source requests to validate the consistency of the extracted product information.

23. A computing device, comprising: a processing system comprising at least one processor configured with processor-executable instructions to: receive an address of a product webpage; retrieve the product webpage from the received address; generate a structural model of the retrieved product webpage; determine whether a similar product webpage from the received address has previously been segmented; use the generated structural model to segment the retrieved product webpage and generate a segmenting result in response to determining that a similar product webpage from the same address has not been segmented; extract product information from the generated structural model based on the generated segmenting result; and perform an update operation based on the extracted product information.

24. The computing device of claim 23, wherein the processor is further configured to identify one or more anchor points within the structural model of the retrieved product webpage, wherein each anchor point comprises a visually or structurally significant element associated with a product field.

25. The computing device of claim 24, wherein the processor is configured to identify the one or more anchor points by determining visual characteristics of elements in the structural model, the visual characteristics including font size, font color, font intensity, or spatial prominence.

26. The computing device of claim 24, wherein the processor is configured to identify the one or more anchor points by determining spatial relationships between elements in the structural model based on proximity.

27. The computing device of claim 23, wherein the processor is further configured to generate a visual rendering of the retrieved product webpage, wherein using the generated structural model to segment the webpage further comprises analyzing the visual rendering for identifying datapoints.

28. The computing device of claim 23, wherein the processor is further configured to infer an association between one or more portions of the structural model and one or more product fields based on the relative location of the portions to other elements in the structural model, wherein the association is inferred by:

identifying proximity between the portions and other elements representing known product fields;

analyzing the structural static or dynamic relationship between the portion or portions and surrounding elements, including parent-child or sibling relationships within the structural model; and prioritizing elements located in predefined regions of the product webpage.

29. The computing device of claim 23, wherein the processor is further configured to receive user input to refine or validate mappings between elements in the structural model and corresponding product fields.

30. The computing device of claim 23, wherein the processor is further configured to:

determine relationships between elements, including associations between a main object comprising an image or a primary textual element and adjacent metadata; and identify one or more anchor points within the structural model of the retrieved product webpage based on the determined relationships.

31. The computing device of claim 23, wherein the processor is further configured to determine computational actions associated with elements of the structural model, wherein each computational action comprises a user or system interaction event that modifies a related element of the retrieved product webpage.

32. The computing device of claim 31, wherein the processor is configured to determine computational actions by identifying click events, hover events, scroll events, or timer events associated with product or related fields in the structural model.

33. The computing device of claim 23, wherein the processor is further configured to infer an origin of a field or data point of interest in the structural model based on a result of analyzing data sources used to render the retrieved product webpage.

34. The computing device of claim 33, wherein the processor is configured to analyze data sources by evaluating dynamic content loaded via JavaScript, JSON, or XML files associated with the retrieved product webpage.

35. The computing device of claim 23, wherein the processor is further configured to determine a sequence for retrieving data sources to extract product or relevant data point information, wherein the sequence approximates the intended data loading process of the webpage.

36. The computing device of claim 23, wherein the processor is further configured to validate the stability of the extracted product information by generating multiple requests to the address of the product webpage using different client identifiers or proxy locations.

37. The computing device of claim 36, wherein the processor is configured to validate the stability of the extracted product information by determining whether the product information remains consistent across the generated requests.

38. The computing device of claim 23, wherein the processor is configured to use the generated structural model to segment the retrieved product webpage by using machine learning to generate mappings from locations in the generated structural model to product fields.

39. The computing device of claim 38, wherein the processor is configured to use machine learning to generate mappings by training a machine learning model using a plurality of structural models and corresponding product fields.

40. The computing device of claim 39, wherein the processor is configured to train the machine learning model by:

generating a plurality of codified representations of structural models, wherein:

each representation includes parameters of structural elements, the parameters including at least one or more of an element type, coordinates on a webpage canvas, dimensions, or visual layering attributes; and using the codified representations to train the machine learning model to identify mappings between structural elements and corresponding product fields.

41. The computing device of claim 38, wherein the processor is configured to use machine learning to generate mappings by:

training a first machine learning model to analyze the structural model; and training a second machine learning model to analyze at least one of the proposed structural layout or visual rendering of the retrieved product webpage.

42. The computing device of claim 23, wherein the processor is further configured to determine computational actions associated with elements of the structural model, wherein:

each computational action comprises an interaction event initiated by a user or an automated system process;

the interaction event modifies an associated element of the retrieved product webpage; and the automated system process includes content insertion by backend systems or element modification triggered by system timers.

43. The computing device of claim 42, wherein:

the processor is configured to determine computational actions by identifying interaction events associated with product fields in the structural model; and the interaction events include click events, hover events, scroll events, or timer events configured to modify associated webpage elements.

44. The computing device of claim 23, wherein the processor is further configured to replay the retrieval of the product webpage by reconstructing a sequence of data source requests to validate the consistency of the extracted product information.

45. A non-transitory computer readable storage medium having stored thereon processor-executable software instructions configured to cause a processor to perform operations for updating product webpages, the operations comprising: receiving an address of a product webpage; retrieving the product webpage from the received address; generating a structural model of the retrieved product webpage; determining whether a similar product webpage from the received address has previously been segmented; using the generated structural model to segment the retrieved product webpage and generate a segmenting result in response to determining that a similar product webpage from the same address has not been segmented; extracting product information from the generated structural model based on the generated segmenting result; and performing an update operation based on the extracted product information.

46. The non-transitory computer readable storage medium of claim 45, wherein the stored processor-executable software instructions are configured to cause a processor to perform operations further comprising identifying one or more anchor points within the structural model of the retrieved product webpage, wherein each anchor point comprises a visually or structurally significant element associated with a product field.

47. The non-transitory computer readable storage medium of claim 46, wherein the stored processor-executable software instructions are configured to cause a processor to perform operations such that identifying the one or more anchor points comprises determining visual characteristics of elements in the structural model, the visual characteristics including font size, font color, font intensity, or spatial prominence.

48. The non-transitory computer readable storage medium of claim 46, wherein the stored processor-executable software instructions are configured to cause a processor to perform operations such that identifying the one or more anchor points further comprises determining spatial relationships between elements in the structural model based on proximity.

49. The non-transitory computer readable storage medium of claim 45, wherein the stored processor-executable software instructions are configured to cause a processor to perform operations further comprising generating a visual rendering of the retrieved product webpage, wherein using the generated structural model to segment the webpage further comprises analyzing the visual rendering for identifying data-points.

50. The non-transitory computer readable storage medium of claim 45, wherein the stored processor-executable software instructions are configured to cause a processor to perform operations further comprising inferring an association between one or more portions of the structural model and one or more product fields based on the relative location of the portions to other elements in the structural model, wherein the association is inferred by:

identifying proximity between the portions and other elements representing known product fields;

analyzing the structural static or dynamic relationship between the portion or portions and surrounding elements, including parent-child or sibling relationships within the structural model; and prioritizing elements located in predefined regions of the product webpage.

51. The non-transitory computer readable storage medium of claim 45, wherein the stored processor-executable software instructions are configured to cause a processor to perform operations further comprising receiving user input to refine or validate mappings between elements in the structural model and corresponding product fields.

52. The non-transitory computer readable storage medium of claim 45, wherein the stored processor-executable software instructions are configured to cause a processor to perform operations further comprising:

determining relationships between elements, including associations between a main object comprising an image or a primary textual element and adjacent metadata; and identifying one or more anchor points within the structural model of the retrieved product webpage based on the determined relationships.

53. The non-transitory computer readable storage medium of claim 45, wherein the stored processor-executable software instructions are configured to cause a processor to perform operations further comprising determining computational actions associated with elements of the structural model, wherein each computational action comprises a user or system interaction event that modifies a related element of the retrieved product webpage.

54. The non-transitory computer readable storage medium of claim 53, wherein the stored processor-executable software instructions are configured to cause a processor to perform operations such that determining computational actions further comprises identifying click events, hover events, scroll events, or timer events associated with product or related fields in the structural model.

55. The non-transitory computer readable storage medium of claim 45, wherein the stored processor-executable software instructions are configured to cause a processor to perform operations further comprising inferring an origin of a field or data point of interest in the structural model based on a result of analyzing data sources used to render the retrieved product webpage.

56. The non-transitory computer readable storage medium of claim 55, wherein the stored processor-executable software instructions are configured to cause a processor to perform operations such that analyzing data sources comprises evaluating dynamic content loaded via JavaScript, JSON, or XML files associated with the retrieved product webpage.

57. The non-transitory computer readable storage medium of claim 45, wherein the stored processor-executable software instructions are configured to cause a processor to perform operations further comprising determining a sequence for retrieving data sources to extract product or relevant data point information, wherein the sequence approximates the intended data loading process of the webpage.

58. The non-transitory computer readable storage medium of claim 45, wherein the stored processor-executable software instructions are configured to cause a processor to perform operations further comprising validating the stability of the extracted product information by generating multiple requests to the address of the product webpage using different client identifiers or proxy locations.

59. The non-transitory computer readable storage medium of claim 58, wherein the stored processor-executable software instructions are configured to cause a processor to perform operations such that validating the stability of the extracted product information further comprises determining whether the product information remains consistent across the generated requests.

60. The non-transitory computer readable storage medium of claim 45, wherein the stored processor-executable software instructions are configured to cause a processor to perform operations such that using the generated structural model to segment the retrieved product webpage comprises using machine learning to generate mappings from locations in the generated structural model to product fields.

61. The non-transitory computer readable storage medium of claim 60, wherein the stored processor-executable software instructions are configured to cause a processor to perform operations such that using machine learning to generate mappings further comprises training a machine learning model using a plurality of structural models and corresponding product fields.

62. The non-transitory computer readable storage medium of claim 61, wherein the stored processor-executable software instructions are configured to cause a processor to perform operations such that training the machine learning model further comprises:

generating a plurality of codified representations of structural models, wherein:

each representation includes parameters of structural elements, the parameters including at least one or more of an element type, coordinates on a webpage canvas, dimensions, or visual layering attributes; and using the codified representations to train the machine learning model to identify mappings between structural elements and corresponding product fields.

63. The non-transitory computer readable storage medium of claim 60, wherein the stored processor-executable software instructions are configured to cause a processor to perform operations such that using machine learning to generate mappings further comprises:

training a first machine learning model to analyze the structural model; and training a second machine learning model to analyze at least one of the proposed structural layout or visual rendering of the retrieved product webpage.

64. The non-transitory computer readable storage medium of claim 45, wherein the stored processor-executable software instructions are configured to cause a processor to perform operations further comprising determining computational actions associated with elements of the structural model, wherein:

each computational action comprises an interaction event initiated by a user or an automated system process;

the interaction event modifies an associated element of the retrieved product webpage; and the automated system process includes content insertion by backend systems or element modification triggered by system timers.

65. The non-transitory computer readable storage medium of claim 64, wherein the stored processor-executable software instructions are configured to cause a processor to perform operations such that:

determining computational actions further comprises identifying interaction events associated with product fields in the structural model; and the interaction events include click events, hover events, scroll events, or timer events configured to modify associated webpage elements.

66. The non-transitory computer readable storage medium of claim 45, wherein the stored processor-executable software instructions are configured to cause a processor to perform operations further comprising replaying the retrieval of the product webpage by reconstructing a sequence of data source requests to validate the consistency of the extracted product information.

* * * * *